US006993148B1

(12) United States Patent
Miyashita et al.

(10) Patent No.: US 6,993,148 B1
(45) Date of Patent: Jan. 31, 2006

(54) IMAGE PROCESSING APPARATUS AND METHOD, AND STORAGE MEDIUM

(75) Inventors: Tomoyuki Miyashita, Kodaira (JP); Takeshi Makita, Kawasaki (JP); Junichi Hayashi, Kawasaki (JP); Tomochika Murakami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1006 days.

(21) Appl. No.: 09/615,577

(22) Filed: Jul. 13, 2000

(30) Foreign Application Priority Data

Jul. 16, 1999 (JP) .......................................... 11-203766
Oct. 20, 1999 (JP) .......................................... 11-298170

(51) Int. Cl.
*G06K 9/00* (2006.01)

(52) U.S. Cl. .................................................... 382/100
(58) Field of Classification Search ................. 382/100, 382/232; 380/205, 207, 208, 209, 210, 216; 713/168, 170, 176, 179; 370/527, 529; 348/460, 348/465, 661; 725/31; 399/366; 358/517; 345/626, 563
See application file for complete search history.

(56) References Cited

U.S. PATENT DOCUMENTS

| | | | | |
|---|---|---|---|---|
| 5,113,310 A | | 5/1992 | Kurokid et al. ............ | 358/3.19 |
| 5,687,236 A | * | 11/1997 | Moskowitz et al. .......... | 380/28 |
| 5,734,752 A | * | 3/1998 | Knox ........................ | 358/3.28 |
| 5,790,703 A | * | 8/1998 | Wang ........................ | 358/3.28 |
| 5,893,101 A | * | 4/1999 | Balogh et al. .............. | 707/100 |
| 6,031,914 A | * | 2/2000 | Tewfik et al. ................ | 380/54 |
| 6,037,984 A | * | 3/2000 | Isnardi et al. .......... | 375/240.21 |
| 6,061,793 A | * | 5/2000 | Tewfik et al. ............... | 713/176 |
| 6,088,123 A | * | 7/2000 | Adler et al. ............... | 358/3.28 |
| 6,208,735 B1 | * | 3/2001 | Cox et al. .................... | 380/54 |
| 6,438,251 B1 | * | 8/2002 | Yamaguchi ................ | 382/100 |

FOREIGN PATENT DOCUMENTS

JP         2-622429 B2     4/1997

OTHER PUBLICATIONS

"Digital Halftoning", Robert Ulichney, Massachusetts Institute of Technology (1987).
"Digital Halftoning Technique Using a Blue Noise Mask", T. Mitsa, et al., J. Opt. Soc. Am A, vol. 9, No. 11, Nov. 1992.

* cited by examiner

*Primary Examiner*—Andrew W. Johns
*Assistant Examiner*—Shervin Nakhjavan
(74) *Attorney, Agent, or Firm*—Fitzpatrick, Cella, Harper & Scinto

(57) ABSTRACT

This invention reduces degradation in image quality and improves altered portion specifying accuracy in a digital watermark technology. For this purpose, an apparatus of this invention inputs image data and information such as a copyright holder name to be embedded in the image data (S1, S2). A mask pattern having a blue noise characteristic for intermediate- and high-frequency components is set at the image data start position, and pixel data at a target embedding position in the mask pattern is quantized (S5). The quantization error at this time corresponds to the bit information to be embedded at that position. This processing is repeatedly performed for the entire image (S6–S9).

26 Claims, 53 Drawing Sheets

FIG. 9A
FIG. 9B

F I G. 14
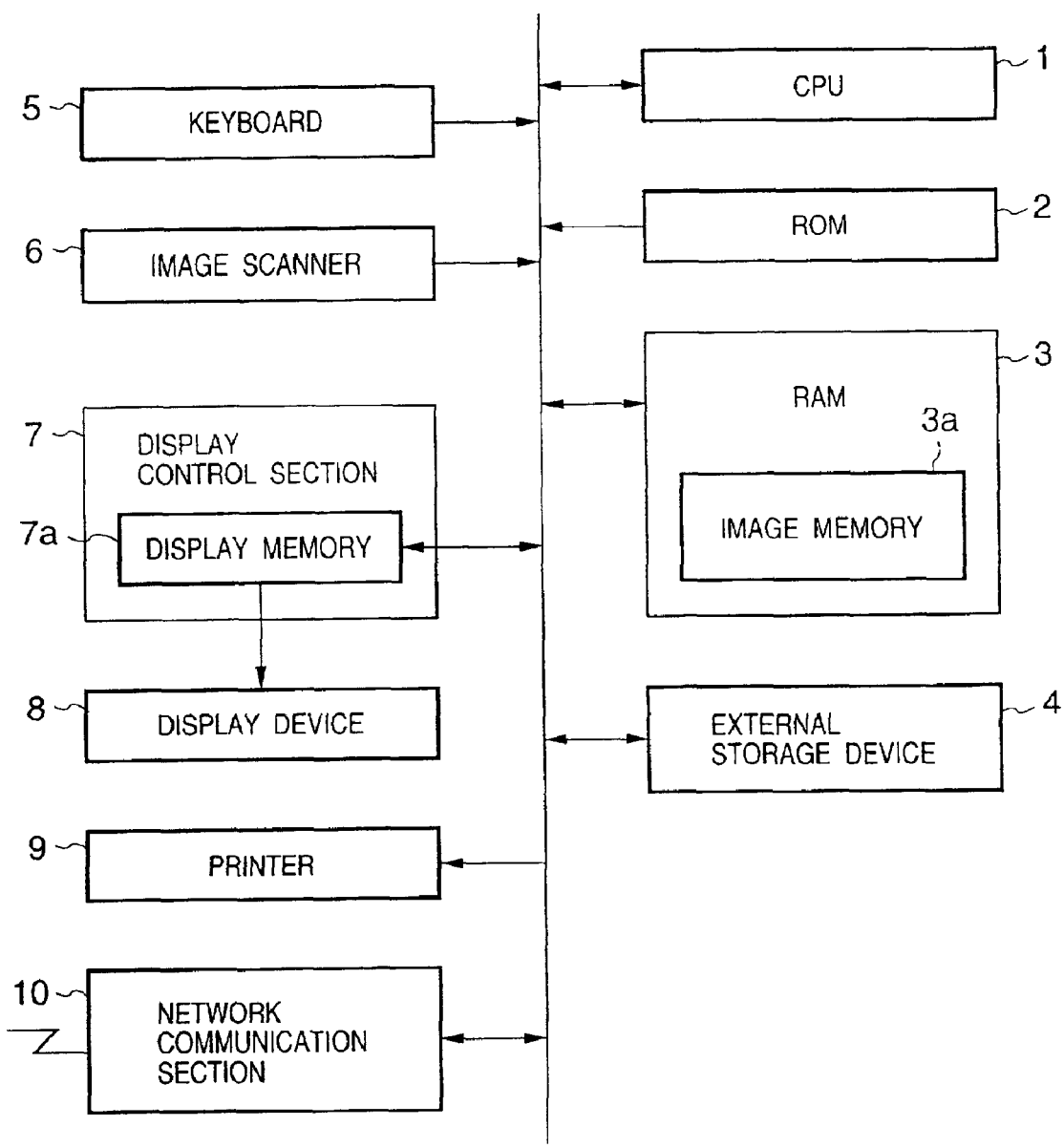

F I G. 18
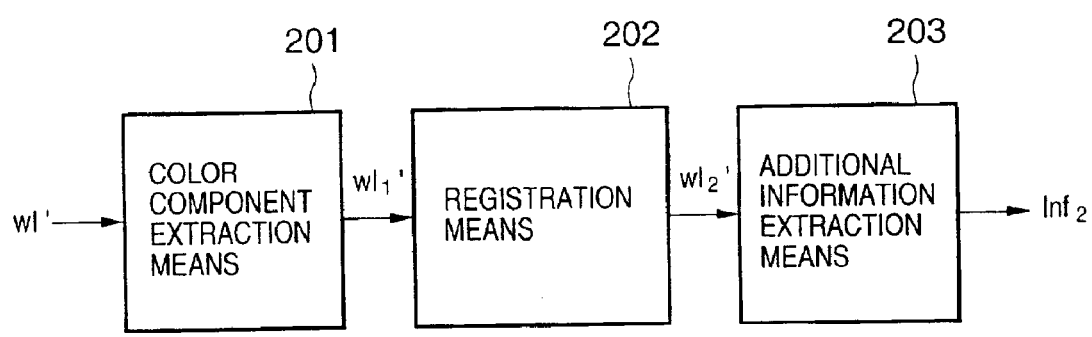

F I G. 19
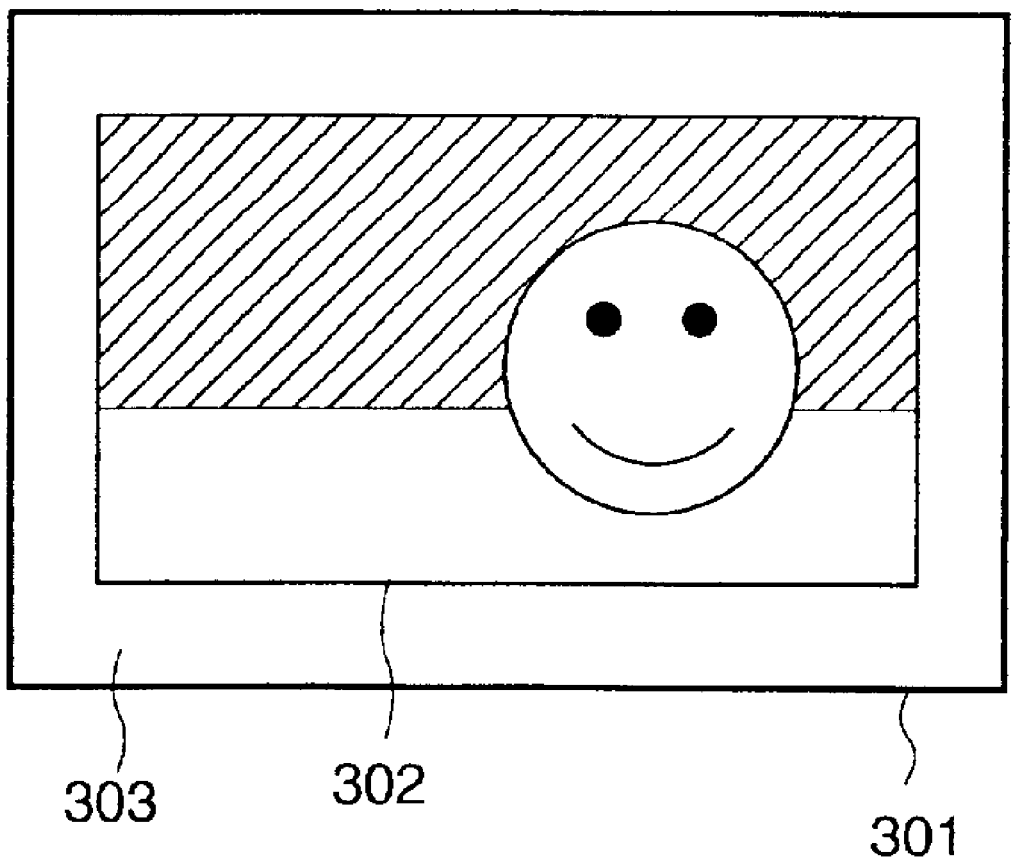

$I''(x, y)$ ⊗ CONVOLUTION $P(x, y)$ = $32c^2$

| 0 | 0 | 0 | 0 | +C | +C | +C | +C |
|---|---|---|---|---|---|---|---|
| 0 | 0 | 0 | 0 | +C | +C | +C | +C |
| 0 | 0 | 0 | 0 | +C | +C | +C | +C |
| 0 | 0 | 0 | 0 | +C | +C | +C | +C |
| -C | -C | -C | -C | 0 | 0 | 0 | 0 |
| -C | -C | -C | -C | 0 | 0 | 0 | 0 |
| -C | -C | -C | -C | 0 | 0 | 0 | 0 |
| -C | -C | -C | -C | 0 | 0 | 0 | 0 |

3602

| -C | -C | 0 | 0 | 0 | 0 | -C | -C |
|---|---|---|---|---|---|---|---|
| -C | -C | 0 | 0 | 0 | 0 | -C | -C |
| 0 | 0 | +C | +C | +C | +C | 0 | 0 |
| 0 | 0 | +C | +C | +C | +C | 0 | 0 |
| 0 | 0 | +C | +C | +C | +C | 0 | 0 |
| 0 | 0 | +C | +C | +C | +C | 0 | 0 |
| -C | -C | 0 | 0 | 0 | 0 | -C | -C |
| -C | -C | 0 | 0 | 0 | 0 | -C | -C |

FIRST EMBEDDING
POSITION REFERENCE MASK

SECOND EMBEDDING
POSITION REFERENCE MASK

FIG. 53

| 69 | 211 | 9 | 217 | 16 | 35 | 190 | 101 |
|---|---|---|---|---|---|---|---|
| 87 | 197 | 109 | 180 | 104 | 212 | 71 | 114 |
| 166 | 28 | 55 | 143 | 104 | 146 | 85 | 130 |
| 64 | 206 | 179 | 48 | 240 | 232 | 108 | 154 |
| 67 | 40 | 91 | 224 | 37 | 32 | 223 | 194 |
| 203 | 214 | 106 | 231 | 169 | 4 | 208 | 24 |
| 47 | 195 | 27 | 61 | 2 | 155 | 81 | 213 |
| 251 | 84 | 202 | 184 | 170 | 10 | 46 | 138 |

COEFFICIENT LAYOUT IN BLUE NOISE MASK (PARTIAL)

FIG. 54

| 73 | 244 | 124 | 207 | 70 | 254 | 117 | 196 |
|---|---|---|---|---|---|---|---|
| 38 | 177 | 11 | 132 | 43 | 186 | 4 | 138 |
| 104 | 221 | 93 | 231 | 100 | 211 | 85 | 237 |
| 23 | 151 | 55 | 165 | 26 | 153 | 56 | 172 |
| 67 | 250 | 113 | 193 | 79 | 240 | 123 | 203 |
| 47 | 188 | 1 | 142 | 33 | 183 | 14 | 128 |
| 96 | 215 | 83 | 232 | 111 | 218 | 91 | 227 |
| 28 | 157 | 60 | 171 | 17 | 147 | 51 | 160 |

COEFFICIENT LAYOUT IN CONE MASK (PARTIAL)

IMAGE PROCESSING APPARATUS AND METHOD, AND STORAGE MEDIUM

FIELD OF THE INVENTION

The present invention relates to an image processing apparatus and method and a storage medium and, more particularly, to an image processing method and apparatus for invisibly embedding information in digital image data or extracting embedded information, and a storage medium.

BACKGROUND OF THE INVENTION

Conventionally, various schemes of digital watermark technology have been developed as methods of protecting the copyrights of digital contents. These methods have recently received a great deal of attention as a technology for security and copyright protection in electronic distribution, in which pieces of handling information of digital contents, including the copyright holder name and the buyer ID, are invisibly embedded in the digital image information, thereby enabling to track use without permission by illicit copy. A digital watermark technology as a means for suppressing alteration of digital contents has also been developed. In this digital watermark technology, various data embedding methods have been proposed. In a method, information is embedded using a mask pattern. In this method, information is repeatedly embedded in digital image data in accordance with a mask pattern. For example, information is embedded at positions a, b, c, and d of each of mask patterns shown in FIGS. 1A to 1D using quantization error in accordance with mask pattern arrays shown as in FIGS. 2 to 4, thereby obtaining a synthetic image.

However, to improve the accuracy for specifying an altered portion in the resultant synthetic image, the mask patterns must be arrayed densely on the image data, as shown in FIG. 2 or 4. In addition, to improve watermark information detection accuracy in a partial image extracted from the synthetic image, generally, the mask pattern array as shown in FIG. 4 is preferably used. Hence, to simultaneously improve both altered portion specifying accuracy and watermark resilience against extraction, embedding is done using the mask pattern array as shown in FIG. 4.

This embedding method can improve the altered portion specifying accuracy and watermark resilience against extraction. However, this method suffers the following problems.

1) To improve the resilience, the mask pattern size is preferably as small as possible. However, low-frequency noise or block noise becomes noticeable to degrade the image quality. In addition, the embeddable information amount is limited by the number of data in the mask pattern. For example, when the mask patterns shown in FIGS. 1A to 1D are used, the information amount is limited to four bits for the positions a, b, c, and d or 16 bits at maximum.

2) To improve the image quality, the mask pattern size is preferably as large as possible, though the resilience becomes poor.

3) To improve the altered portion specifying accuracy, the number of embedding positions must be large. However, low-frequency noise or block noise becomes noticeable to degrade the image quality.

That is, the image quality and the altered portion specifying accuracy/watermark resilience against extraction have tradeoff relationships. If one is improved, the other degrades: both cannot be simultaneously improved.

A digital watermark information embedding method called a patchwork method is known. In this method, the values of one part of an image are intentionally increased while the values of the other part are intentionally decreased. Hence, certain additional information can be embedded while the values of the entire image are kept almost unchanged.

Although it is conventionally known that information must be embedded undetectably for the human eye, the method of determining the image embedding position in the above patchwork method or the like has not been established yet.

To embed digital watermark information by partially modulating an image, for example, a method of determining the modulation position at random is available. However, with this method, the image quality cannot be kept sufficiently high.

SUMMARY OF THE INVENTION

The present invention has been in consideration of the above prior art, and has as its object to embed digital watermark information by partially changing an image such that degradation in image quality is possibly unnoticeable to the human eye.

In order to achieve the above object, an image processing apparatus according to the present invention has, e.g., the following arrangement.

More specifically, according to the present invention, there is provided an image processing apparatus for embedding predetermined information in image data, comprising:

generation means for generating a mask pattern which has a blue noise characteristic and specifies a target embedding position in an M×N size; and embedding means for applying the mask pattern to part of the image data and modulating image data corresponding to the target embedding position to embed the predetermined information.

There is also provided an image processing apparatus comprising generation means for binarizing each coefficient of a mask and generating a two-dimensional mask having periodical or pseudo-periodical peaks on a radial frequency domain of resultant binary information, first input means for inputting image data, second input means for inputting additional information, means for making each coefficient of the two-dimensional mask correspond to each bit information of the additional information, and digital watermark embedding means for adding/subtracting the image data on the basis of a positional relationship obtained by assigning the two-dimensional mask onto the image data as a correspondence result, thereby embedding each bit information in the image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 9A and 9B are views showing an example of an embedded image;

FIG. 14 is a block diagram showing an apparatus according to the first embodiment;

FIG. 18 is a block diagram showing the overall arrangement of a digital watermark extraction apparatus;

FIG. 19 is a view showing an example of image data generated on the extraction side in print system processing;

FIG. 35 is a view for explaining calculations for embedding of the additional information Inf;

FIGS. 49A and 49B are views showing examples of a pattern array perpendicular to the pattern shown in FIG. 25;

FIG. 53 is a view showing examples of coefficients in the blue noise mask; and

FIG. 54 is a view showing an example of the coefficients of pixel values of a cone mask.

DETAILED DESCRIPTION OF THE PREFERRED EMBODIMENTS

Figure 1A:
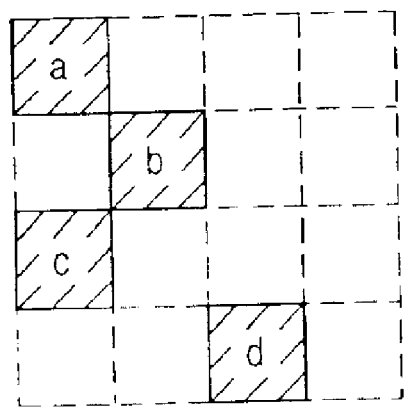
FIGS. 1A to 1D are views showing examples of target embedding regions in a digital watermark technology.
Figure 1B:
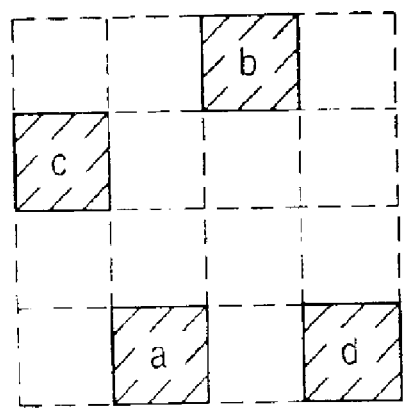
Figure 1C:
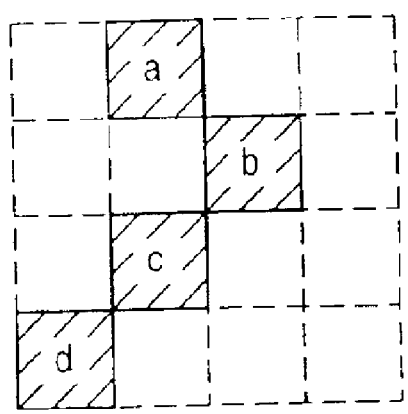
Figure 1D:
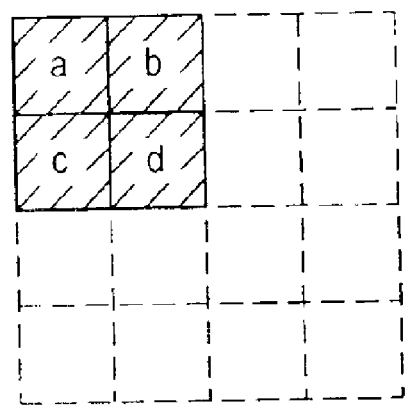
Figure 2:
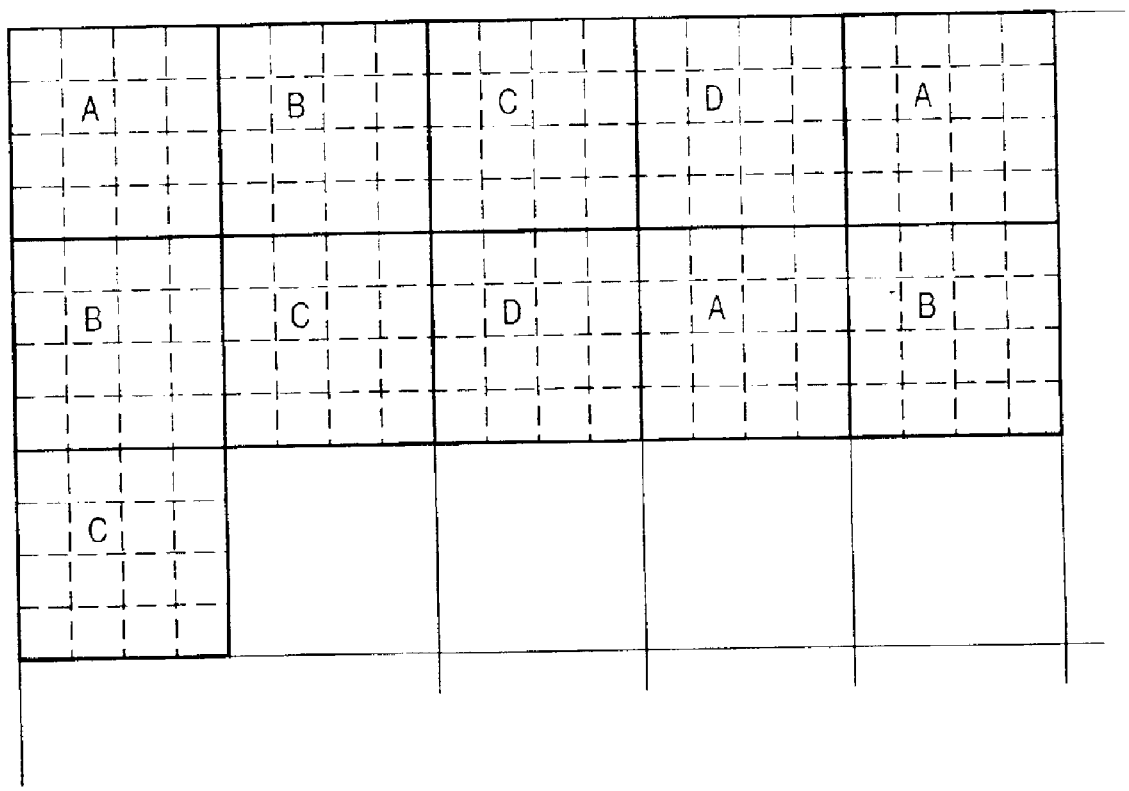
FIG. 2 is a view showing a mask pattern array used for information embedding.
Figure 3:
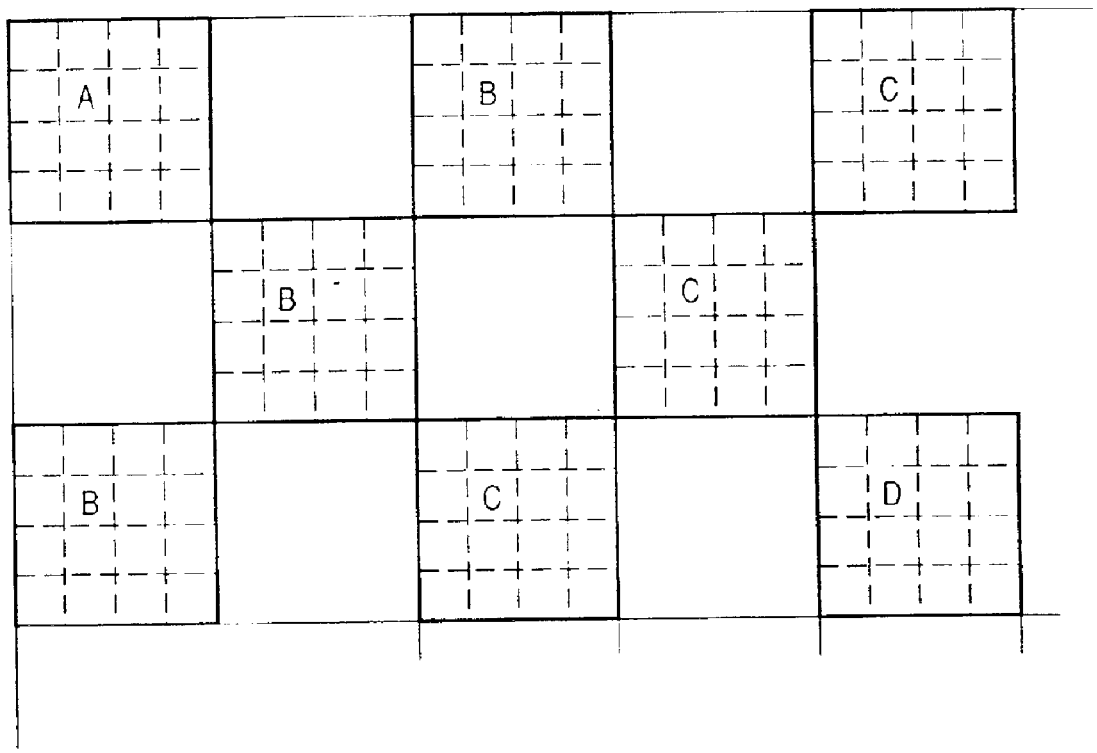
FIG. 3 is a view showing another mask pattern array used for information embedding.
Figure 4:
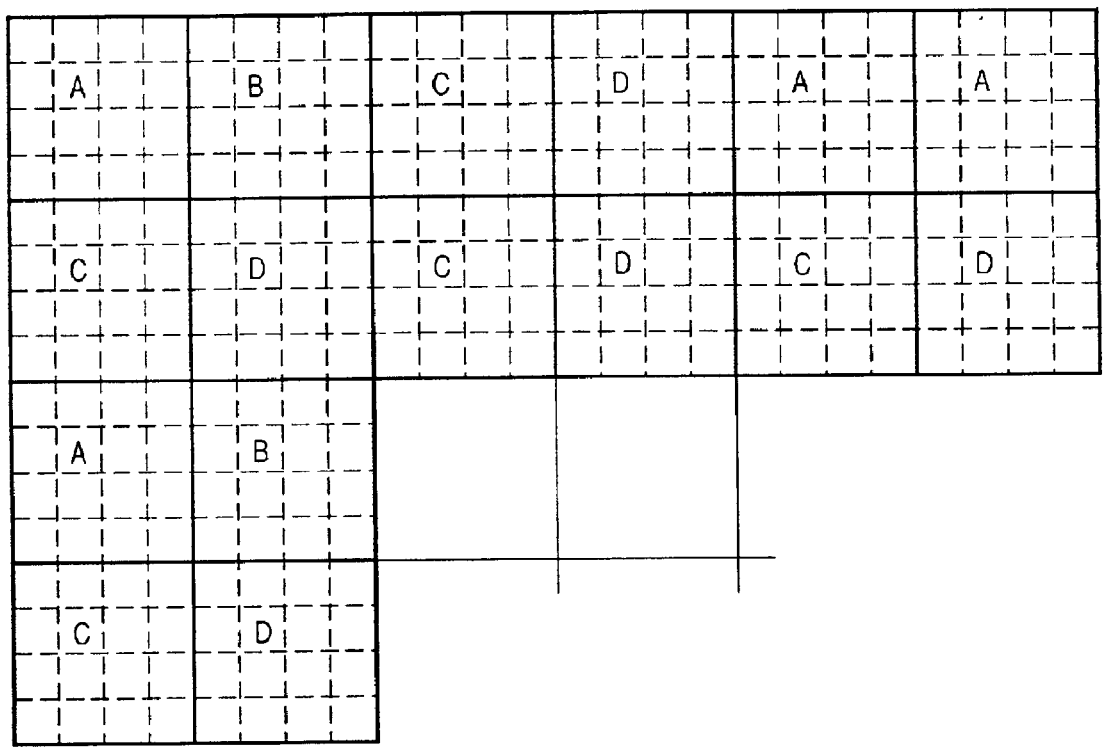
FIG. 4 is a view showing still another mask pattern array used for information embedding.

The embodiments of the present invention will be described below in detail with reference to the accompanying drawings.

<First Embodiment>

FIG. 14 is a block diagram showing an information processing apparatus according to the first embodiment. Referring to FIG. 14, a CPU 1 controls the entire apparatus. A ROM 2 stores a BIOS and boot program. A RAM 3 in which an OS and various applications are loaded is also used as a work area of the CPU. In the RAM 3, an image memory 3a for storing a read image is ensured. An external storage device 4 such as a hard disk stores the OS and various application programs. Processed image data can also be stored in the external storage device 4 as files. The apparatus also has a keyboard 5 (including a pointing device such as a mouse). An image scanner 6 for reading an original image as color image data is connected through an interface such as a SCSI. A display control section 7 includes a display memory which stores image data to be displayed. A display device 8 such as a CRT or liquid crystal display displays a video signal output from the display control section 7. A color printer 9 has a printer engine having printheads for discharging ink droplets by thermal energy in units of print color components. A network communication section 10 communicates with a network (may be the Internet).

In this embodiment having the above arrangement, color image data read by the image scanner is stored in the image memory 3a, and independently set information is embedded using the digital watermark technology.

Figure 5:
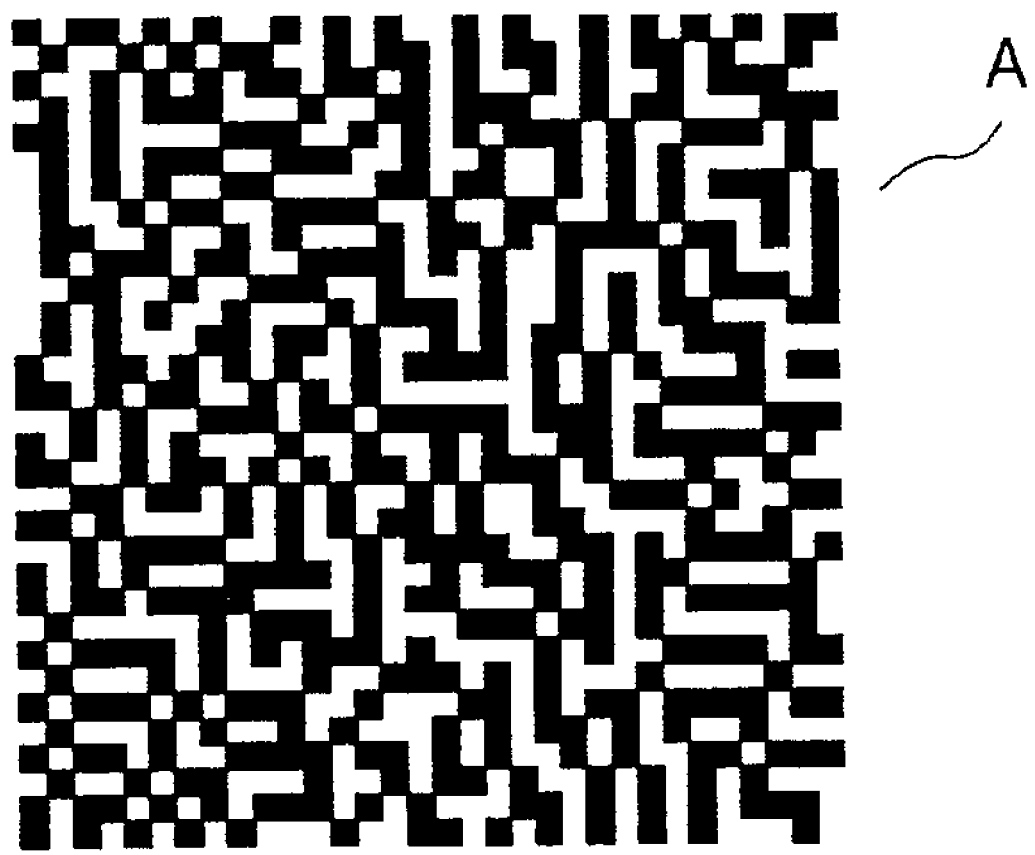
FIG. 5 is a view showing a mask pattern in the first embodiment.

FIG. 5 is a view showing a mask pattern having 32×32 pixels, which is comprised of intermediate- and high-frequency-band-components excluding low-frequency components, i.e., has a so-called blue noise characteristic. A black dot in FIG. 5 indicates an information embedding position. The amount (the number of bits) of information to be embedded is equal to or smaller than the number of black dots.

The mask pattern having the blue noise characteristic is normally used to binarize an image. In this embodiment, information is embedded using the pattern having the blue noise characteristic, thereby efficiently performing digital watermark processing in consideration of human visual characteristics. The structure of a blue noise mask pattern is disclosed in, e.g., Robert Ulichney, "Digital Halftoning", Massachusetts Institute of Technology (1987) or Japanese Patent No. 2622429.

Figure 6:
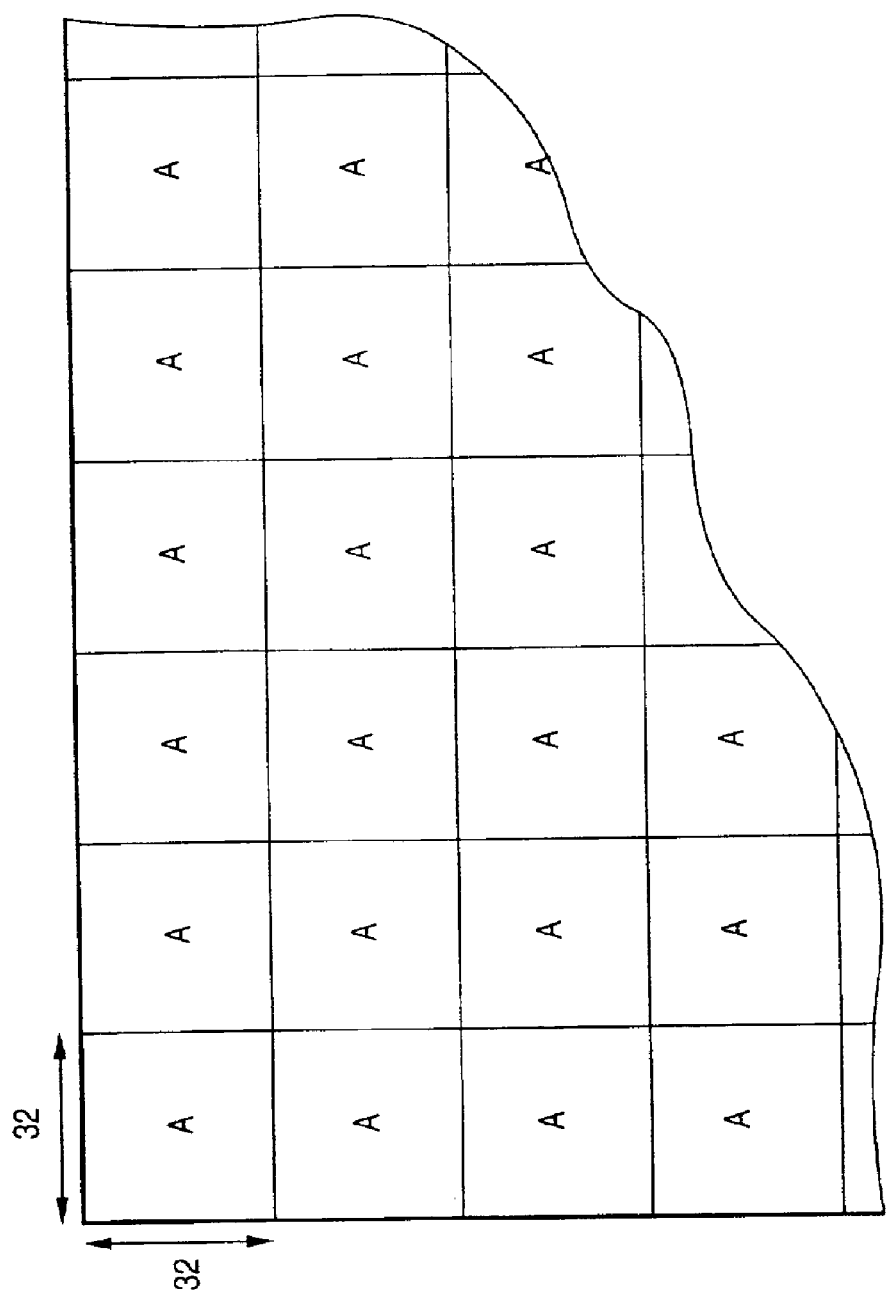
FIG. 6 is a view showing an information embedding region based on the mask pattern in the first embodiment.

FIG. 6 is a view showing the layout of mask patterns, which is used to embed information in entire image data using the mask pattern shown in FIG. 5. A method of embedding and detecting information using the mask pattern shown in FIG. 5 and mask pattern layout shown in FIG. 6 will be described below.

For embedding, first, original image data is loaded from the image scanner to the image memory 3a, as described above. Next, information is embedded at an embedding position of the mask pattern shown in FIG. 5, which corresponds to the upper left corner of the mask pattern layout shown in FIG. 6. When this embedding is complete, information is embedded at the position on the right side in the mask pattern layout. This processing is repeated to the lower right corner of the mask pattern layout shown in FIG. 6.

Figure 7:
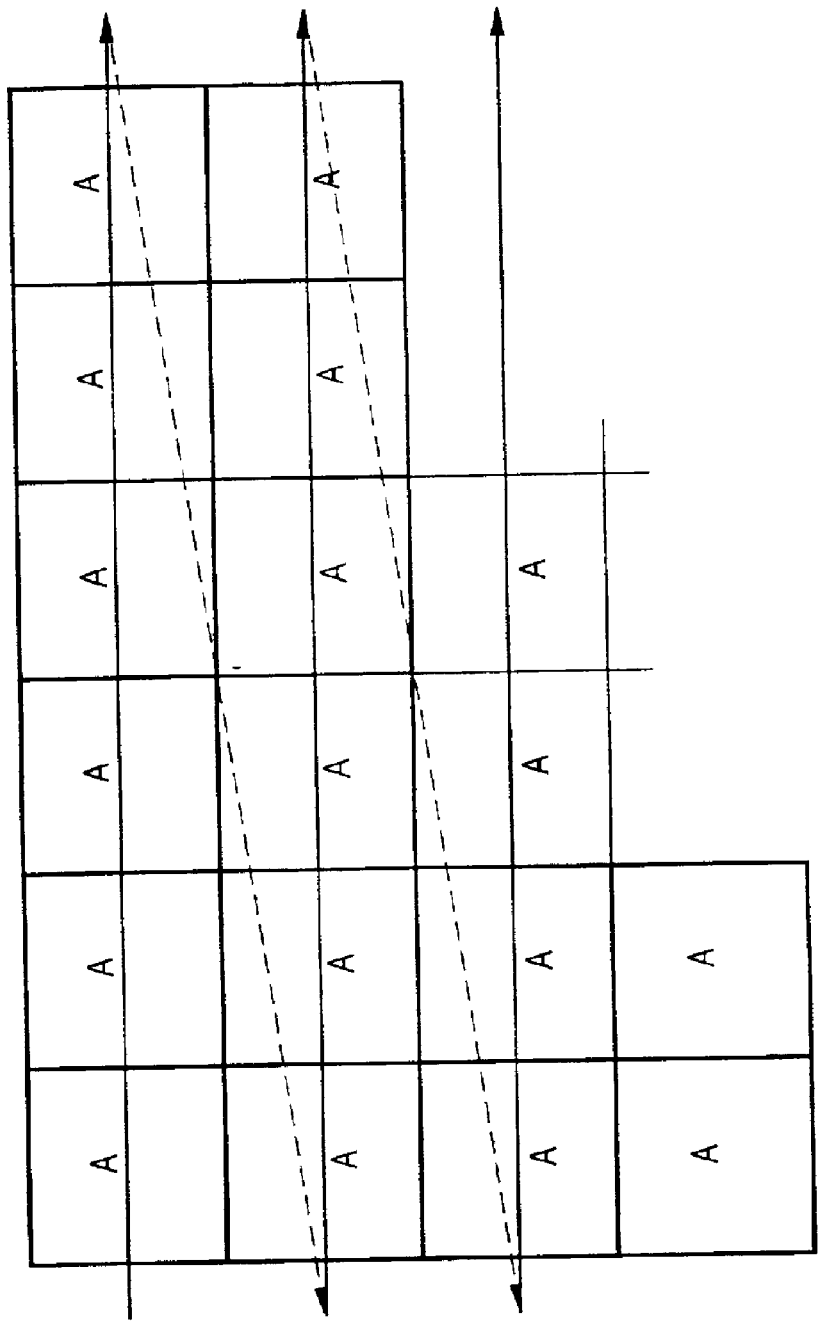
FIG. 7 is a view showing the embedding sequence in the first embodiment.

FIG. 7 is a view showing the manner of moving the target mask pattern embedding position in the above embedding processing. Information is embedded at each mask pattern embedding position while moving the mask pattern from the left end of the image in the directions indicated by arrows.

Figure 8:
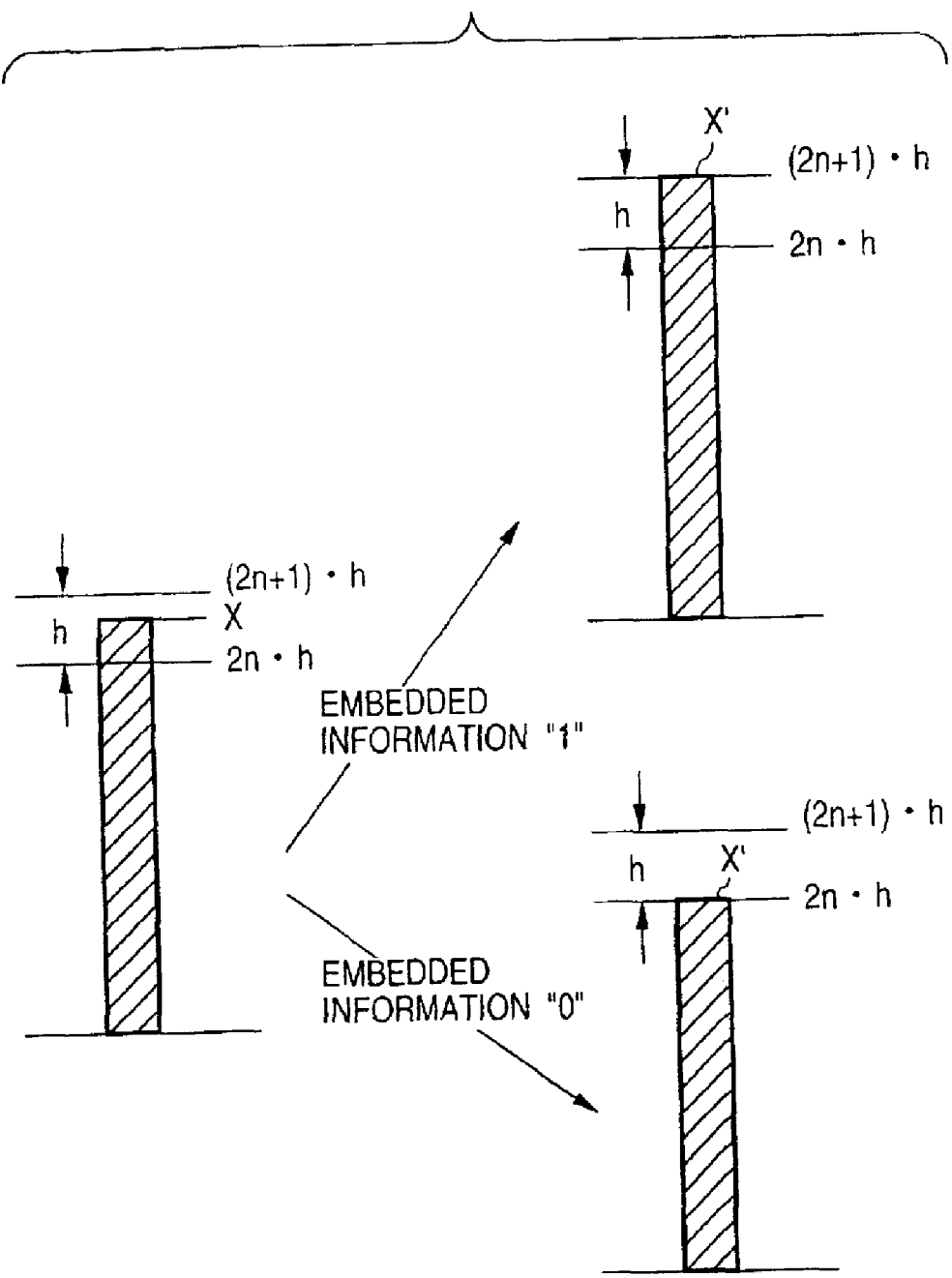
FIG. 8 is a view showing the concept of information embedding in the first embodiment.

FIG. 8 is a view showing a method of embedding information in image data in correspondence with the embedding position of the mask pattern shown in FIG. 5. X is the pixel value of a pixel of interest, h is the step width of quantization, and n is a natural number.

As an embedding rule, when information to be embedded is "0", the pixel value of interest is quantized to an even multiple of the re-quantization step width most approximate to the pixel value X. When information to be embedded is "1", the pixel value of interest is quantized to an odd multiple of the re-quantization step width most approximate to the pixel value X.

In the case shown in FIG. 8, the pixel value X of interest is present between $2n \cdot h$ and $(2n+1) \cdot h$. Assume that the pixel value X of interest is present between $(2n-1) \cdot h$ and $2n \cdot h$. In this case, to embed "0" at the position of the pixel of interest, the pixel value of interest is quantized to $2n$, i.e., an even number. To embed "1", the pixel value of interest is quantized to $2n-1$, i.e., an odd number. Hence, no inconsistency occurs.

This will be briefly described. Assume that an input image is represented by R, G, and B pixels each having eight bits, and information is to be embedded in a B component. In this case, the B component of a given pixel of the input image can take one of values 0, 1, . . . , 255. If the quantization step width is 8, data after information embedding and quantization can take one of values 0, 8, 16, 24, 32, . . . . The values 0, 16, 32, . . . correspond to $2n$, i.e., even multiples of quantization step width. The values 8, 24, . . . correspond to $2n+1$, i.e., odd multiples of quantization step width.

Conversely, to detect embedded data from an image, basically, if the pixel value is an even multiple (0, 16, 32, . . . ) of quantization step width, data that has been embedded at that pixel position can be detected as "0". If the pixel value is an odd multiple (8, 24, . . . ), the embedded data can be detected as "1". However, this applies to only a pixel which is determined to be at the target embedding position. For data with another value (e.g., 10), information is at least not embedded at that pixel position.

Figure 10A:
FIGS. 10A and 10B are views showing an example of an altered image.
Figure 10B:
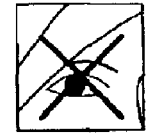

Assume that there are image data (FIG. 9A) converted by embedding, partially extracted image data (FIG. 9B), image data (FIG. 10A) obtained by altering the image data shown in FIG. 9A, and image data (FIG. 10B) obtained by partially extracting the image data shown in FIG. 9A and altering the image data.

Figure 11:
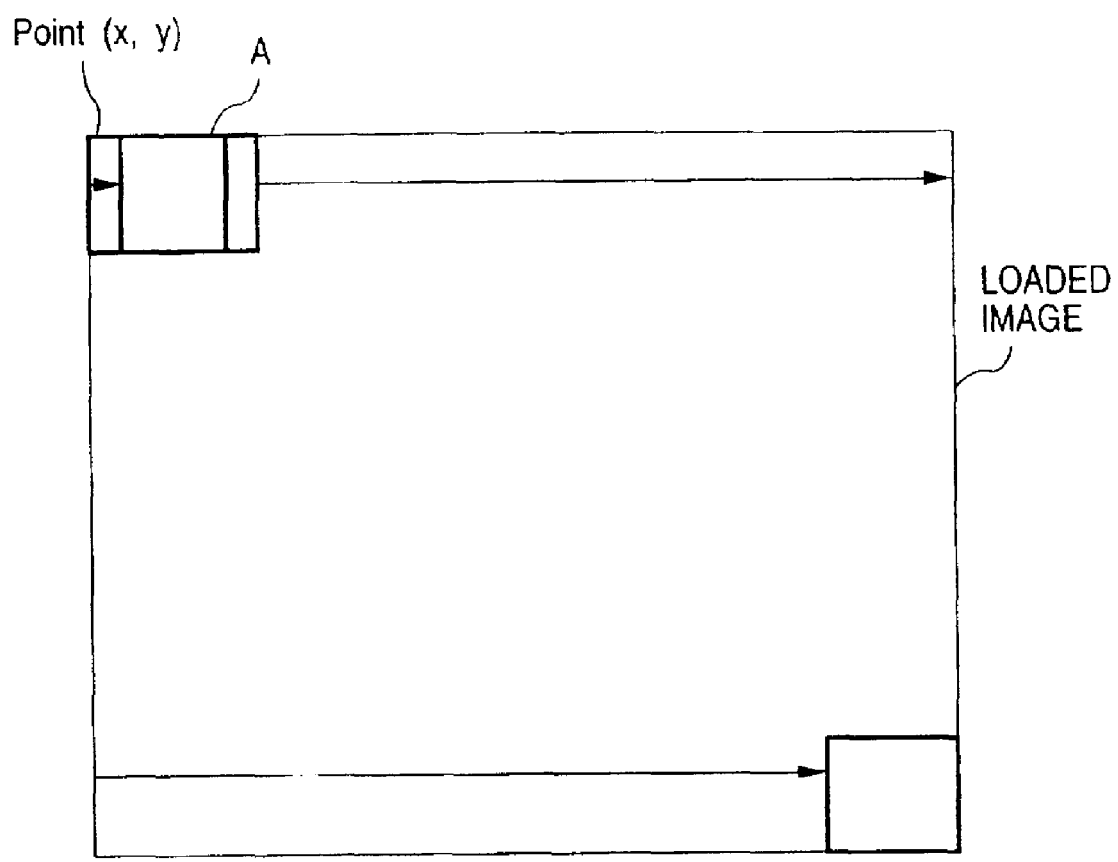
FIG. 11 is a view showing a mask pattern application sequence in embedded information extraction processing.

In this case, as shown in FIG. 11, starting from the upper left corner of each image, dots represented in black in the mask pattern shown in FIG. 5 are checked to determine whether information is embedded. At this time, the coordinates of a point (x,y) in FIG. 11 and the number of pixels which are determined to have information embedded are recorded.

Whether information is embedded in a dot (pixel) is determined by determining whether the value of each pixel masked by the black dot of the mask pattern shown in FIG. 5 is an integer multiple of quantization step width. The number of pixels (to be referred to as a determination count hereinafter) whose values are determined to be integer multiples of quantization step width, and the point (x,y) representing the mask pattern position at that time are stored in an appropriate area in the RAM 3 in correspondence with each other.

This processing is repeated while moving the mask pattern to the right by one pixel. When the mask pattern has reached the right end, it is moved to a position shifted from the upper left corner in FIG. 11 to the lower side by one dot, and the same processing as described above is repeated.

When determination processing for the entire image to be checked is ended, the values are sorted in descending order of determination counts. The coordinates and determination count of the point (x,y) with a determination count equal to or larger than a threshold value are obtained. As the threshold value, the embedded information amount (the number of bits) is used. When q bits are required for an author name, and the amount of information to be embedded is Q bits (the number of black dots of the mask pattern>Q>q), the remaining bits (Q−q) contain an appropriate value such as a parity.

Figure 12:
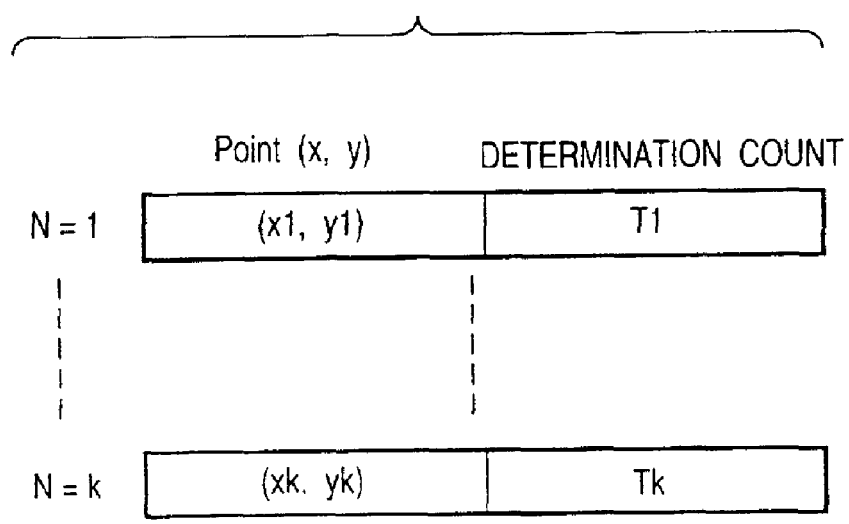
FIG. 12 is a view showing the stored state of collected information.

FIG. 12 is a view showing k sets of information obtained in the above way (the number of information equal to or larger than the threshold value is k).

For each of the sets of information, the embedded information is determined in units of mask pattern embedding positions. At this time, determination information corresponding to the embedding position of each set is recorded.

Figure 13:
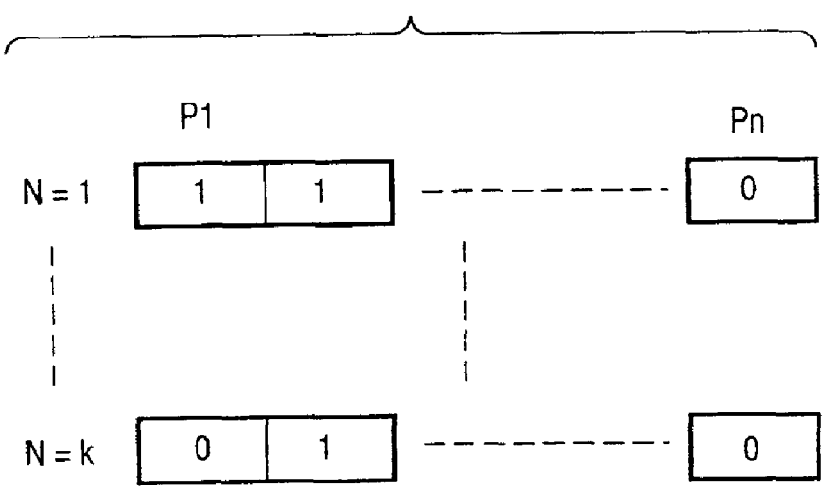
FIG. 13 is a view for explaining processing of extracting embedded information.

FIG. 13 is a view showing pieces of determination information corresponding to the embedding positions P1 to Pn of the respective sets. According to be above-described determination rule, when the value of pixel data X is an even multiple of quantization step width h, it is determined that information "0" is embedded, and when the pixel value is an odd multiple of quantization step width h, it is determined that information "1" is embedded.

The embedded information is determined by decision by majority for "0" and "1" at the same embedding position.

An altered portion is specified in the following way.

The x- and y-coordinate values of the point in the majority depend on the mask pattern size (32×32 in this embodiment). More specifically, without alteration, when x=0 and y=0 are set for the upper left corner position of the input image, x and y of the point (x,y) are basically given by $$x=32\times+i+c1$$

$$y=32\times j+c2$$

for i and j=0, 1, 2, . . . , and c1 and c2 are constants (depending on the input image). Since the information is embedded in the entire image, i and j are originally consecutive.

Assume that x and y of the point (x,y) have the above relationships, and when j=5, a region represented by i=1, 2, 3, 4, 10, 11 is determined as a target embedding region, it can be determined that regions represented by j=5 and i=5 to 9 are altered.

When the altered portion is determined, a message representing the alteration and the altered portion in the input image data are displayed on the display device 8 such that the altered portion can be discriminated from, e.g., an unaltered portion. As an example of discriminative display, the altered portion is enclosed with a frame or displayed in another color.

In this embodiment, information is embedded using a square mask pattern as shown in FIG. 6. However, a mask pattern can generally have an M×N size.

In this embodiment, the amount (the number of bits) of information to be embedded must not exceed the number of black dots of the mask pattern. To store an information amount more than the number of bits, the information is distributed to two adjacent mask patterns and embedded.

Additionally, when actually necessary information (the number of bits) is embedded together with the bits of an error correction code, the reliability can be further increased.

The above processing is performed by the CPU 1. The procedure (program) will be described with reference to FIGS. 15 and 16. This program is stored in the external storage device 4 and loaded and executed on the RAM 3.

Figure 15:
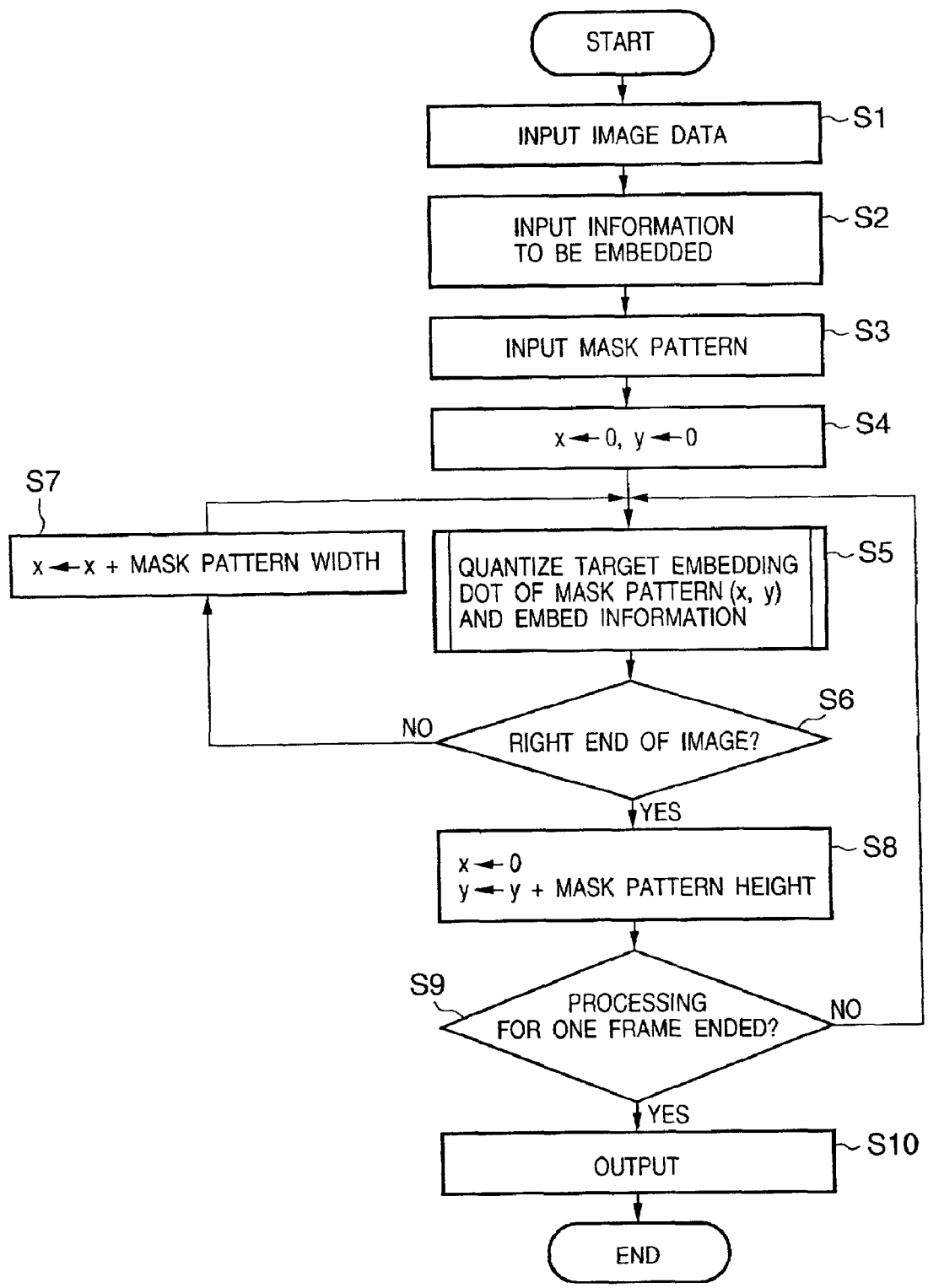
FIG. 15 is a flow chart showing embedding processing in the first embodiment.

FIG. 15 is a flow chart showing the procedure of embedding information using the digital watermark technology.

First, in step S1, an image as an embedding target is input from the image scanner 6 and bitmapped on the image memory 3a. The flow advances to step S2 to input information (e.g., a copyright holder name) to be embedded is input from the keyboard 5. In step S3, a mask pattern is loaded from the external storage device 4. This mask pattern is comprised of intermediate- and high-frequency bands, i.e., intermediate- and high-frequency band components, as shown in FIG. 5.

In step S4, 0 is substituted into x and y to initialize the mask pattern application position in the image data bitmapped on the image memory 3a.

In step S5, the upper left corner of the mask pattern is set at the position (x,y) of the image data. For predetermined dots of the black dots in the mask pattern, quantization processing is performed depending on the information (bits) to be embedded. This processing is performed a number of times corresponding to the number of bits of the information to be embedded.

When this processing is ended, the flow advances to step S6. On the basis of the input image size, the mask pattern size, and the values x and y at that time, it is determined whether processing has reached the right end of the image. If NO in step S6, processing in step S7 is performed to shift the mask pattern to the right by its width (32 dots). After that, the flow returns to step S5 to repeat the above processing.

If YES in step S6, the value x is initialized to 0, and the value y is incremented by the height (32 dots) of the mask pattern. Processing in steps S5 to S8 is repeated until it is determined in step S9 that embedding for one frame is ended.

When embedding processing for the input image is complete, information is embedded in the image data stored in the image memory 3a by the digital watermark technology, and the image data is output. To store the image data, it is output to the external storage device 4. The image data may be output to a network (including the Internet).

Figure 16:
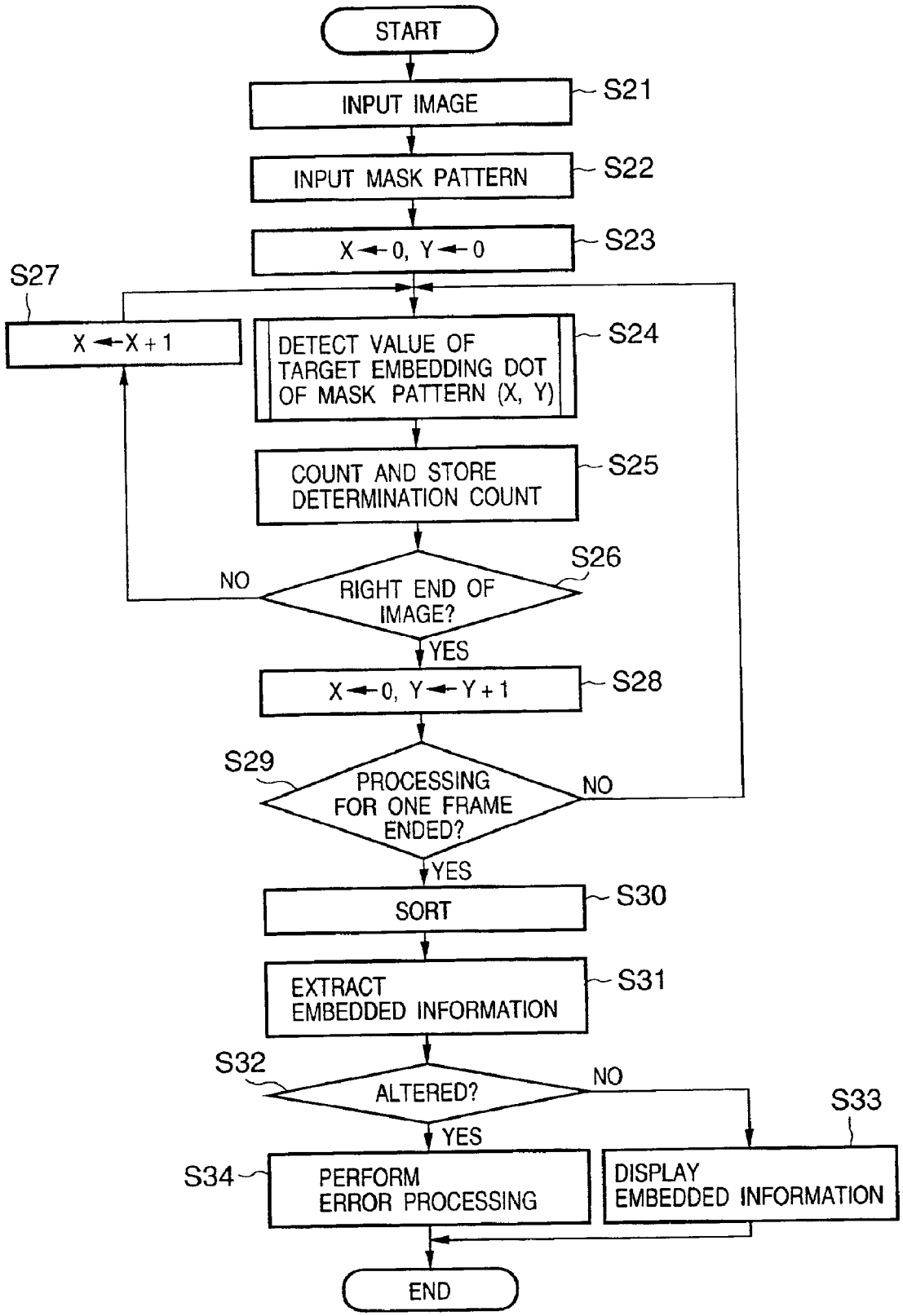
FIG. 16 is a flow chart showing embedded information extraction/alteration determination processing in the first embodiment.

Processing of extracting information embedded in an image in the above manner and determining alteration will be described next with reference to the flow chart shown in FIG. 16.

First, in step S21, an image to be determined is input and bitmapped on the image memory 3a. The image data need not be input from a specific source: the image can be downloaded from a network or loaded from a floppy disk. The flow advances to step S22 to load a mask pattern (FIG. 5) from the external storage device 4.

In step S23, 0 is substituted into x and y to initialize the mask pattern application position in the image data bitmapped on the image memory 3a.

In step S24, the upper left corner of the mask pattern is set at the position (x,y) of the image data. All the pixel values of the input image, which correspond to the black dots in the mask pattern, are read out. In step S25, the number of pixels which may have been embedded is counted, and the counting result is temporarily stored in the RAM. At this time, the values x and y of the mask pattern application position at that time are also stored.

In step S26, it is determined whether processing has reached the right end of the image. If NO in step S26, the value x is incremented by "1", i.e., the mask pattern application position is shifted by one pixel, and the flow returns to step S24.

If YES in step S26, the value x is initialized to "0", and the value y is incremented by "1" in step S28. Processing in steps S24 to S28 is repeated until it is determined in step S29 that processing in steps S24 and S25 is complete for the entire image.

When the pieces of information corresponding to one frame are collected, the stored data are arranged in descending order of counts, and data whose counts are equal to or larger than a predetermined value are validated in step S30. The flow advances to step S31 to extract the embedded information.

In step S32, on the basis of the pieces of collected information and the values x and y of each information, it is determined whether the image is altered, and if so, the altered portion is determined. If it is determined that the image is not altered, the embedded information is displayed, e.g., the copyright holder name is displayed in step S33.

If it is determined that the image is altered, error processing is performed to display a message representing the alteration and explicitly indicate the altered portion in step S34, and the processing is ended.

As described above, according to the first embodiment, a mask pattern having no low-frequency components is used to embed information. Also, instead of embedding information at black dots of the mask pattern, i.e., all-positions at "1", quantization and information embedding are performed at limited positions. Hence, the influence on the image quality can be reduced, and a satisfactory image quality can be maintained. Additionally, even when the image is altered, the altered portion can be specified.

The present invention may be applied to a single apparatus or a system constituted by a plurality of apparatuses.

Although the above embodiment requires, e.g., a means for inputting an image (a means for connecting an image scanner or network, or hardware such as a floppy disk), this means can be a general-purpose device normally incorporated in or connectable to a general-purpose information processing apparatus (personal computer), and its processing can be realized by CPU processing, i.e., a program.

Hence, the present invention can be implemented even by supplying a storage medium storing software program codes for realizing the functions of the above-described embodiment to a system or apparatus, and causing the computer (or a CPU or MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiment are realized not only when the readout program codes are executed by the computer but also when the OS (Operating System) running on the computer performs part or all of actual processing on the basis of the instructions of the program codes.

The functions of the above-described embodiment are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As described above, according to the present invention, in the digital watermark technology, degradation in image quality can be reduced, and the altered portion specifying accuracy can be improved.

<Second Embodiment>

[1 Digital Watermark Embedding Apparatus]

The outline of a digital watermark embedding apparatus according to the second embodiment will be described below with reference to the accompanying drawings.

Figure 17:
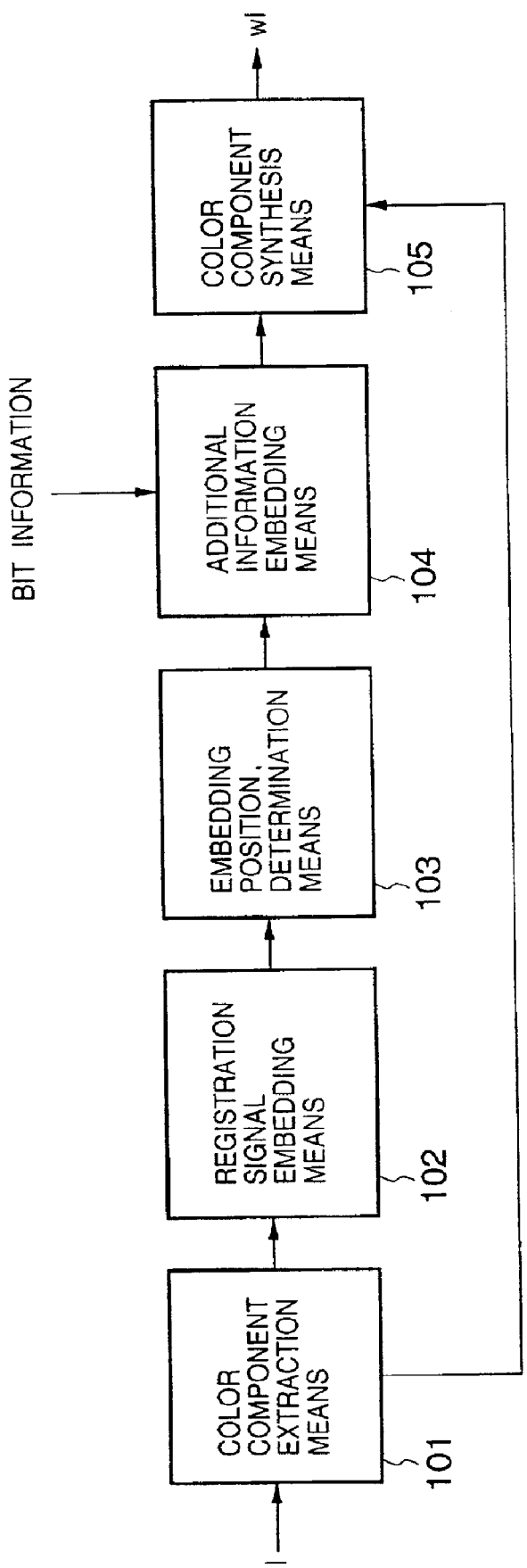
FIG. 17 is a block diagram showing the overall arrangement of a digital watermark embedding apparatus according to the second embodiment.

FIG. 17 shows the digital watermark embedding apparatus of the second embodiment. As shown in FIG. 17, the digital watermark embedding apparatus comprises a color component extraction means 101, registration signal embedding means 102, embedding position determination means 103, additional information embedding means 104, and color component synthesis means 105.

Image data I is input to the digital watermark embedding apparatus. This image data is a multilevel image data in which predetermined bits are assigned to each pixel. In this embodiment, the input image data I may be either grayscale image data or color image data. Grayscale image data has one element per pixel. Color image data has three elements per pixel. In this embodiment, the three elements are red, blue, and green components. However, the present invention can also be applied to a combination of different color components.

The image data I input to the digital watermark embedding apparatus is input to the color component extraction means 101 first.

When the input image data I is color image data, the color component extraction means 101 separates only the blue component from the color image data and outputs the component to the registration signal embedding means 102 on the output side.

The remaining color components are output to the color component synthesis means 105 on the output side. That is, only a color component in which digital watermark information is to be embedded is separated and sent to the digital watermark processing system.

In this embodiment, digital watermark information is embedded in the blue component. This is because the human eye is most insensitive to the blue component in the red, blue, and green components. Hence, when digital watermark information is embedded in the blue component, degradation in image quality due to the digital watermark information can hardly be perceived by the human eye, unlike a case wherein the digital watermark information is embedded in another color component.

When the input image data I is grayscale image data, the color component extraction means 101 temporarily converts the grayscale image data into pseudo color image data. The pseudo color image data is color image data having three elements per pixel. In this case, the three elements have the same value. The grayscale image data is converted into the pseudo color image data. The blue component is separated from the color image data and output to the registration signal embedding means 102.

The remaining color components are output to the color component synthesis means 105 on the output side. Thus, digital watermark information is embedded in the blue component, as in the above-described color image data.

A description will be made below possibly without discriminating the color image data from the grayscale image data. That is, the description will be made without discriminating the color image data from the pseudo color image data.

Next, the registration signal embedding means 102 will be described. A registration signal is a signal required to execute geometrical correction as pre-processing of digital watermark information extraction.

The image data of the blue component obtained by the color component extraction means 101 is input to the registration signal embedding means 102. The registration signal embedding means 102 embeds a registration signal in the image data using a kind of digital watermark technology. That is, the human eye cannot perceive the registration signal embedded in the image data. The method of embedding the registration signal will be described later in detail.

The registration signal embedding means 102 outputs the image data with the registration signal embedded.

The embedding position determination means 103 determines the embedding position of additional information Inf in the image data input from the registration signal embedding means 102.

The embedding position determination means 103 outputs control data representing the embedding position of the additional information Inf in the image to the additional information embedding means 104 together with the input image data.

The additional information embedding means 104 receives the additional information Inf (a plurality of bit information) in addition to the image data and control data. The additional information Inf is embedded at the determined embedding position in the image data of the blue component using the digital watermark technology. Embedding of the additional information Inf using the digital watermark technology will also be described later.

The additional information embedding means 104 outputs the image data with the additional information Inf embedded. The image data is input to the color component synthesis means 105.

The color component synthesis means 105 synthesizes the blue component processed on the input side (to the additional information embedding means 104) and the red and green components directly input from the color component extraction means 101 into normal color image data.

With the above processing, image data wI in which the registration signal and additional information Inf are embedded by the digital watermark technology is output.

In this embodiment, a description will be made assuming that attacks for generating various geometrical distortions are made against the image data wI. For example, the image is intentionally edited by the user, or after the image data wI is printed, the print is scanned with a scanner. Image data wI' shown in FIG. 18 is the attacked image data.

Figure 47:
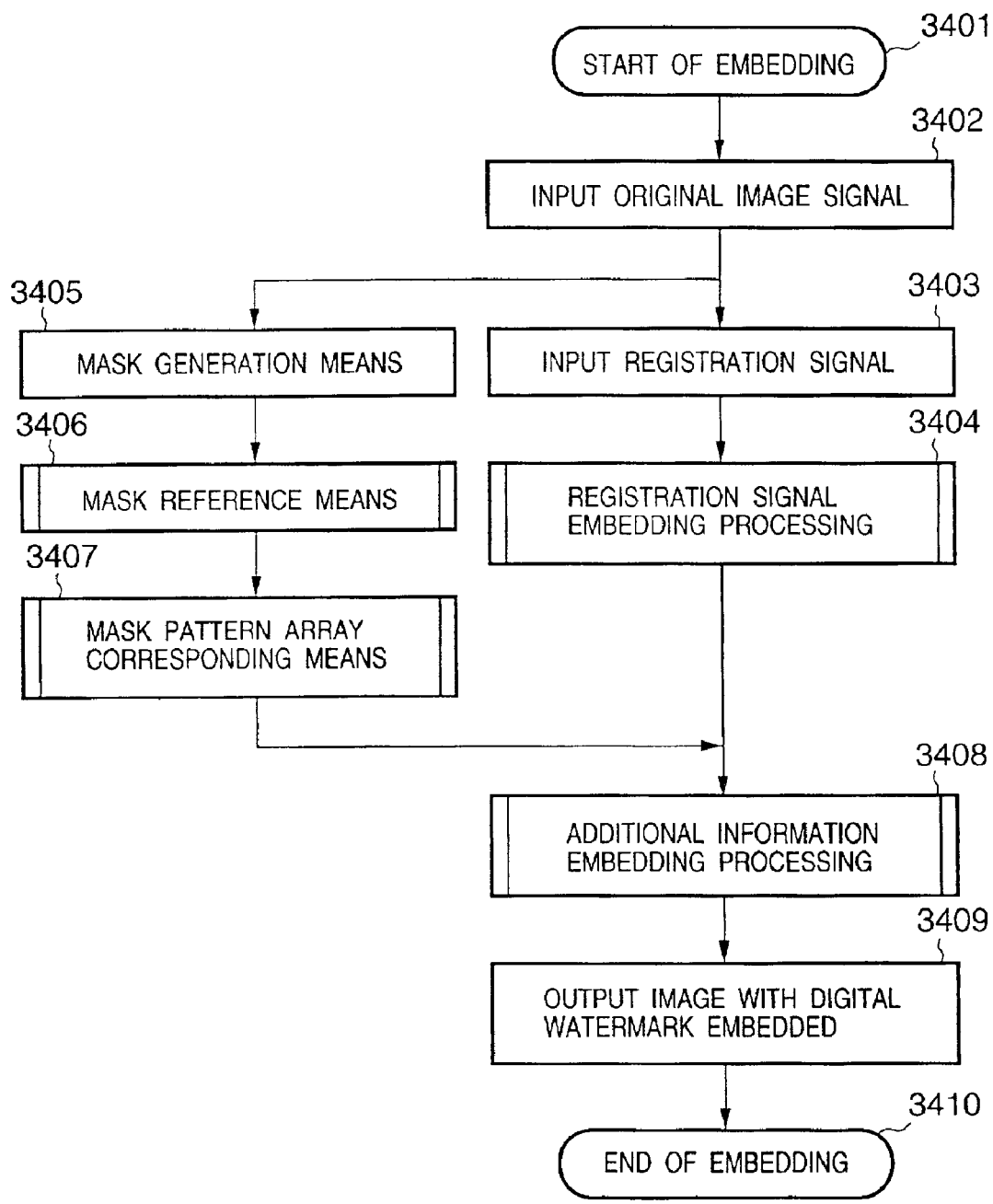
FIG. 47 is a flow chart for explaining the entire contents of digital watermark embedding processing.

The overall flow by the above-described means will be described with reference to a flow chart shown in FIG. 47.

First, in step 3402, the image data I is input to the color component extraction means 101. This process also includes reading a photograph or print with a scanner to generate image data. In addition, the blue component is separated and used to input a registration signal on the output side.

A registration signal is generated in step S403 and embedded in step 3404. The registration signal embedding processing in step 3404 corresponds to processing executed in the registration signal embedding means 102 shown in FIG. 17 and will be described later in detail.

A mask is generated in step 3405. The generated mask is input in step 3406 to define the relationship between the embedding position and bit information to be embedded. In step 3407, the mask is extended to an enlarged mask. This mask pattern array corresponding means will also be described later in detail.

In step 3408, the additional information Inf is embedded in the image data in which the registration signal is embedded in steps 3403 and 3404. In this additional information embedding processing, the additional information Inf is repeatedly embedded in the entire image in units of macro blocks. This processing will be described later in detail with reference to FIG. 26. A macro block means a minimum embedding unit. One complete additional information Inf is completely embedded in an image region corresponding to a macro block.

After the additional information Inf is embedded in the image data, the image data wI with the digital watermark information embedded is output in step 3409.

As described above, attacks for generating various geometrical distortions may be made against the image data wI before digital watermark extraction start processing in FIG. 48 (to be described later) is executed.

[2 Digital Watermark Extraction Apparatus]

The outline of a digital watermark extraction apparatus according to the second embodiment will be described next.

FIG. 18 is a block diagram showing the digital watermark extraction apparatus according to the second embodiment. As shown in FIG. 18, the digital watermark extraction apparatus comprises a color component extraction means 201, registration means 202, and additional information extraction means 203.

The image data wI' is input to the digital watermark extraction apparatus. The image data wI' may have received attacks against the image data wI to generate various geometrical distortions. The attacks include irreversible compression such as JPEG compression, scaling, rotation, printing & scanning, and a combination thereof.

Although the image data wI' and wI ideally have the same contents, actually, the two image data often have considerably different contents.

The color component extraction means 201 receives the image data wI', extracts the blue component, and outputs the image data of the blue component to the registration means 202 on the output side. The red and green components of the image data wI', except the blue component, are unnecessary and therefore are discarded.

The registration means 202 receives image data $wI_2'$ of the blue component obtained by the color component extraction means 201. Using the image data $wI_1'$ of the blue component, image data $wI_2'$ whose geometrical distortions are corrected is generated.

As described above, the image data wI' may have a scale different from that of the image data wI. However, the image data $wI_2'$ always has the same scale as that of the image data wI. The reason for this and processing of equalizing the scale of the image data $wI_2'$ to that of the image data wI will be described later in detail.

The registration means 202 outputs the image data $wI_2'$ to the additional information extraction means 203.

The additional information extraction means 203 can extract the digital watermark information embedded in the image data $wI_2'$ by performing predetermined processing corresponding to the embedding method of the additional information embedding means 104. The additional information extraction means 203 outputs the extracted additional information Inf.

The overall flow by the above-described means will be described with reference to a flow chart shown in FIG. 48. First, in step 3502, the image data wI' is input. The image data wI' is obtained by loading image data that is expected to be the image data wI from a network or memory, or scanning a print based on the image data wI with a scanner. In the latter case, the image data wI' is considerably different from the image data wI with a high possibility.

Only the blue component of the image data wI' is extracted and used in the next step.

In step 3503, the scale of the input image data $wI_1'$ of the blue component is corrected.

In step 3504, the offset of the input image data $wI_1'$ of the blue component is corrected.

Extraction processing using the first pattern array is executed in step 3506, and extraction processing using the second pattern array is executed in step 3505. The embedded additional information Inf is extracted from the image data $wI_2'$ whose scale and offset are already corrected.

In statistical authorization step 3507, the accuracy of the extracted digital watermark information is calculated and determined. If it is determined that the digital watermark information is incorrect, the flow returns to step 3502 to re-input an image which is supposed to have digital watermark information. If it is determined that the digital watermark information (additional information Inf) is extracted by comparison processing in step 3508. In step 3510, the information representing the accuracy is displayed as a reliability index D (to be described later).

[3 Detailed Description of Each Section]

Each section will be described next in detail.

Registration processing executed in step 3503 by the registration means 202 on the digital watermark extraction side will be described first.

Registration processing is pre-processing of digital watermark information extraction, which is executed to enable digital watermark information extraction from the image data wI' input to the digital watermark extraction apparatus. First, changes that may occur in image data processed by a printing system will be considered below. Registration processing for such changes will be examined, and registration processing for the printing system will be considered.

The digital watermark extraction apparatus does not always directly receive the image data wI output from the digital watermark embedding apparatus.

A case wherein the image data wI is printed by a YMCK inkjet printer, and the resultant print is scanned with a scanner will be exemplified.

If the output resolution of the printer is different from the input resolution of the scanner, the image data obtained by scanning has a scale different from that of the original color image data wI. Digital watermark information can be accurately extracted from the obtained image data wI' with a low possibility. Hence, a means capable of correcting the difference in scale must be prepared.

In this embodiment, since both the input resolution and output resolution are known, the scale ratio can be calculated. For example, when the output resolution is 600 dpi, and the input resolution is 300 dpi, the scale ratio of the image before printing to that after scanning is 2. In accordance with the calculated scale ratio, scaling is performed for the image data wI' using an appropriate scaling algorithm. With this processing, the image sizes of the image data wI and image data wI' can be represented by the same scale.

However, the output and input resolutions are not always known. If neither resolutions are known, the above-described method cannot be used. In this case, not only the means for correcting the difference in scale but also a means for detecting the scale ratio is necessary.

When the image data wI is processed by the printing system and input by scanning with a scanner, an image as shown in FIG. 19 is obtained. Referring to FIG. 19, an entire image 301 corresponds to the image represented by the image data wI'. The image data 301 is formed from an original image 302 represented by the image data wI and a white margin portion 303. If the user extracts the image using a mouse or the like, the margin portion changes.

The image representing the image data wI' obtained through the printing system always has the above-described problems. If the image data wI is processed by the printing system, these problems must be solved.

A case wherein image data is obtained after processing by the printing system is executed at least once before digital watermark extraction has been described above. Such a situation may also occur even by intentional editing.

The registration signal embedding means and registration means which are provided to solve the above problem when the ratio of input and output resolutions is unknown will be described below.

[3-1 Registration Signal Embedding Processing]

The registration signal embedding means 102 (step 3404) will be described first in detail.

The registration signal embedding means 102 is located on the input side of the additional information embedding means 104. This means 102 embeds, in the original image data in advance, a registration signal to be referred to for registration of the image data wI' by the registration means shown in FIG. 18. The registration signal is hard to perceive with the human eye as digital watermark information and embedded in the image data (blue component of color image data in this embodiment).

Figure 20:
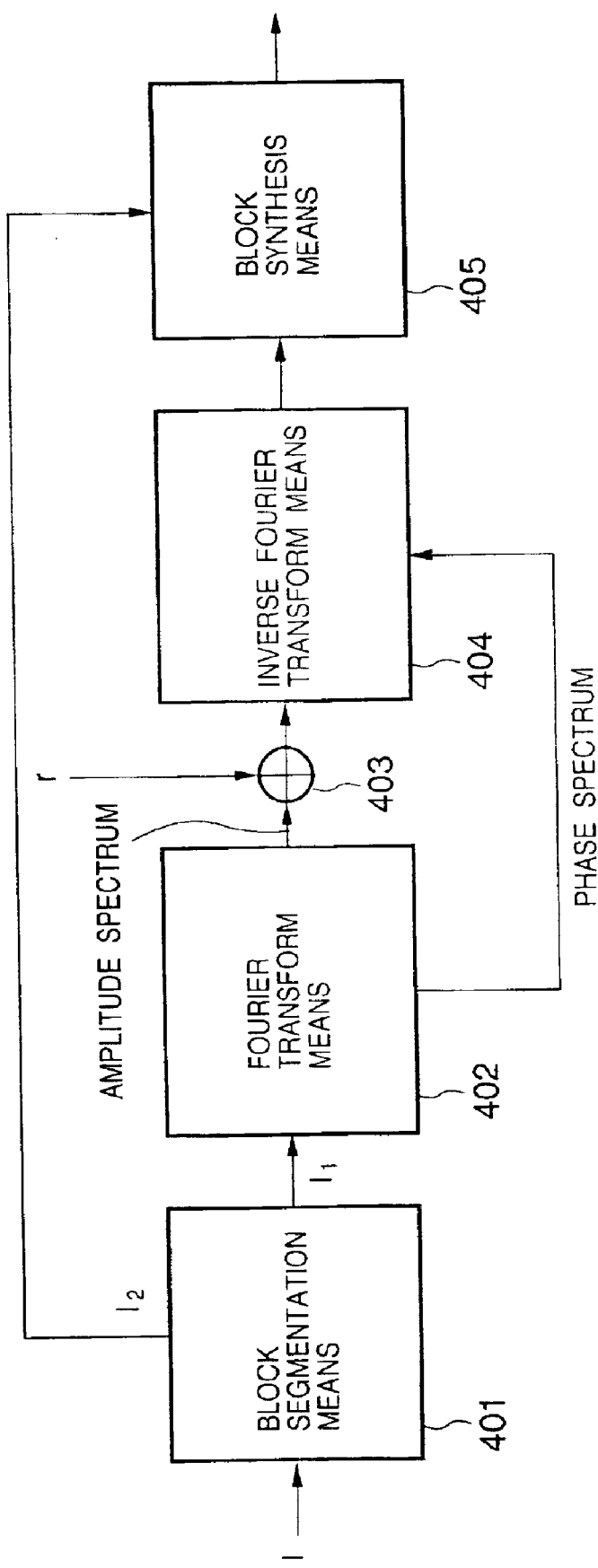
FIG. 20 is a block diagram showing a registration signal embedding means.

FIG. 20 is a block diagram showing the internal arrangement of the registration signal embedding means 102. The registration signal embedding means 102 comprises a block segmentation means 401, Fourier transform means 402, addition means 403, inverse Fourier transform means 404, and block synthesis means 405 shown in FIG. 20. Each means will be described below in detail.

The block segmentation means 401 segments the input image data into a plurality of blocks which do not overlap each other. In this embodiment, the block size is set to a power of 2. Actually, another size may be used. When the block size is a power of 2, the Fourier transform means 402 following the block segmentation means 401 can perform high-speed processing.

The blocks segmented by the block segmentation means 401 are divided into two sets $I_1$ and $I_2$. The set $I_1$ is input to the Fourier transform means 402 on the output side while the set $I_2$ is input to the block synthesis means 405 on the output side. In this embodiment, as the set $I_1$, one of the blocks obtained by the block segmentation means 401, which is located closest to the center of the image data I, is selected. All the remaining blocks are selected as the set $I_2$.

This is because this embodiment can be implemented using at least one block, and a smaller number of blocks shorten the processing time. However, the present invention is not limited to this and also incorporates a case wherein two or more blocks are selected as the set $I_2$.

The digital watermark embedding apparatus and digital watermark extraction apparatus must share the information of block size and blocks to be selected as a registration signal embedding target.

The part $I_1$ of the image data obtained by segmentation by the block segmentation means 401 is input to the Fourier transform means 402.

The Fourier transform means 402 executes Fourier transform for the input image data $I_1$. The original data form of the input image data $I_1$ is called a spatial domain while the data form after Fourier transform is called a frequency domain. Fourier transform is executed for all the input blocks. In this embodiment, since the size of the input block is a power of 2, fast Fourier transform is used to increase the processing speed.

Although Fourier transform requires a calculation amount for n×n times, fast Fourier transform is a transform algorithm which can be executed in a calculation amount (n/2) $\log_2(n)$ (n is a positive integer). Fast Fourier transform and Fourier transform are different only in the speed for obtaining the calculation result, and the same result is obtained by these calculations. Hence, in the description of this embodiment, fast Fourier transform and Fourier transform are not discriminated.

Image data in the frequency domain obtained by Fourier transform is represented by an amplitude spectrum and phase spectrum. Only the amplitude spectrum is input to the addition means 403. On the other hand, the phase spectrum is input to the inverse Fourier transform means 404.

The addition means 403 will be described next. The addition means 403 receives a signal r called a registration signal as well as the amplitude spectrum. An example of the registration signal is an impulse signal as shown in FIG. 21.

Figure 21:
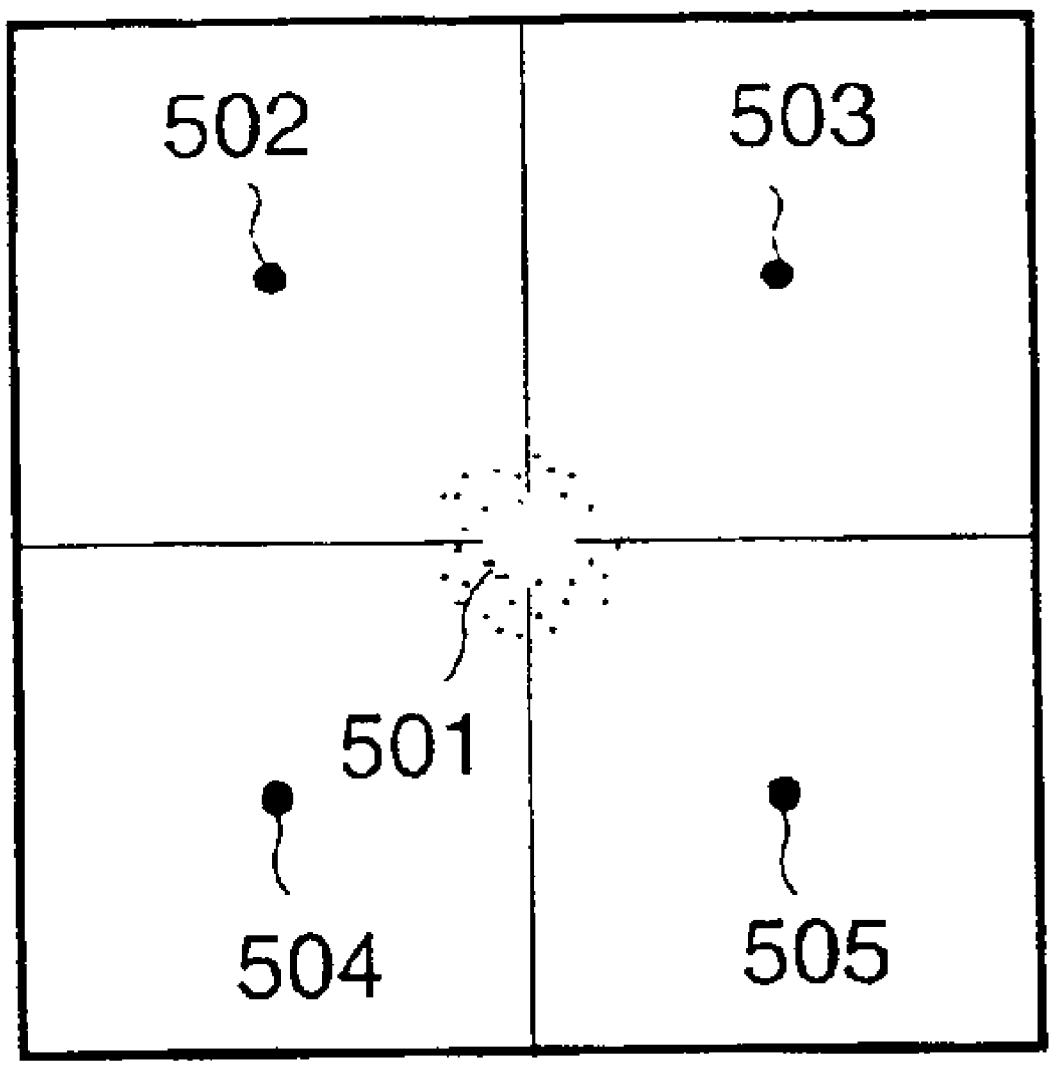
FIG. 21 is a view for explaining a registration signal.

FIG. 21 is a view showing the amplitude spectrum in two-dimensional radial frequency components obtained by Fourier transform. A low-frequency component is at the center, and high-frequency components are at the periphery. An amplitude spectrum 501 is the amplitude spectrum of signal components of the original image components. In a signal corresponding to a natural image such as a photograph, many large signals concentrate to the low-frequency region. On the other hand, almost no signals are present in the high-frequency region.

In this embodiment, a description will be made assuming that a series of processing operations are executed for a natural image. However, the present invention is not limited to this, and a document image or CG image can also be processed in the same way. However, this embodiment is especially effective in processing a natural image having a relatively large number of halftone components.

FIG. 21 shows an example of this embodiment in which impulse signals 502, 503, 504, and 505 are added to the horizontal/vertical Nyquist frequency components in the frequency domain of the original signal 501 of the natural image. As shown in this example, the registration signal is preferably an impulse signal. This is because only the registration signal can be easily extracted by the digital watermark extraction apparatus to be described later.

Although impulse signals are added to the Nyquist frequency components of the input signal in FIG. 21, the present invention is not limited to this. More specifically, any other signal can be used as far as the registration signal is not removed when the image with digital watermark information embedded has received an attack. As described above, irreversible compression such as JPEG compression has the low-pass filter effect. Hence, even when an impulse signal is embedded in a high-frequency component as an information compression target, the signal may be removed by compression/expansion processing.

On the other hand, when an impulse is embedded in a low-frequency component, the signal is readily perceived as noise due to the human visual characteristics, as compared to embedding in a high-frequency component. Hence, in this embodiment, the impulse signal is embedded in a frequency of intermediate level higher than the first frequency with which the signal is hardly perceived by the human eye and lower than the second frequency with which the signal is hardly removed by irreversible compression/expansion processing. This registration signal is embedded in each of blocks (one block in this embodiment) input to the addition means 403.

The addition means 403 outputs the signal obtained by adding the registration signal to the amplitude spectrum of the image data in the frequency domain to the inverse Fourier transform means 404.

The inverse Fourier transform means 404 executes inverse Fourier transform for the input image data in the frequency domain. This inverse Fourier transform is executed for all the input blocks. As in the Fourier transform means 402, since the size of the input block is a power of 2, fast Fourier transform is used to increase the processing speed. The signal in the frequency domain input to the inverse Fourier transform means 404 is converted into a signal in the spatial domain by inverse Fourier transform and output.

The image data in the spatial domain output from the inverse Fourier transform means 404 is input to the block combining means 405.

The block synthesis means 405 performs processing reverse to segmentation performed by the block segmentation means 401. As the result of processing by the block synthesis means 405, the image data (blue component) is reconstructed and output.

The registration signal embedding means 102 shown in FIG. 17 has been described above in detail.

The method of embedding a registration signal in the Fourier transform domain has been described with reference to FIG. 20. A method of embedding a registration signal in the spatial domain is also available. This method will be described with reference to FIG. 45.

Figure 45:
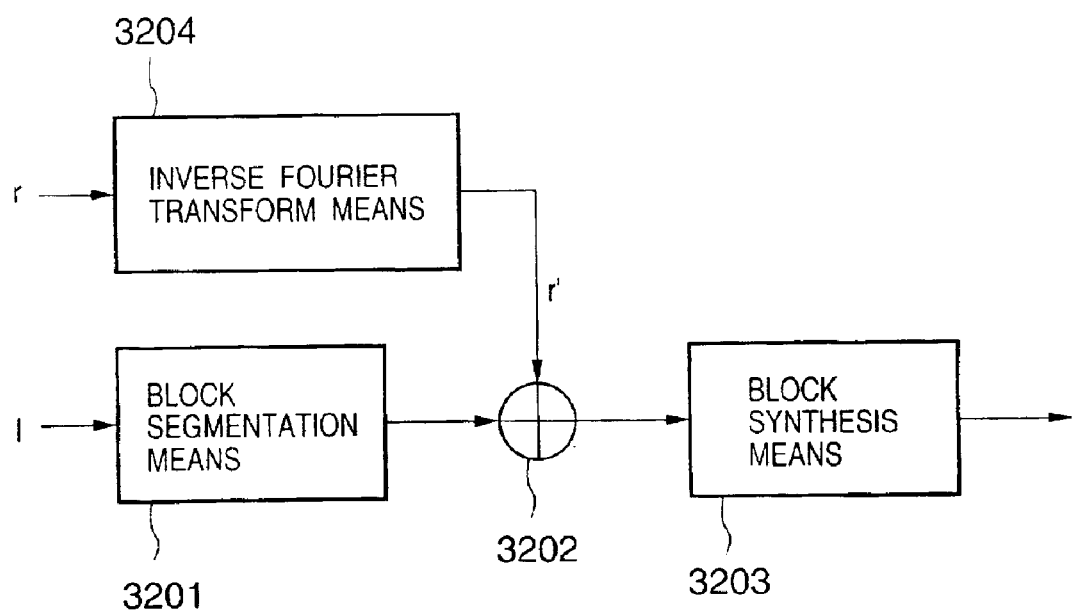
FIG. 45 is a block diagram showing a registration signal embedding means in a spatial region.

The means shown in FIG. 45 comprises a block segmentation means 3201, addition means 3202, block synthesis means 3203, and inverse Fourier transform means 3204.

The block segmentation means 3201 and block synthesis means 3203 perform the same operations as those of the block segmentation means 401 and block synthesis means 405 in FIG. 20. Image data input to the registration signal embedding means 102 is input to the block segmentation means 3201 and segmented. A block obtained is input to the addition means 3202. The registration signal r is input to the inverse Fourier transform means 3204 and converted into a signal r' by inverse Fourier transform. The registration signal r is a signal on the frequency domain, like that shown in FIG. 21. The block from the block segmentation means 3201 and the signal r' from the inverse Fourier transform means 3204 are input to the block synthesis means 3203 and added. The signal output from the addition means 3202 is input to the block synthesis means 3203. The image data (blue component) is reconstructed and output.

The means shown in FIG. 45 performs the same processing as that by the means shown in FIG. 20 in the spatial domain. Since no Fourier transform means is required, unlike the means shown in FIG. 20, high-speed processing is possible.

Referring to FIG. 45, the signal r' is a signal independent from the input image data I. Hence, the signal r' can be generated in advance instead of calculating the signal r', i.e., executing processing by the inverse Fourier transform means 3204 every time input image data I is input. In this case, the registration signal can be embedded at a higher speed by omitting the inverse Fourier transform means from the means shown in FIG. 45. Registration processing of referring to the registration signal will be described later.

<<Patchwork Method>>

This embodiment uses a principle called a patchwork method to embed the additional information Inf. The principle of patchwork method will be described first.

In the patchwork method, the additional information Inf is embedded by generating a statistical bias.

Figure 46:
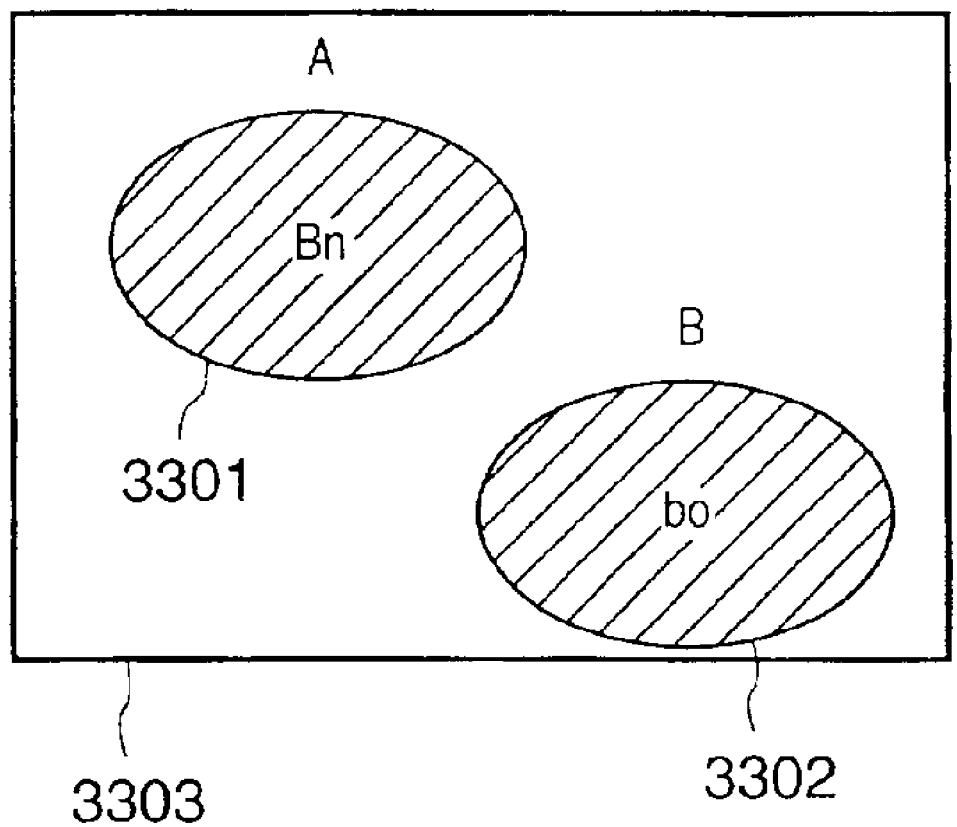
FIG. 46 is a view for explaining two sets in a patchwork method.

This will be described with reference to FIG. 46. Referring to FIG. 46, reference numerals 3301 and 3302 denote subsets of pixels; and 3303, an entire image. Two subsets A 3301 and B 3302 are selected from the entire image 3303.

The additional information Inf can be embedded by the patchwork method of this embodiment as long as the two selected subsets do not overlap each other. However, the size or selection method for the two subsets largely influences the resilience of additional information Inf embedded by the patchwork method, i.e., the strength for preventing the additional information Inf from missing when an attack is made against the image data wI. This will be described later.

Let $\{a1, a2, \ldots, aN\}$ be the value of an element of the selected subset A and $\{b1, b2, \ldots, bN\}$ be the value of an element of the subset B. More specifically, the values $\{a1, a2, \ldots, aN\}$ and $\{b1, b2, \ldots, bN\}$ are the values of pixels (corresponding to the value of the blue component in color image data, in this embodiment) included in the subsets.

An index d is defined.

$$d = 1/N \Sigma (a_1 - b_1)$$

This value represents the expectation value of the difference in pixel value between the two sets.

When, for a general natural image, an appropriate subset A and subset B are selected, and the index d is defined, $$d \approx 0$$

The index d will be referred to as a reliability distance d hereinafter.

On the other hand, as an operation of embedding each bit of the additional information Inf, operations represented by $$a'_i = a + c$$
$$b'_i = b_i - c$$

are performed. These are operations of adding a value c to all elements of the subset A and subtracting the value c from all elements of the subset B.

As in the above-described case, the subset A and subset B are selected from the image with the additional information Inf embedded, and the index d is calculated.

Then, $$\begin{aligned} d &= 1/N \sum (a' - b') \\ &= 1/N \sum \{(a_i + c) - (b_i - c)\} \\ &= 1/N \sum (a_i - b_i) + 2c \\ &\approx 2c \end{aligned}$$

The index d is not 0.

More specifically, the reliability distance d is calculated for a given image. If d≅0, it can be determined that the additional information Inf is not embedded. If the reliability distance d has a value separated from 0 by a predetermined amount or more, it can be determined that the additional information Inf is embedded.

The basic concept of patchwork method has been described above.

Using this principle of patchwork method, a plurality of bit information are embedded in this embodiment. In this method, the method of selecting the subset A and subset B is also defined by a pattern array.

In the above-described method, the additional information Inf is embedded by adding or subtracting the element of a pattern array to or from a predetermined element of the original image.

Figure 25:
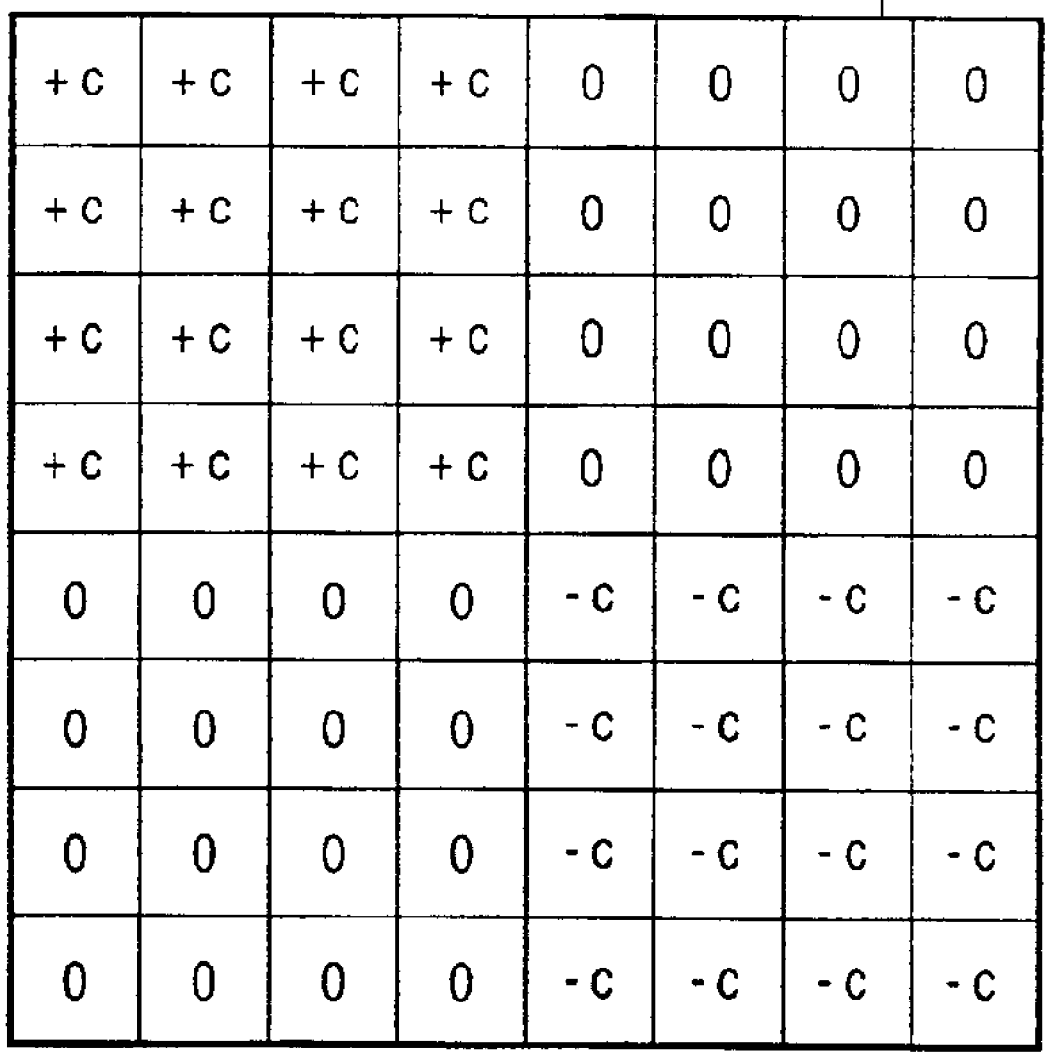
FIG. 25 is a view showing a mask pattern array used to embed and extract additional information.

FIG. 25 is a view showing a simple example of the pattern array. FIG. 25 shows a pattern array used to refer to 8×8 pixels in embedding one bit, which indicates the amounts of changes in pixel values from the original image. As shown in FIG. 25, the pattern array has array elements having a positive value, red components having a negative value, and array elements having a value "0".

In the pattern shown in FIG. 25, positions represented by array elements "+c" indicate positions where pixel values at corresponding positions are increased by c. These positions correspond to the above-described subset A. Positions represented by array elements "−c" indicate positions where pixel values at corresponding positions are decreased by c. These positions correspond to the above-described subset B. Positions represented by array elements "0" indicate positions except the above-described subsets A and B.

In this embodiment, not to change the entire density of the image, the number of array elements with the positive value is made equal to the number of array elements with the negative value. That is, in one pattern array, the sum of all array elements is 0. This condition is essential for operation of extracting the additional information Inf (to be described later).

Each bit information of the additional information Inf is embedded using the above pattern array.

In this embodiment, the pattern shown in FIG. 25 is laid out in different regions of the original image data a plurality of number of times to increase/decrease the pixel values, thereby embedding a plurality of bit information, i.e., additional information Inf. In other words, not only the combination of the subsets A and B but also a plurality of combinations including the combination of subsets A' and B', combination of A" and B", . . . are assumed in different regions of one image, thereby embedding the additional information Inf formed from a plurality of bits.

In this embodiment, when the original image data is large, the additional information Inf is repeatedly embedded. This is because the patchwork method uses a statistical nature, and a sufficient number of information are necessary for the statistical nature to appear.

In this embodiment, to prevent regions where the pixel values are to be changed to embed a plurality of bits from overlapping each other, the relative positions between the bits for use of the pattern array are determined in advance. More specifically, the relationship between the pattern array position at which the first bit information of the additional information Inf is to be embedded and the pattern array at which the second bit information is to be embedded is appropriately defined.

For example, if the additional information Inf is constructed by 16 bits, the positional relationship between the 8×8 pixel pattern arrays of the first to 16th bits is relatively given such that degradation in image quality is reduced in a region larger than 32×32 pixels.

When the image data is large, the additional information Inf (each bit information of the additional information Inf) is repeatedly embedded as many times as possible. This aims at accurately extracting each bit of the additional information Inf. Especially, in this embodiment, this repetition is important because statistical measurement is performed using the fact that the same additional information Inf is repeatedly embedded.

The above-described embedding position selection is executed by the embedding position determination means 103 shown in FIG. 17. The operation of this embedding position determination means will be described next.

[3-2 Embedding Position Determination Processing]

Figure 27:
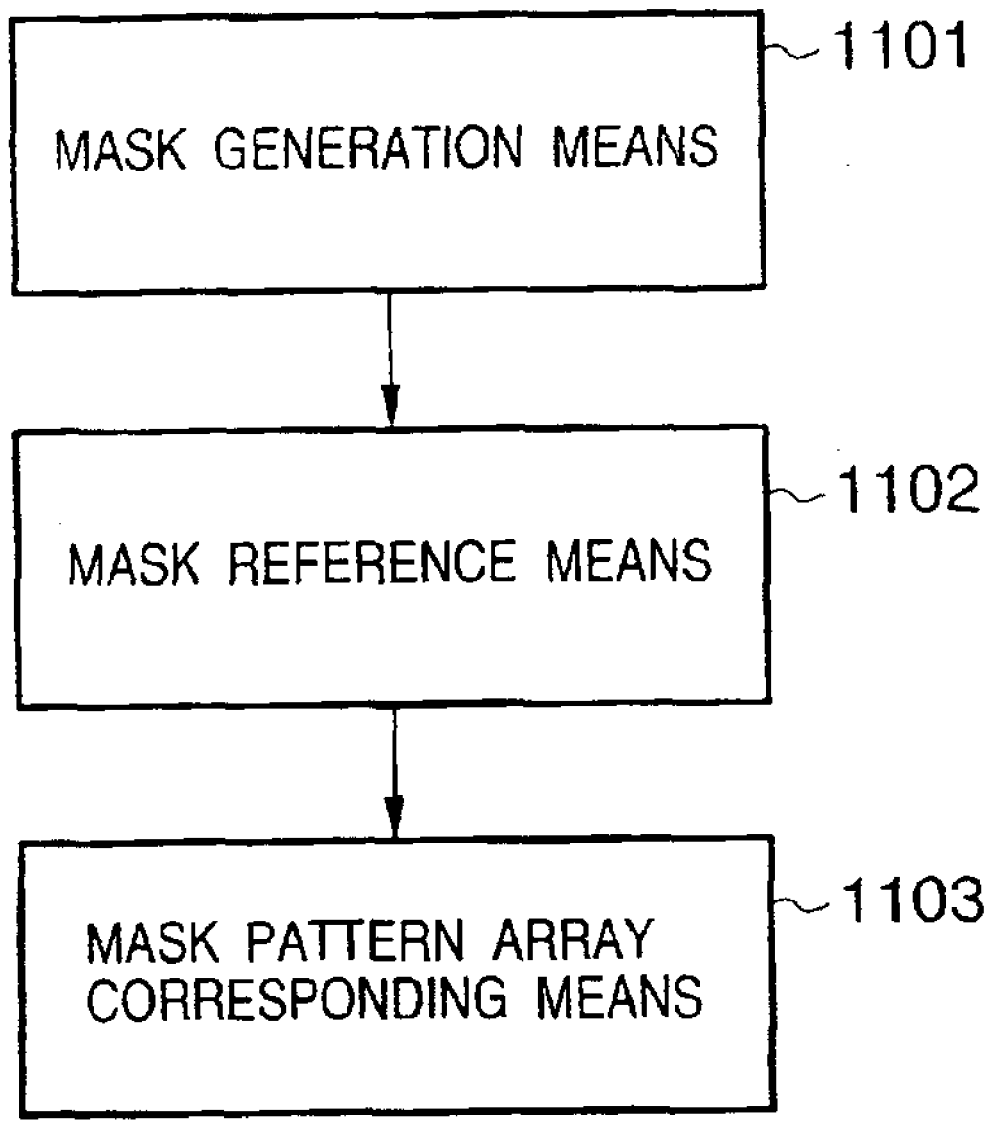
FIG. 27 is a block diagram showing an embedding position determination means.

FIG. 27 is a block diagram showing the internal arrangement of the embedding position determination means 103.

A mask generation means 1101 shown in FIG. 27 generates a mask for defining the embedding position of each bit information of the additional information Inf. The mask is a matrix having position information for defining the relative layout of the pattern array (FIG. 25) corresponding to each bit information.

Figures 33A, 33B:
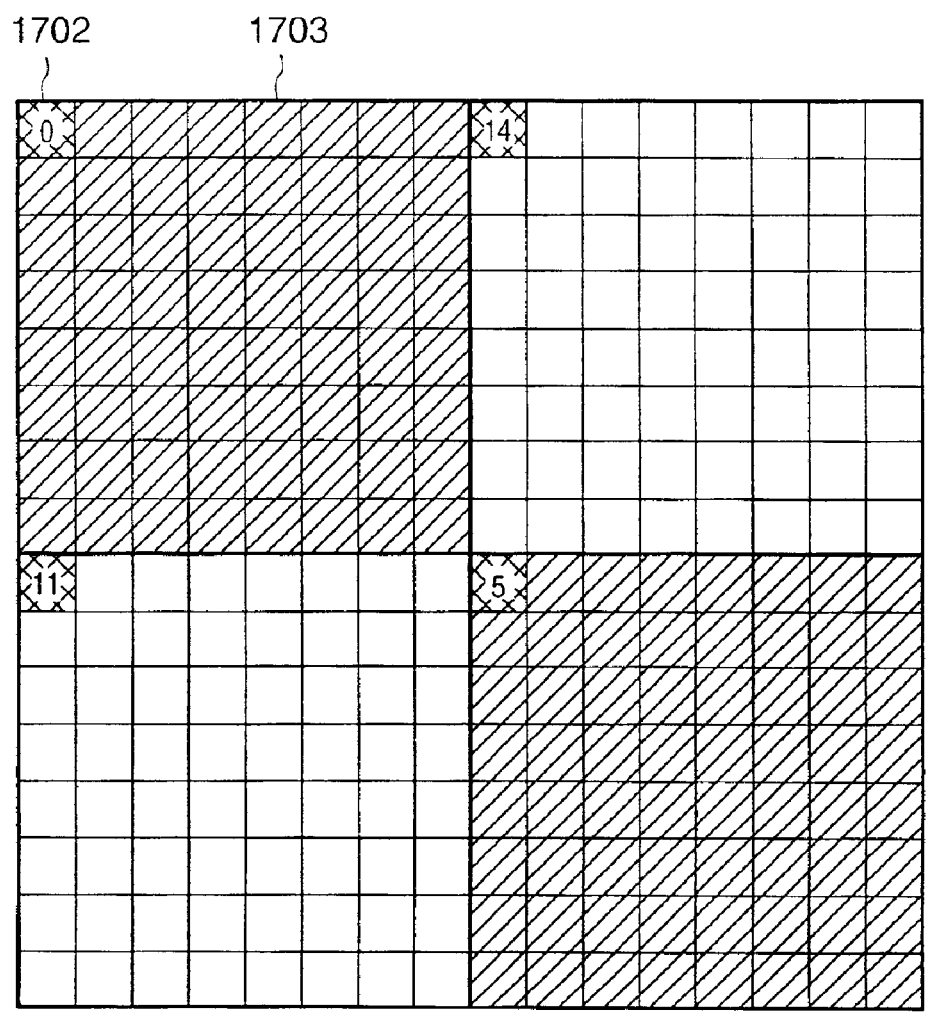
FIGS. 33A and 33B are views showing a state wherein the pattern array is bitmapped on the mask shown in FIG. 32.

FIG. 33A shows an example of a mask 1701. Coefficient values are assigned in the mask. The coefficient values have the same appearance frequency in the mask. When this mask is used, the additional information Inf having 16 bits at maximum can be embedded.

A mask reference means 1102 loads the mask generated by the mask generation means 1101 and makes each coefficient value in the mask correspond to information representing the ordinal number of each bit information, thereby determining the pattern array layout for embedding each bit information.

A mask pattern array corresponding means 1103 bitmaps the array elements (8×8 size) of each pattern array at the position of each coefficient value in the mask. More specifically, each coefficient value (one cell) of the mask shown in FIG. 33A is extended to 8×8 times, as shown in FIG. 33B, such that the mask can be referred to as the embedding position of each pattern array.

The additional information embedding means 104 (to be described later) refers to embedding start coordinates 1702 shown in FIG. 33B and embeds each bit information using the pattern array.

In this embodiment, the mask is generated every time image data (blue component) is input to the mask generation means 1101. Hence, when image data with a large-size is input, the same additional information Inf is repeatedly embedded a plurality of number of times.

In the above method, the mask arrangement (array of coefficient values) functions as a key for embedding the additional information Inf from the image. That is, only a key holder can extract the information.

The present invention also incorporates a case wherein instead of generating a mask in real time, a mask generated in advance is stored in, e.g., the internal storage means of the mask generation means 1101 and loaded as needed. In this case, the operation can quickly shift to subsequent processing.

Each processing executed in the embedding position determination means 103 will be described next in detail.

[3-2-1 Mask Generation Means]

The mask generation means 1101 will be described first.

In embedding the additional information Inf using the patchwork method, if the information is embedded by largely manipulating pixel values to increase the resistance against attacks (for example, when the value c in the pattern array is set to be large), degradation in quality of the image represented by the original image data is relatively inconspicuous at a so-called edge portion where the pixel value abruptly changes. However, at a flat portion where the change in pixel value is small, the portion manipulated in its pixel value becomes conspicuous as noise.

Figure 29:
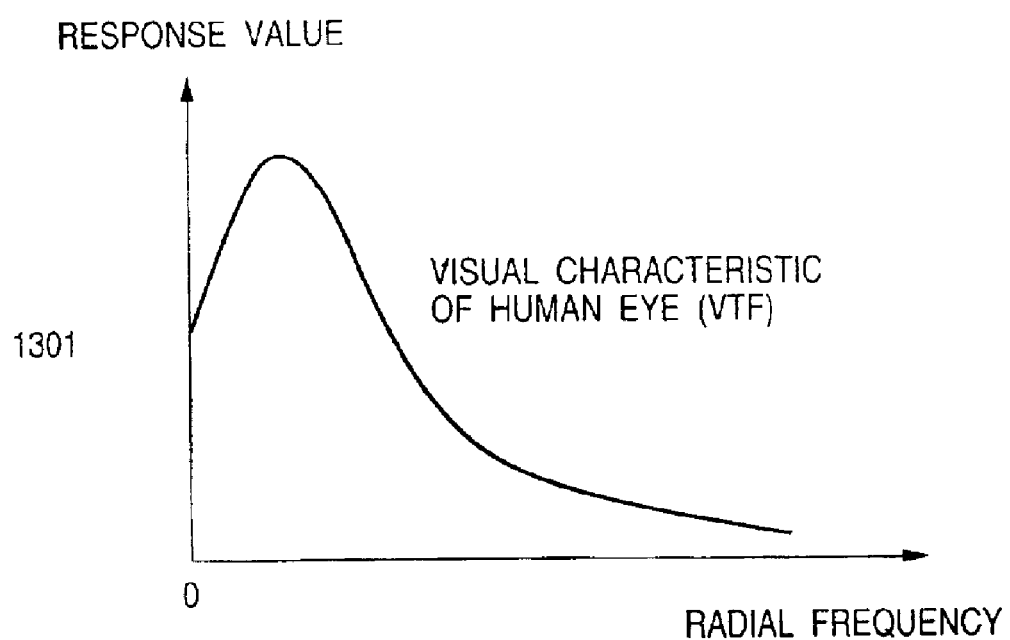
FIG. 29 is a graph showing the radial frequency characteristic of the human eye.

FIG. 29 is a graph showing the radial frequency characteristic perceived by the human eye. The abscissa represents the radial frequency, and the ordinate represents the visual response value. As is apparent from FIG. 29, when pixel values are manipulated to embed information, degradation in image quality is conspicuous in the low-frequency region where the sensitivity of the human eye is high.

For this reason, in the second embodiment, the pattern corresponding to each bit is laid out in consideration of the characteristics of a blue noise mask or cone mask normally used to binarize a multilevel image.

The characteristics of a blue noise mask and cone mask will be briefly described.

First, the characteristics of a blue noise mask will be described.

As a characteristic of a blue noise mask, a blue noise pattern is always obtained independently of the threshold value used for binarization. The blue noise pattern exhibits a frequency characteristic in which the radial frequency has a bias in the high-frequency region.

FIG. 53 is a view showing part of a blue noise mask.

Figure 30A:
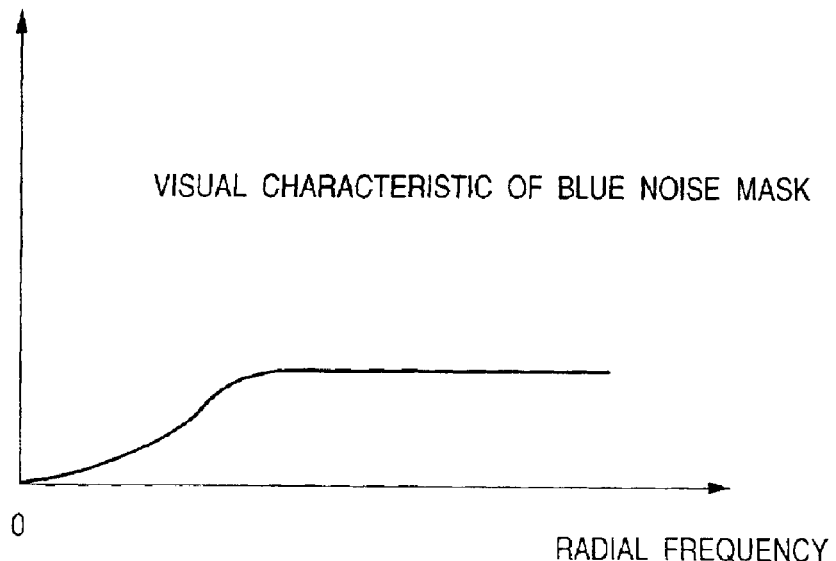
FIGS. 30A and 30B are graphs showing the radial frequency characteristics of the blue noise mask and cone mask, respectively.

FIG. 30A is a graph schematically showing the radial frequency characteristic of a blue noise mask binarized using a threshold value "10".

The abscissa in the graph shown in FIG. 30A indicates the radial frequency that represents the distance from the origin (DC component) for Fourier transform of the blue noise mask. The ordinate indicates a power spectrum which is a value obtaining by calculating and averaging the square-sum of amplitude components at distances represented by the radial frequencies on the abscissa. The graph of FIG. 30A one-dimensionally shows the two-dimensional frequency characteristic of an image to help understanding.

As compared to FIG. 29, since the blue noise mask has a bias in the high-frequency component and is therefore hardly perceived by the human eye. As is known, when an inkjet printer will express the grayscale of a multilevel image by area grayscale using dots, the radial frequency components are biased to the high-frequency region using a blue noise mask, thereby inconspicuously expressing the area grayscale.

An example of a blue noise mask generation process will be described next.

1. White noise is generated.
2. A binary image $P_{g1}$ (initial value is a white-noise mask) with grayscale level g is passed through a low-pass filter to generate a multilevel image $P'_{g1}$.
3. An image with grayscale level g (initial value: 127) is compared with the image $P'_{g1}$ (multilevel) passed through the low-pass filter. The white and black pixels of the binary image Pg are inverted in descending order of magnitudes of errors, thereby obtaining a binary image $P_{g1}$.
4. Operations 2 and 3 are repeated until the error is minimized, thereby gradually changing the binary image $P_{g1}$ (initial value is a white-noise mask) to the binary image $P_g$ (blue noise mask) with grayscale level g (initial value: 127).
5. A binary black (white) dot with grayscale level g+1 (g−1) is given to a random position of the image $P_g$, and operations 2 and 3 are repeated to obtain $P_{g+1}$ ($P_{g-1}$).

By repeating the above operation, blue noise masks for all grayscale levels are generated to generate a dither matrix.

For example, in a 32×32 blue noise mask, the number of points increases (decreases) by four in units of grayscale levels.

However, black (white) bits determined on the basis of the previous grayscale level g cannot be inverted to obtain 256 grayscale levels. For this reason, restriction conditions become serious for a low or high grayscale level, and only a nonuniform random pattern is obtained.

Figure 28:
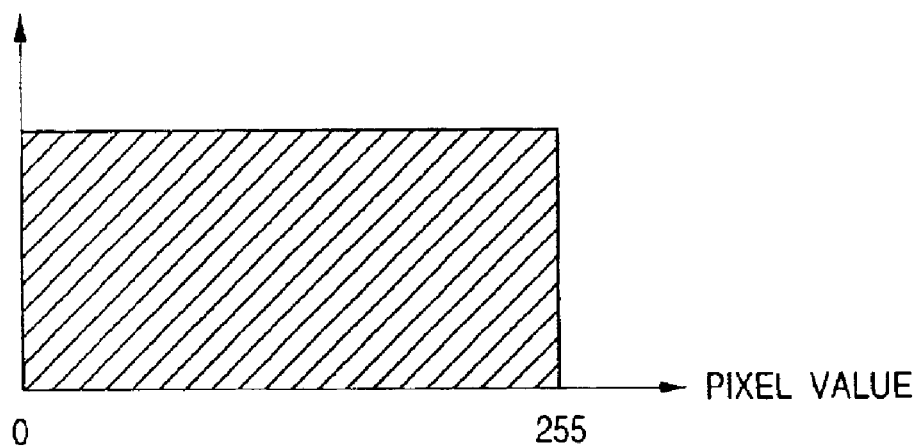
FIG. 28 is a graph showing the appearance frequency distribution of coefficient values of a cone mask or blue noise mask.

FIG. 28 is a graph showing the appearance frequency distribution (histogram) of coefficients of a blue noise mask. Referring to FIG. 28, all values (coefficients) "0" to "255" are present in the same number in the mask.

A technique using a blue noise mask to binarize a multilevel image is well known. This technique is disclosed in detail in, e.g., Tehophano Mitsa, Kevin J. Parker, "Digital halftoning technique using a blue noise mask, J. Opt. Soc. Am A/Vol. 9, No. 11/November 1992.

The characteristics of a cone mask will be described next.

Figure 30B:
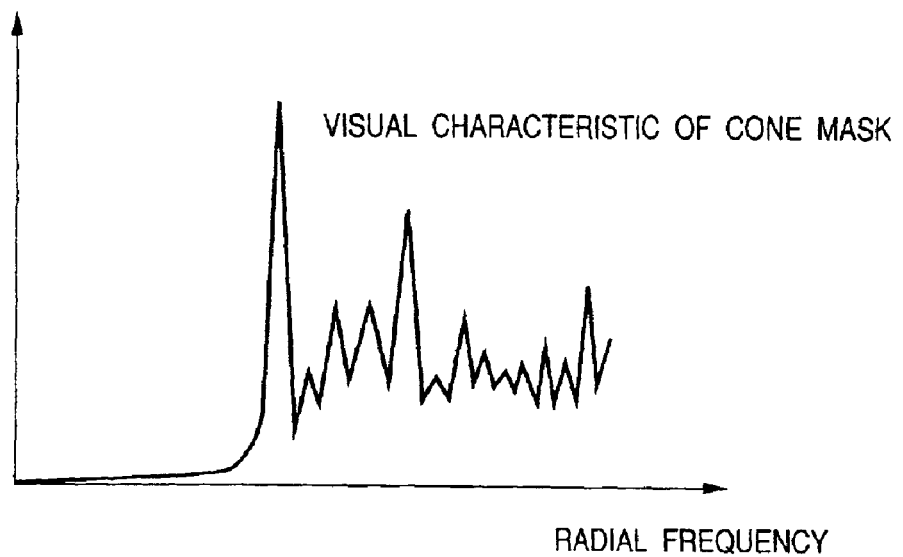

As one characteristic feature of a cone mask, when coefficients included in this mask are binarized, periodical or pseudo-periodical peaks are generated on a radial frequency region representing the resultant binary information, as shown in FIG. 30B. However, the cone mask is designed to have no peaks in the low-frequency region.

FIG. 54 is a view showing part of the coefficient array of a cone mask.

Since an appropriate distance is maintained between dots independently of the threshold value used to binarize the cone mask, no peaks are generated in the low-frequency region.

FIG. 30B is a graph schematically showing the radial frequency characteristic of a cone mask binarized using a threshold value "10". Like the radial frequency characteristic of the blue noise mask shown in FIG. 30A, the characteristic shown in FIG. 30B also has a small number of low-frequency components.

In the cone mask, since peaks are generated from frequencies higher than the low frequency of a blue noise mask independently of whether the threshold value is large or small, the number of dense embedding positions is smaller than that in the blue noise mask. For this reason, embedded noise generated when the additional information Inf is embedded is more unnoticeable than blue noise.

The use frequency of coefficients of the cone mask also exhibits the appearance frequency distribution (histogram) shown in FIG. 28, as in the blue noise mask.

When a pattern corresponding to each bit information of the additional information Inf is embedded in image data in correspondence with each coefficient of the mask, patterns equal in number to the bit information can be arranged in the image data. As a consequence, the embedded additional information Inf can be balanced.

In the second embodiment, a cone mask is used as an embedding reference mask because of the above advantages.

[3-2-2 Mask Reference Means]

The mask (cone mask) generated y the mask generation means 1101 is input to the mask reference means 1102.

The mask reference means 1102 makes the embedding positions of the N-bit information to be embedded in the image correspond to the mask numbers (pixel values), thereby determining the embedding positions.

A method of determining the embedding position by the mask reference means 1102 will be described.

In this embodiment, the above-described cone mask is used. For the descriptive convenience, a 4×4 mask 1501 shown in FIG. 31 is used.

Figure 31:
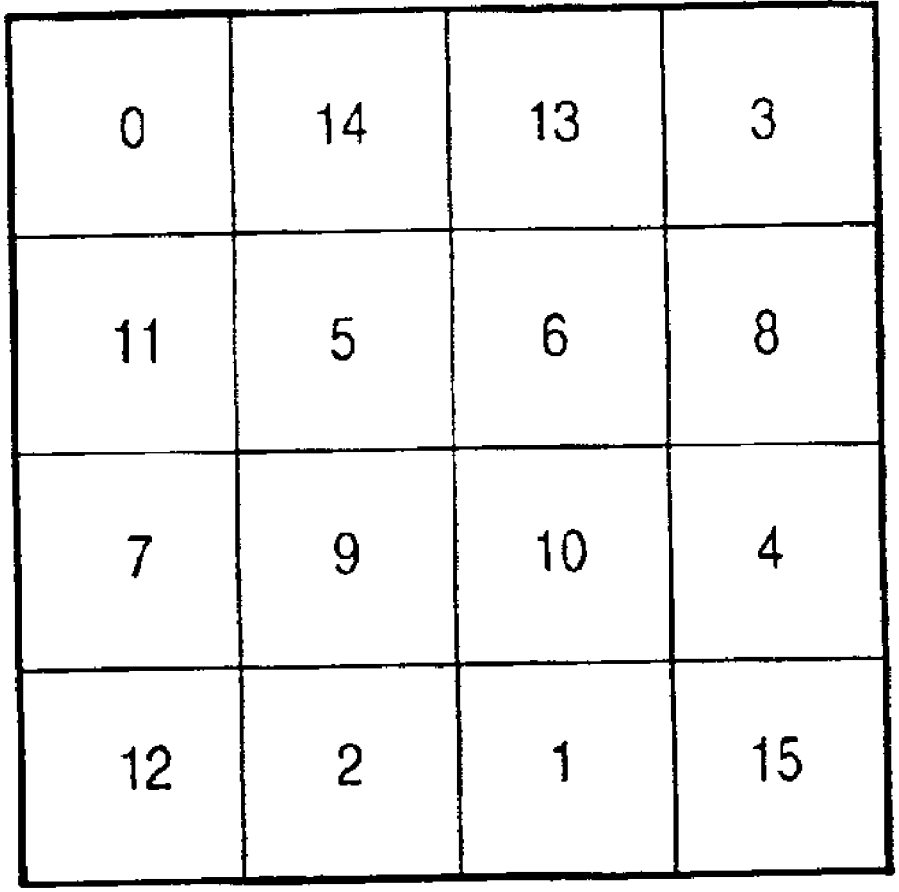
FIG. 31 is a view for explaining a position reference mask.

The mask shown in FIG. 31 has 4×4 coefficients. That is coefficients "0" to "15" are laid out one by one. The embedding position of the additional information Inf is referred to using the 4×4 mask. For the mask used for this description, the additional information Inf having 16 bits at maximum can be embedded. However, a description will be made below assuming that the additional information Inf having 8 bits is to be embedded.

Figure 52:
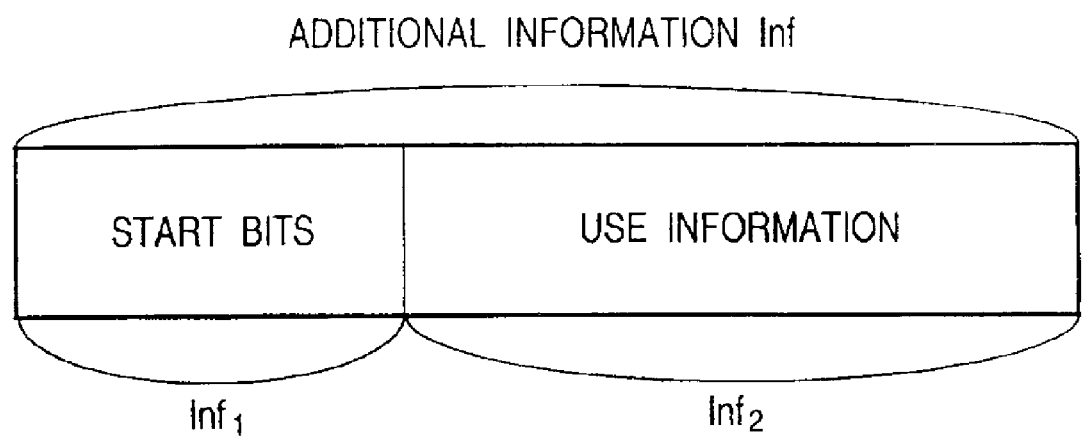
FIG. 52 is a view showing the structure of the additional information Inf.

The structure of the additional information Inf will be described first with reference to FIG. 52. As shown in FIG. 52, the additional information Inf is formed from start bits $Inf_1$ and use information $Inf_2$.

The start bits $Inf_1$ are used by an offset matching means included on the digital watermark extraction apparatus side to recognize the shift of the actual embedding position of the additional information Inf from an ideal position and accordingly correct the extraction start position of the digital watermark (additional information Inf). This will be described later in detail.

The use information $Inf_2$ is used as the actual additional information, i.e., information to be actually used as additional information of the image data I. For example, to track the cause for illicit use of the image data wI, the ID of the apparatus shown in FIG. 17 or user ID is contained in this use information. To inhibit copy of the print of the image data wI, control information representing that copy is inhibited is contained in the use information.

In this embodiment, the start bits contain five bits "11111". However, the present invention is not limited to this, and bits in number other than five of the additional information may be used as the start bits. In addition, a bit sequence other than "11111" may be used. However, the number of bits in the start bits and the bit sequence must be shared by the digital watermark embedding apparatus and digital watermark extraction apparatus.

A simple case wherein the additional information Inf formed from five start bits and 3-bit use information or a total of eight bits is to be using the above-described cone mask with 4×4 coefficients will be described.

However, the present invention is not limited to this. For example, the present invention can also be applied to a case wherein the additional information Inf formed from five start bits and 64-bit use information or a total of 69 bits is to be embedded using a 32×32 cone mask.

Assume that the additional information Inf contains five start bits "11111" and use information having three bits "010". The first, second, third, fourth, fifth, sixth, seventh, and eighth bit data have values , "1", "1", "1", "1", "1", "0", "1" and "0", respectively.

A pattern (FIG. 25) corresponding to each bit is assigned to a corresponding one of the coefficients of the cone mask. On the basis of the positional relationship, each pixel of the original image data is changed by ±c. Thus, one additional information Inf is embedded in the original image data having a size corresponding to one cone mask.

In this embodiment, a threshold value is determined on the basis of the minimum necessary number of bits for embedding the additional information Inf. Each bit information is embedded at a corresponding one of the positions where coefficients equal to or smaller than the threshold value are laid out. With this processing, one additional information Inf is embedded in one cone mask independently of the number of bits of the additional information Inf.

The present invention is not limited to the above method. Instead, each bit information may be embedded at a corresponding one of the positions where coefficients equal to or larger than a given threshold value are laid out, and the threshold value may be determined on the basis of this processing.

In this embodiment, the ratio of the number of coefficients equal to or smaller than the threshold value used for embedding to the total number of coefficients in the mask will be called an embedding filling rate.

To accurately embed the 8-bit additional information Inf an integer multiple number of times, the threshold value for determining a coefficient that is to be used as an embedding reference position in the mask 1501 shown in FIG. 31 must be 8 or 16. As this threshold value, an optimum value is determined in consideration of the influence to the resilience and image quality.

When the threshold value of the mask is 8, the embedding filling rate is 50%. That is, 50% of the original image data collated with the mask is subjected to processing using the pattern array shown in FIG. 25.

Table 1 shows an example of the correspondence between bit information and coefficients in a mask.

TABLE 1

| Order of Bit Information To Be Embedded | S1 | S2 | S3 | S4 | S5 | 1 | 2 | 3 |
|---|---|---|---|---|---|---|---|---|
| Coefficients in Mask | 0 | 1 | 2 | 3 | 4 | 5 | 6 | 7 |

S1 to S5 are pieces of bit information (start bits) used by the offset matching unit for positioning, and 1 to 3 are three bits of use information.

Figure 32:
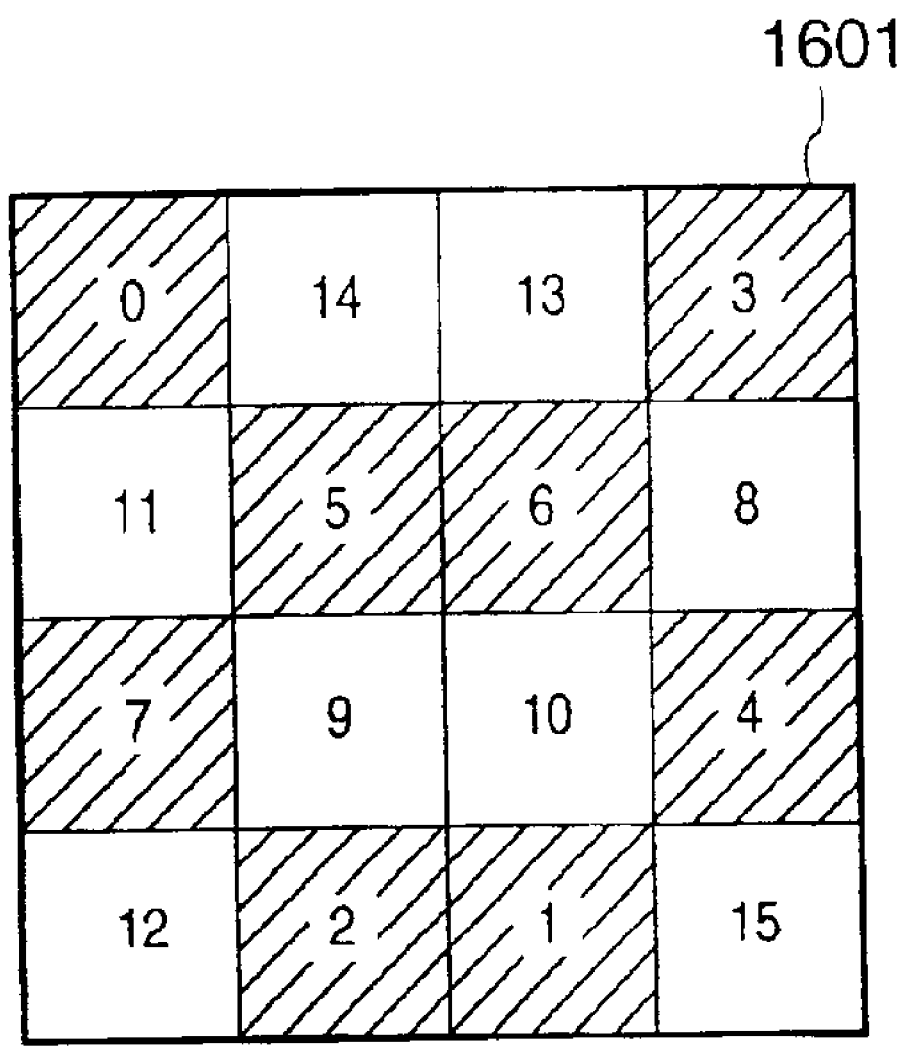
FIG. 32 is a view showing embedding positions in the position reference mask.

According to the correspondence shown in Table 1, the pieces of bit information are embedded, using a pattern (FIG. 25), at the pixel positions in the input image data in correspondence with the position of coefficients (0 to 7) represented by 1601 in FIG. 32. The correspondence between the order of bit information to be embedded and the coefficient values in the mask is one of key information. Each bit information cannot be extracted without knowing the correspondence. In this embodiment, for the descriptive convenience, the start bits S1 to S5 and the three bits of use information are made to correspond to the coefficient values from 0 to the threshold value, as shown in Table 1.

The filling rate for actually embedding using a 32×32 cone mask will be briefly described next. The processing procedure is the same as in use of the mask 1501.

First, in consideration of degradation in image quality in embedding, a threshold value necessary for accurately embedding the additional information Inf an integer multiple number of times is determined.

To repeatedly embed the bit information of the additional information Inf in the same repetitive number of times, the number of coefficients equal to or smaller than the threshold value is divided the number N of bits forming the additional information Inf, thereby determining the number of times for embedding each bit in one mask size.

For example, to embed the above-described 69-bit additional information Inf having five start bits and 64-bit use information in original image data corresponding to coefficient values 0 to 255, the threshold value is set to, e.g., 137.

In this case, the number of effective coefficient values in the mask is 138. Since the number of bits necessary for expressing one additional information Inf is 69, each bit information can be embedded twice (=138/69) in one mask size.

In determining the embedding positions using the cone mask, pieces of bit information are embedded at all points with coefficient values equal to or smaller than a certain threshold value so as to exploit the characteristic of the cone mask in which no peaks are generated in the low-frequency components of the radial frequency.

When the embedding positions are determined in the above-described way, consequently, the embedding filling rate is 50%, and the embedded information amount is 69 bits. In this case, a relationship as shown in Table 2 holds between the bit information of the additional information Inf and the coefficient values in the cone mask.

TABLE 2

| Order of Bit Information To Be Embedded | S1 | S2 | S3 | S4 | S5 | 1 | 2 | ... | 64 |
|---|---|---|---|---|---|---|---|---|---|
| Coefficients in Mask | 0, 1 | 2, 3 | 4, 5 | 6, 7 | 8, 9 | 10, 11 | 12, 13 | ... | 136, 137 |

S1 to S5 are-start bits or bit-information used by the offset matching unit for positioning, and 1 to 64 are bits of use information.

The present invention is not limited to this correspondence. Another correspondence may be set between the bit information and the coefficient values as long as the pieces of bit information are sequentially embedded, using the pattern shown in FIG. 25, at all positions of the coefficients from 0 to the threshold value (or from the threshold value to 255).

In a 32×32 cone mask, four positions with the same coefficient are present in one mask.

When pieces of bit information are embedded in the original image data in correspondence with all coefficients on the basis of Table 2 using a large cone mask such as a 32×32 or 64×64 cone mask, the pieces of bit information of the additional information Inf are embedded an almost equal number of times. Additionally, pieces of identical bit information are spread and embedded in the original image data.

In the patchwork method, embedding positions are conventionally selected such that patterns (FIG. 25) corresponding to the bit information do not overlap each other. In this embodiment, however, the same effect as described above can be obtained by referring to the cone mask. In addition; degradation in image quality is small.

As a result, the mask reference means 1102 obtains the coordinates (x,y) of the embedding position corresponding to each bit information.

This information is represented by array S[bit][num]=(x, y), in which bit represents the start bits S1 to S5 and three bits of use information in Table 1, and num is the order of coefficients that repeatedly appear in the cone mask. The coordinates (x,y) represent relative coordinates in the mask.

The above operation is performed by the mask reference means 1102.

[3-2-3 Mask Pattern Array Corresponding Means)

The embedding position of each bit information in the cone mask, which is obtained by the mask reference means 1102, is input to the mask pattern array corresponding means 1103.

The embedding position determined by the mask reference means 1102 is the pattern position (corresponding to 8×8 pixels) of the pattern of each bit information. In the patchwork method, addition regions (+c), subtraction regions (−c), and regions (0) except these regions shown in FIG. 25 must be assigned. To do this, the mask pattern array corresponding means 1103 bitmaps the pattern array with an 8×8 size corresponding to FIG. 25 to all positions in the cone mask referred to by the mask reference means 1102.

More specifically, for coordinates represented by array S[bit](num]=(x,y) obtained by the mask reference means 1102, the x-coordinate is multiplied by the horizontal size of the pattern array, and the y-coordinate is multiplied by the vertical size of the pattern array. As a consequence, the coordinates 1701 in the mask shown in FIG. 33A become the start coordinates 1702 for which one pixel in the mask shown in FIG. 33B is extended to one pattern array.

When the pattern array shown in FIG. 25 is applied starting from the start coordinates, the bit information can be embedded without overlapping a region 1703 having the pattern array size.

The coordinates (x,y) change to coordinates (x',y'), though bit and num of the array S[bit][num] do not change.

Hence, (x',y') is defined as the start position at which the additional information Inf corresponding to bit of the array S[bit])[num] is embedded in accordance with the pattern array, so a plurality of bit information can be embedded.

The large mask obtained by bitmapping (enlarging) each coefficient of the cone mask to an 8×8 pattern array by the mask pattern array corresponding means 1103 is called an enlarged mask.

The size of the enlarged mask is (32×8)×(32×8). This size is the minimum necessary image unit (called a macro block) used to embed at least one additional information Inf.

The operation performed by the mask pattern array corresponding means 1103 has been described above.

A small mask generally has a lower degree of freedom in dot layout for mask generation than that of a large mask, so it is difficult to generate a mask such as a cone mask having desired characteristics. For example, when the additional information Inf is embedded by repeatedly assigning a small mask to the entire image data, the radial frequency of the small mask appears in the entire image data.

On the other hand, since the complete additional information Inf is extracted from one mask, the extraction resilience (possibility of extracting the additional information Inf from the partial image data wI') becomes low when a large mask size is set. For this reason, the mask size must be determined in consideration of balance between the extraction resilience and the degradation in image quality.

Processing performed by the mask pattern array corresponding means 1103 shown in FIG. 17 has been described above.

[3-3 Additional Information Embedding Processing]

The additional information embedding means 104 shown in FIG. 17 actually embeds the additional information Inf by referring to the embedding position determined in the above way for each bit information in the image data.

Figure 26:
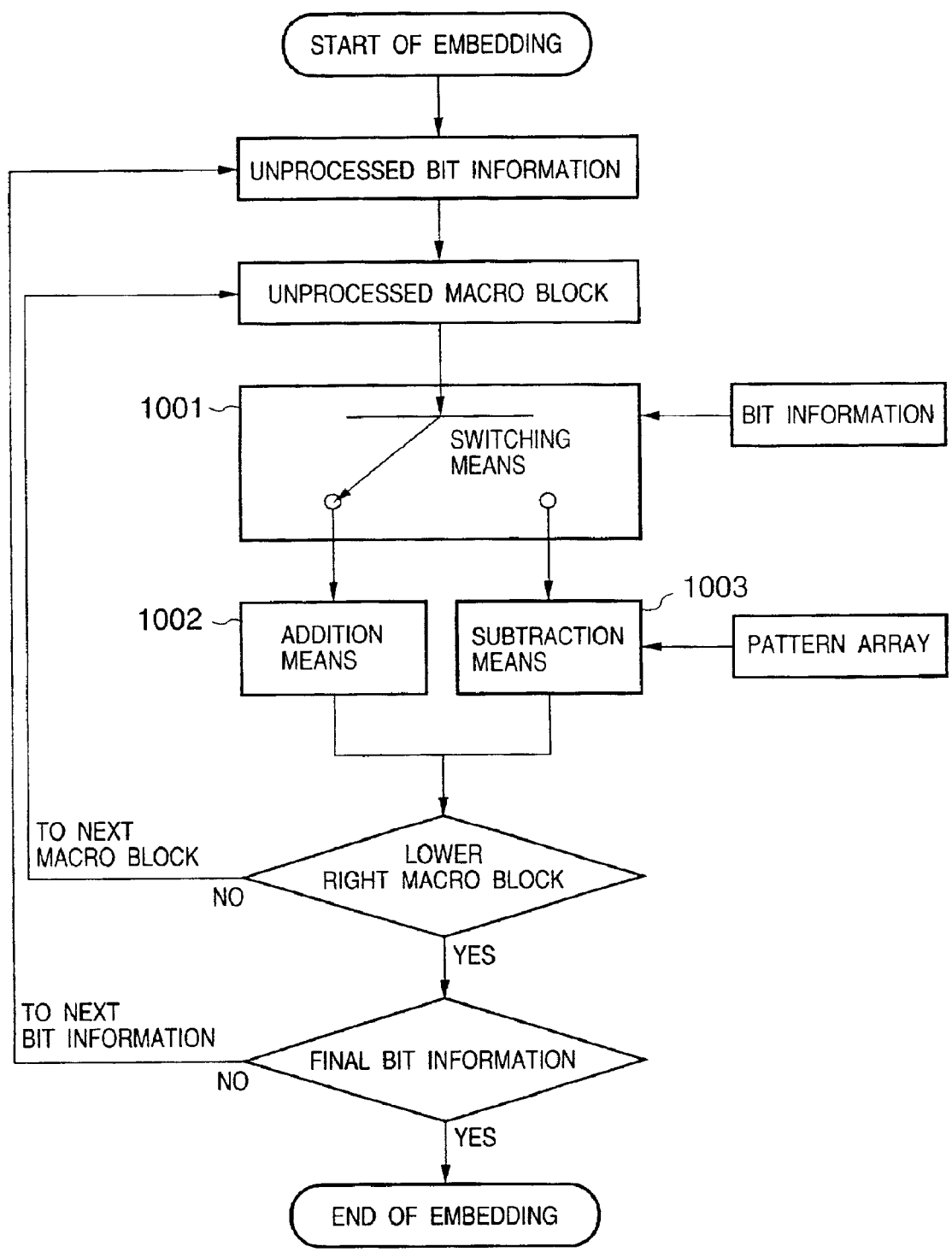
FIG. 26 is a flow chart showing the processing contents of an additional information embedding means.

FIG. 26 is a flow chart showing processing of repeatedly embedding the additional information Inf.

In the processing shown in FIG. 26, a plurality of assignable macro blocks are assigned to the entire image. In addition, the first bit information is repeatedly embedded in all of these macro blocks. Subsequently, the second bit information, third bit information, . . . are repeatedly embedded. If unembedded bit information remains, processing by means 1001 to 1003 is executed for all unprocessed macro blocks.

However, the present invention is not limited to this sequence, and the relationship between the two loop processes may be reversed. More specifically, when an unprocessed macro block remains, all bit information unembedded in this macro block may be embedded.

More specifically, when bit information of the additional information Inf to be embedded is "1", the pattern array shown in FIG. 25 is added. If the bit to be embedded is "0", the pattern array shown in FIG. 25 is subtracted. That is, pattern arrays with positive and negative signs inverted from those in FIG. 25 are added.

The addition/subtraction processing is realized by selectively controlling the switching means 1001 shown in FIG. 26 in accordance with bit information to be embedded. More specifically, when bit information to be embedded is "1", the switching means 1001 is connected to the addition means 1002. When the bit information is "0", the switching means 1001 is connected to the subtraction means 1003. Processing by the means 1001 to 1003 is executed while referring to the bit information and pattern array information.

Figure 35:
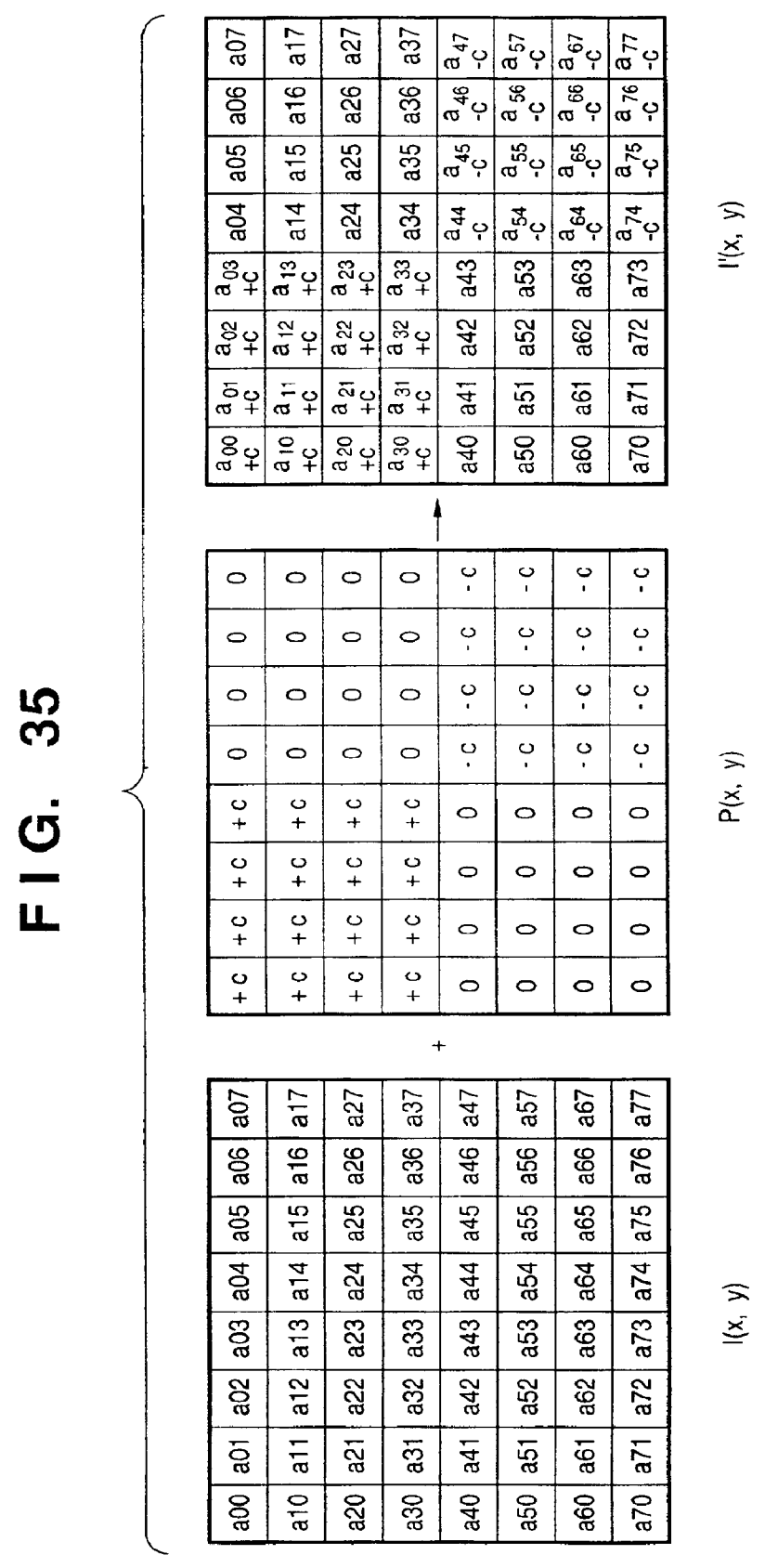

FIG. 35 is a view showing the process of embedding one bit information. In the example shown in FIG. 35, the bit information to be embedded is "1", i.e., the pattern array is added.

In the example shown in FIG. 35, I(x,y) is the original image, and P(x,y) is the 8×8 pattern array. The coefficients of the 8×8 pattern array are superposed on the original image data (blue component) having the same size as that of the pattern array, and values at the same position are added/subtracted. As a result, I'(x,y) is calculated and output to the color component synthesis means 105 shown in FIG. 17 as the image data of blue component in which bit information is embedded.

The above-described addition/subtraction processing using the 8×8 pattern array is repeatedly performed for all the embedding positions determined on the basis of Table 2 (positions at which the pattern array for embedding bit information is assigned.

Figure 34A:
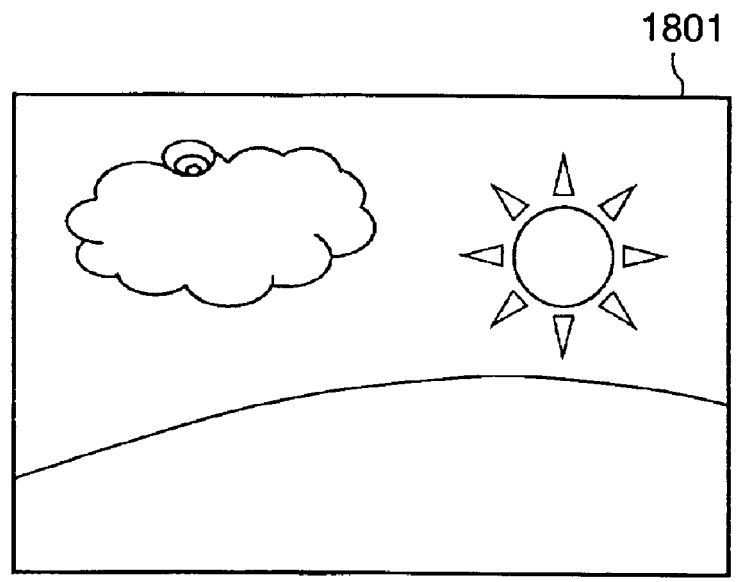
FIGS. 34A and 34B are views showing a region necessary for embedding additional information Inf in the entire image.
Figure 34B:
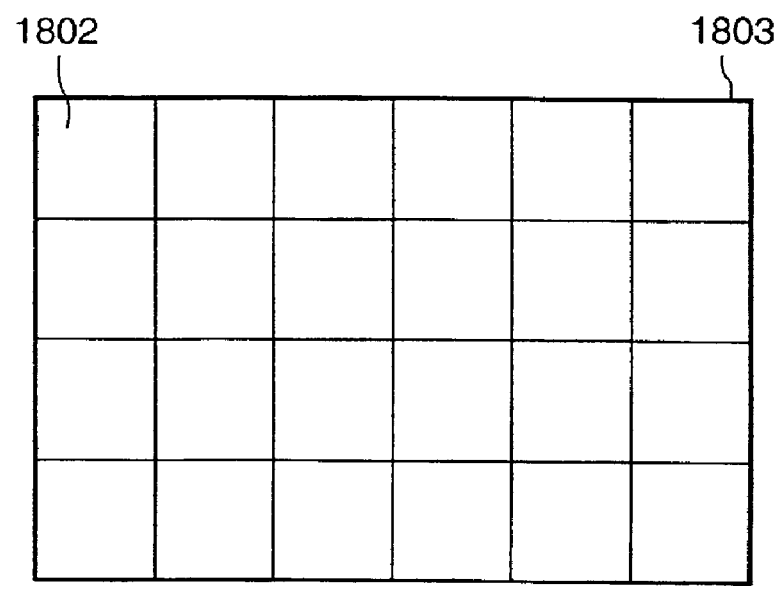

FIGS. 34A and 34B are views showing internal loop processing in FIG. 26.

Referring to FIGS. 34A and 34B, macro blocks 1802 are repeatedly assigned and embedded (1001 to 1003 in FIG. 26) in an entire image data 1801 (1803) starting from the upper left corner to the lower right corner in accordance with the raster sequence so as to repeatedly embed each bit information.

The above operation is performed by the additional information embedding means 104, so the additional information Inf is embedded in the entire image.

With the above processing, the additional information Inf is embedded in the image data. If each pixel of the image data having the additional information Inf embedded is represented by a sufficiently small number of dots, the size of the pattern array is also sufficiently small, and each pattern array is perceived by the human eye as only a small dot. Hence, the radial frequency characteristic of the cone mask is also maintained unnoticeable to the human eye.

[3-4 Registration Processing]

The registration means 202 shown in FIG. 18, which is provided on the digital watermark extraction apparatus side, will be described next in detail.

The registration means 202 is located on the input side of the additional information extraction means 203 for preprocessing of extraction processing of the additional information Inf. The image of blue component extracted by the color component extraction means 201 on the input side is input to the registration means 202.

The registration means 202 corrects the difference in scale between the image data wI output from the digital watermark embedding apparatus and the image data wI' input to the digital watermark extraction apparatus.

Figure 23:
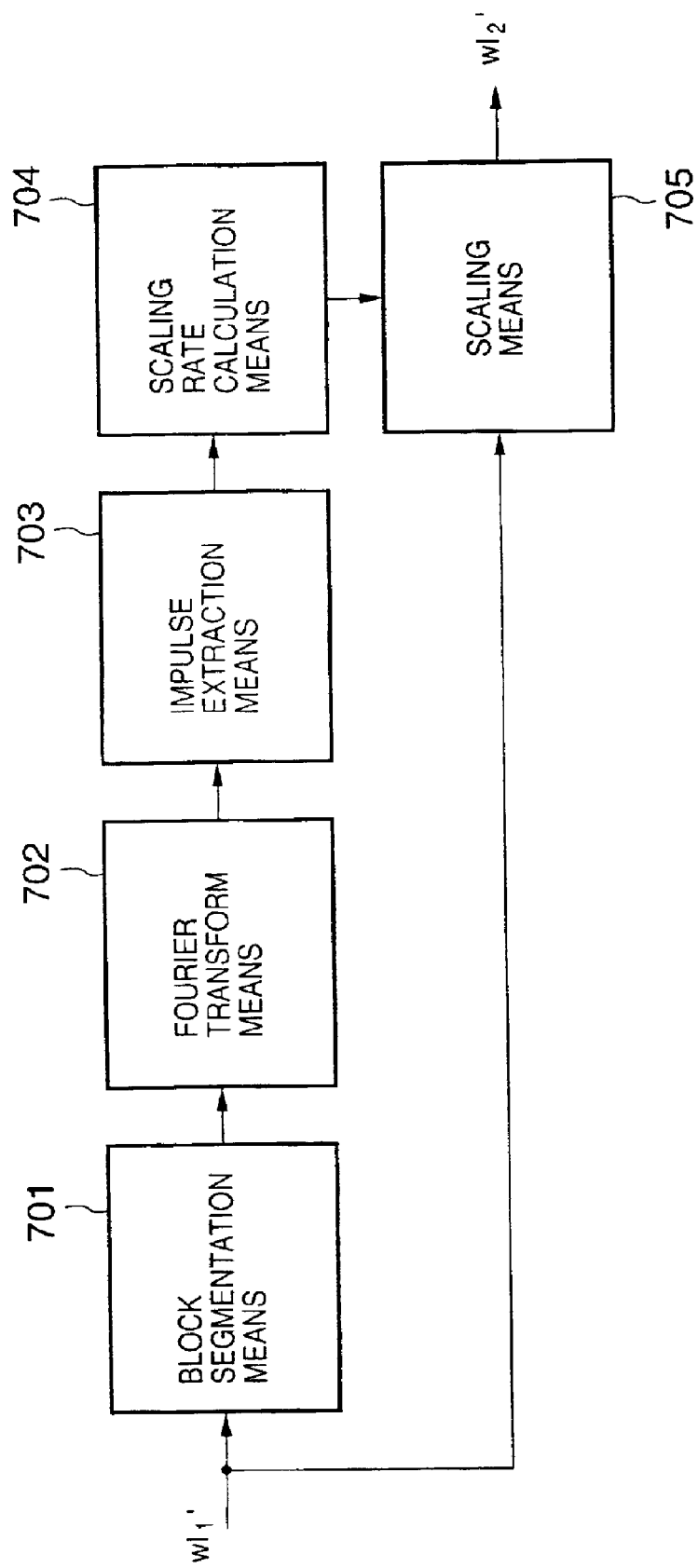
FIG. 23 is a block diagram showing a scale matching means.

FIG. 23 is a view showing a detailed arrangement of the registration means 202. The registration means 202 comprises a block segmentation means 701, Fourier transform means 702, impulse extraction means 703, scaling rate calculation means 704, and scaling means 705.

The block segmentation means 701 performs the same block segmentation processing as that of the above-described registration signal embedding means 102 (block segmentation means 401). With this processing, it generally becomes difficult to extract the same block as by the registration signal embedding means 102. This is because the image data wI with digital watermark information embedded is processed by the printing system to change its size and shift its position.

However, even when the blocks relatively inaccurately extracted, no problem is posed. This is because the digital watermark embedding apparatus has embedded a registration signal in the amplitude spectrum of the image data. As the nature of the amplitude spectrum, it is not influenced by a positional shift in the spatial domain of the image data. Hence, no problem is posed even when the blocks segmented by the block segmentation means of each of the digital watermark embedding apparatus and digital watermark extraction apparatus have slight positional shifts in the spatial domain.

The block segmentation means 701 outputs the image data segmented into blocks to the Fourier transform means 702. Like the above-described registration signal embedding means 102, the Fourier transform means 702 converts the image data in the spatial domain into image data in the frequency domain. The Fourier-transformed image data in the frequency domain is represented by an amplitude spectrum and phase spectrum. Only the amplitude spectrum is input to the impulse extraction means 703 while the phase spectrum is discarded.

The image data converted into the frequency domain is input to the impulse extraction means 703. The impulse extraction means 703 extracts only impulse signals from the image data converted into the frequency domain. More specifically, the impulse signals 502, 503, 504, and 505 shown in FIG. 21, which are already embedded in the image data, are extracted.

Figure 24A:
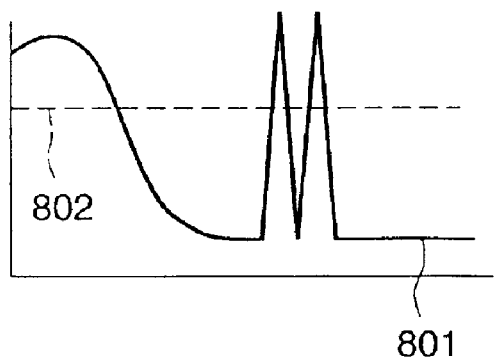
FIGS. 24A and 24B are graphs for explaining registration signal extraction.

This processing can be performed using a known image processing technique. For example, this processing can be realized by threshold processing of the image data converted into the frequency domain. FIG. 24A shows this example. FIG. 24A is a graph showing a state wherein an amplitude spectrum 801 input to the impulse extraction means 703 is processed using a threshold value 802. For the descriptive convenience, the converted image is one-dimensionally expressed in FIG. 24A. When the appropriate threshold value 802 is selected, the impulse signals can be extracted. However, the original image data having almost the same size as impulse signals present in the low-frequency region is also simultaneously extracted.

Figure 24B:
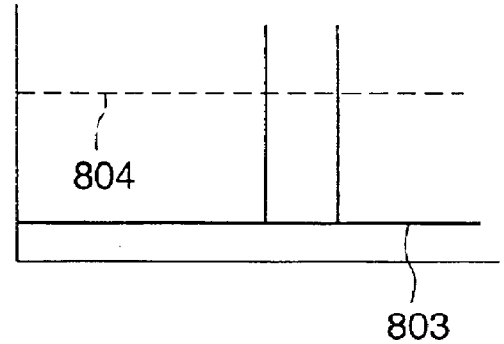

FIG. 24B is a graph showing the scheme of this embodiment that solves the above problem. The image data 801 converted into the frequency domain is quadratically differentiated. This processing is equivalent to Laplacian filtering. Reference numeral 803 denotes data obtained by quadratically differentiating the image data 801 converted into the frequency domain. For this data 803, an appropriate threshold value 804 is selected, and threshold processing is performed, thereby extracting an impulse signal.

Figure 42:
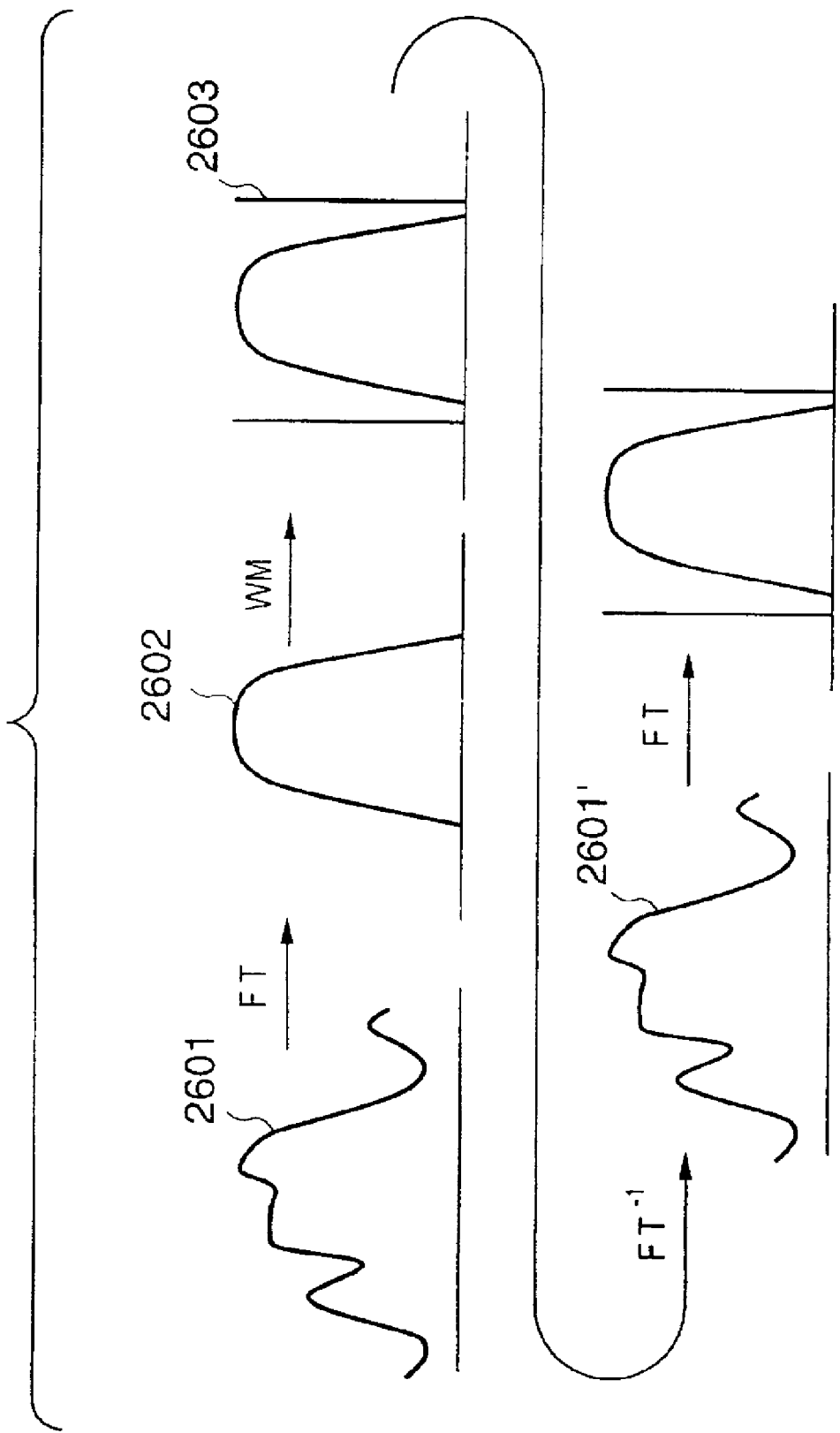
FIG. 42 is a view for explaining the principle of registration signal embedding and extraction.

Impulse signal extraction will be described with reference to FIG. 42 using a more detailed principle. FIG. 42 also shows processing on the above-described registration signal embedding side.

The registration signal embedding means 102 converts image data 2601 in the spatial domain into image data 2602 in the frequency domain, and impulse signals 2603 are added in the frequency domain.

The image data in the frequency domain, to which the impulse signals 2603 are added, is subjected to inverse frequency conversion and returned to a signal 2601' in the spatial domain. The image data 2601' returned to the spatial domain should have the influence of addition of impulse signals. However, this influence is hardly perceived by the human eye, and the image data 2601 and 2601' almost look like the same data. This is because the impulse signals 2603 added in the frequency domain are distributed to the entire image at a small amplitude by inverse Fourier transform.

Adding the impulse signal 2603 as shown in FIG. 42 is equivalent to adding image data having a predetermined frequency component to the spatial domain. If the added impulse signal has a frequency higher than that perceivable by the human eye and an amplitude smaller than a limit perceivable by the human eye, the added impulse signal is invisible to the human eye. Hence, registration signal embedding processing is a kind of digital watermark processing.

In this embodiment, after the registration signal 2603 is embedded in the image data 2601, and the additional information Inf to be embedded is actually embedded, the signal 2601' in the spatial domain is reconstructed.

The registration signals embedded as shown in FIG. 42 are Fourier-transformed again for extraction. The registration signals 2603 temporarily spread to the entire image in the spatial domain are converted into the frequency domain and appear as impulse signals again.

When an image with digital watermark information embedded is attacked by, e.g., irreversible compression such as JPEG compression, the amplitude of the impulse signal becomes small at a high possibility. When the image data receives a geometrical attack such as scaling, the position of impulse signal moves. In any case, the impulse signal can be extracted by appropriate impulse extraction processing as described above, and a change from the original image data can be estimated. When this change is corrected, reliable extraction of the additional information Inf embedded in this embodiment is enabled.

With this above processing, the above-described impulse signal is output from the impulse extraction means 703 shown in FIG. 23 and input to the scaling rate calculation means 704. The scaling rate calculation means 704 calculates the type of scaling using the coordinates of the received impulse signal.

In this embodiment, assume that the digital watermark extraction apparatus side knows the frequency component in which the impulse signal has been embedded in advance. In this case, the scaling rate can be calculated on the basis of the ratio of the frequency component in which the signal has been embedded in advance to the frequency from which the impulse is detected. For example, letting a be the frequency in which the impulse signal is embedded in advance, and b be the frequency of the detected impulse signal, it is found that scaling at a ratio a/b has been performed. This is a well-known nature of Fourier transform. With the above processing, the scaling rate is output from the scaling rate calculation means 704.

However, the present invention is not limited to this, and information of the registration signal embedded position (frequency) may be received from the digital watermark embedding apparatus side as needed. For example, the present invention also incorporates a case wherein the scaling rate is calculated upon receiving the position information as an encrypted signal. In this arrangement, only those who know the registration signal can accurately extract the additional information Inf. In this case, the registration signal can be used as a key for extracting the additional information Inf.

The scaling rate output from the scaling rate calculation means 704 is input to the scaling means 705. The image data wI' is also input to the scaling means 705. The image data wI' is subjected to scaling at the input scaling rate. For this scaling, various schemes including bi-linear interpolation and bi-cubic interpolation can be used. The scaled image data $wI_2'$ is output from the scaling means 705.

[3-5 Additional Information Extraction Processing]

The operation of the additional information extraction means 203 shown in FIG. 18, which extracts the additional information Inf from the blue component of the image data wI' in which the additional information Inf is embedded by the additional information embedding means 104 shown in FIG. 17 will be described next.

Figure 36:
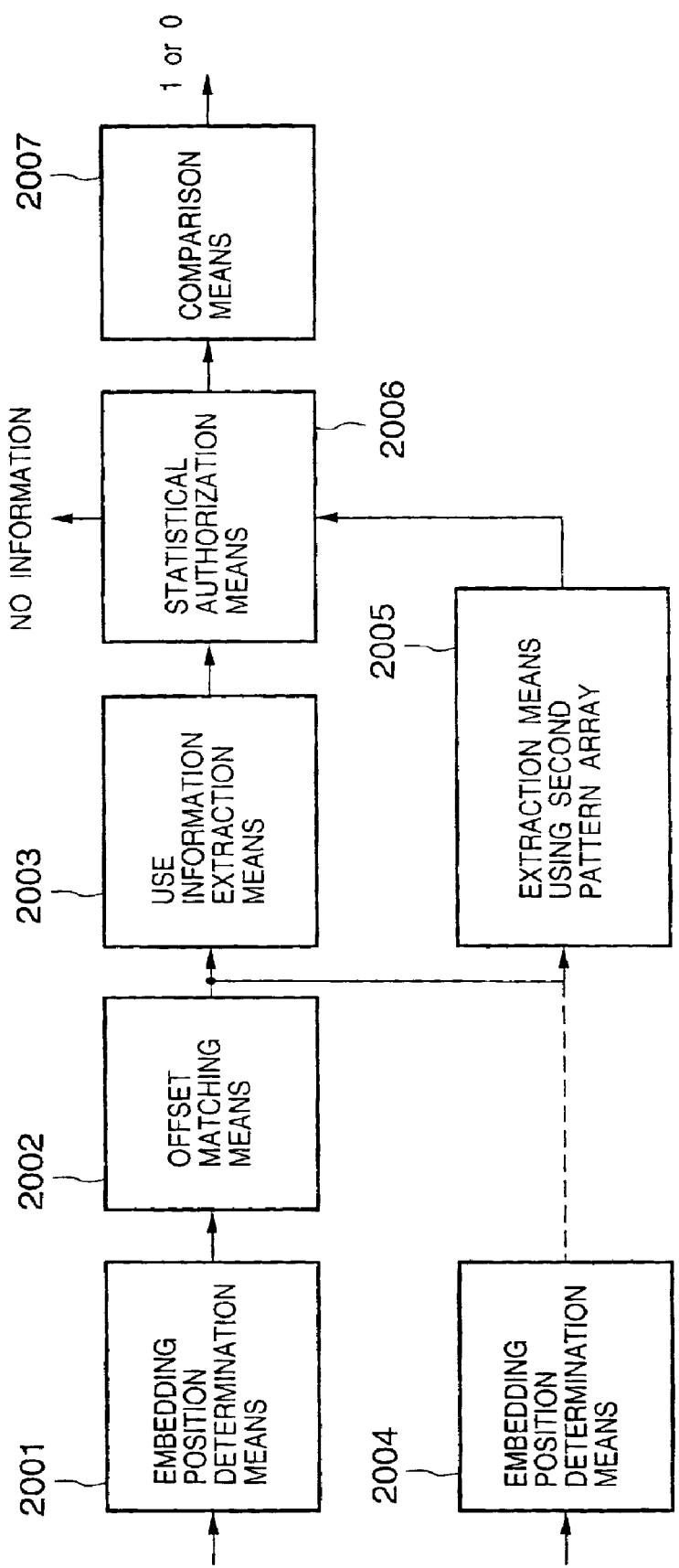
FIG. 36 is a block diagram for explaining an additional information extraction means.

FIG. 36 is a block diagram of extraction processing of the additional information Inf.

[3-5-1 Embedding Position Determination Processing]

As shown in FIG. 36, first, an embedding position determination means 2001 determines the region in the image data $wI_2'$ (blue component), from which the additional information Inf is to be extracted. The operation of the embedding position determination means 2001 is the same as that of the above-described embedding position determination means 103. For this reason, the regions determined by the embedding position determination means 103 and 2001 are the same.

The additional information Inf is extracted from the determined region using Table 2 and pattern array shown in FIG. 25.

The additional information Inf is extracted by convoluting the pattern array in the determined region.

[3-5-2 Reliability Distance Calculation Means]

The reliability distance d is a calculation value which is required to extract embedded information.

Figure 22:
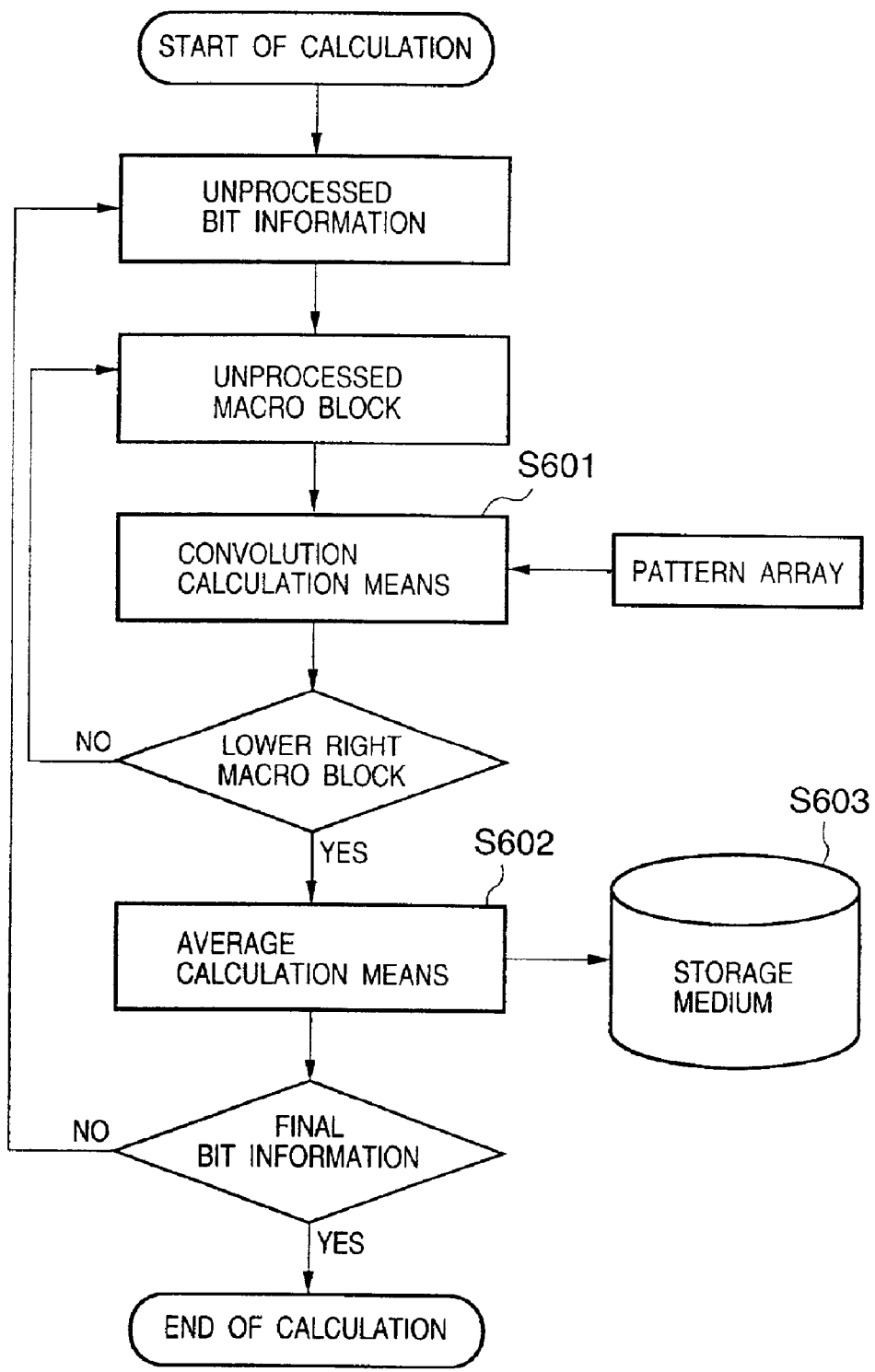
FIG. 22 is a flow chart showing the processing contents of a reliability distance calculation means.

FIG. 22 is a flow chart showing a method of obtaining the reliability distance d corresponding to each bit information.

Processing executed by a convolution calculation means 601 shown in FIG. 22 will be described first with reference to FIGS. 37 and 38.

Figure 37:
FIG. 37 is a view for explaining a state wherein the additional information Inf is extracted.
Figure 38:
FIG. 38 is a view showing a state wherein the additional information Inf is tried to be extracted although it is not present.

FIGS. 37 and 38 are views showing example in which one-bit information of the additional information Inf is to be extracted.

In the example shown in FIG. 37, 1-bit information of the additional information Inf is extracted from image data (blue component) I"(x,y) in which the 1-bit information is embedded. In the example shown in FIG. 38, 1-bit information is extracted by way of trial from the image data I(x,y) having no 1-bit information embedded.

Referring to FIG. 37, I"(x,y) is image data with 1-bit information embedded, and P(x,y) is the 8×8 pattern array used for convolution processing (pattern array used to extract the additional information Inf). Each element (0,±c) of the 8×8 pattern array is integrated with a pixel value arranged at the same position of the input image data I"(x,y), and also, the sum of integrated values is calculated. That is, P(x,y) is convoluted in I"(x,y). In this case, I"(x,y) is an expression including an image obtained when the image data I' (x,y) has received an attack. If no attack is made, I"(x,y)=I'(x,y). When 1-bit information is embedded in the image data I"(x,y), a non-zero value is obtained at a very high possibility as a result of convolution calculation, as shown in FIG. 37. Especially when I"(x,y)=I'(x,y), the convolution result is $32c$.

In this embodiment, the pattern array used for embedding and that used for extraction are the same. However, the present invention is not limited to this. Generally, when the pattern array used for embedding is P(x,y), and the pattern array used for extraction is P'(x,y), the relationship therebetween can be rewritten to $$P'(x,y)=aP(x,y)$$

where a is an arbitrary real number. In this embodiment, a case wherein a=1 will be described for the descriptive convenience.

In the example shown in FIG. 38, the same calculation as described above is performed for image data I(x,y) without 1-bit information embedded. A zero value is obtained from the original image (corresponding to the image data I) as expectation of a result of convolution calculation.

The method of extracting 1-bit information has been described above with reference to FIGS. 37 and 38. However, in the above-described case, the result of convolution is 0 in the image data I in which the additional information Inf is embedded. This is a very ideal case. However, in a region corresponding to the 8×8 pattern array of the actual image data I, the result of convolution calculation rarely becomes 0.

More specifically, when convolution calculation is performed using the pattern array shown in FIG. 25 (the cone mask is also referred to as layout information) for a region corresponding to the 8×8 pattern array of the original image (image data I), a non-zero value may be undesirably calculated. Conversely, when convolution calculation is performed for a region corresponding to the 8×8 pattern array of the image (image data wI) having the additional information Inf embedded, not the value $32^2$ but "0" may be obtained.

However, each bit information of the additional information Inf is normally embedded in the original image data a plurality of number of times. That is, the additional information Inf is embedded in the image a plurality of number of times. Hence, in n macro blocks having bit information embedded, convolution calculation is performed in units of 8×8 pattern arrays, and on the basis of the n results of convolution calculation for each bit information, it is statistically determined whether "each bit information is embedded" or "each bit information is 1 or 0". The statistic determination method will be described later.

The convolution calculation means 601 obtains the sum of the plurality of convolution calculation results for each bit information of the additional information Inf. For example, if the additional information Inf has eight bits, eight sums are obtained. The sum corresponding to each bit information is input to an average calculation means 602. Each sum is divided by the total number n of macro blocks and averaged. This average value is the reliability distance d. That is, the reliability distance d has a value generated by deciding by majority whether the value is similar to "$32c^2$" or "0" in FIG. 37.

In the above-described patchwork method, however, the reliability distance d is defined as $d=1/N\Sigma(a_i-b_i)$. b). Strictly, the reliability distance d is the average value of convolution results using P'(x,y)=1/c P(x,y). However, even when convolution calculation is performed using P'(x,y)=aP(x,y), only a multiple of real number of the reliability distance d is obtained as the average value of the convolution calculation results, so the same effect as described above can be sufficiently obtained. Hence, in the present invention, the average value of convolution calculation results using P'(x,y)=aP(x,y) can be sufficiently used as the reliability distance d.

The obtained reliability distance d is stored in a storage medium 603.

The convolution calculation means 601 repeatedly generated the reliability distances d for the bit information of the additional information Inf and sequentially stores them in the storage medium 603.

Figure 39:
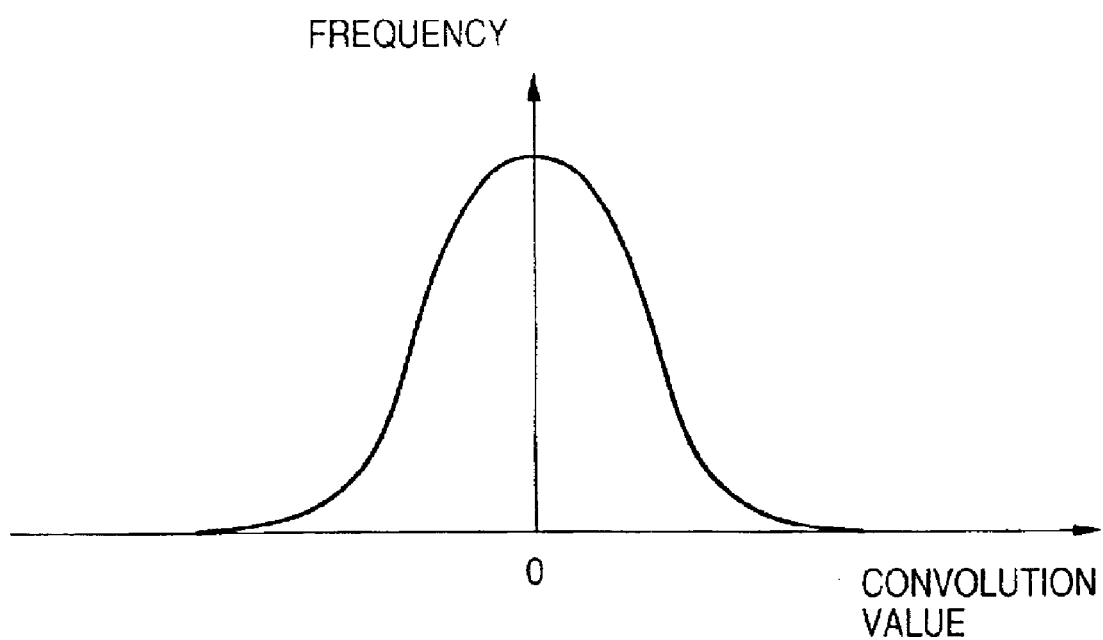
FIG. 39 is a graph showing an ideal appearance frequency distribution when a reliability distance d is extracted from the original image.

This calculated value will be described in more detail. The reliability distance d calculated for the original image data I using the pattern array shown in FIG. 25 (the cone mask is also referred to as layout information) is ideally 0. In the actual image data I, however, although this value is very close to 0, it is often non-zero. FIG. 39 is a graph showing the frequency distribution of the reliability distance d generated for each bit information.

Referring to FIG. 39, the abscissa represents the value of the reliability distance d generated for each bit information, and the ordinate represents the number of bit information (the appearance frequency of the reliability distance d) for which convolution is performed to generate the reliability distance d. As is apparent from FIG. 39, this distribution is similar to the normal distribution. In addition, in the original image data I, although the reliability distance d is not always 0, the average value thereof is 0 (or a value very close to 0).

Figure 40:
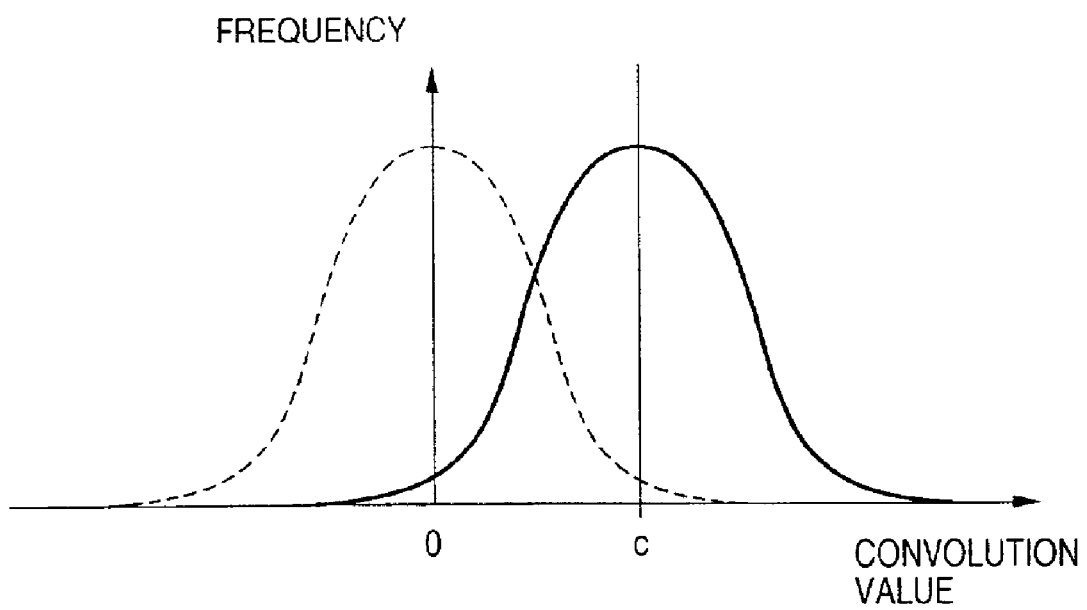
FIG. 40 is a graph showing a case wherein the reliability distance d is extracted from an image with a digital watermark embedded.

On the other hand, when the above convolution is performed for not the original image data I but the image data (blue component) I'(x,y) in which the bit information "1" has been embedded, as shown in FIG. 35, the reliability distances d have a frequency distribution as shown in FIG. 40. That is, as shown in FIG. 40, the distribution shifts to the right while maintaining its shape in FIG. 39. As described above, in the image data in which a certain bit of the additional information Inf is embedded, the reliability distances d are not always 0, though the average value thereof is c (or a value very close to c).

An example wherein the bit information "1" is embedded is shown in FIG. 40. When bit information "0" is embedded, the frequency distribution shown in FIG. 39 shifts to the left.

As described above, when the additional information Inf is to be embedded using the patchwork method, the number of bits to be embedded (the number of times of pattern array use) is made as large as possible such that the statistic distribution as shown in FIG. 39 or 40 accurately appears. More specifically, whether bit information of the additional information Inf is embedded or whether the embedded bit information is "1" or "0" can be detected at a high accuracy.

[3-5-3 Offset Matching Processing]

The arrangement of an offset matching means 2002 will be described next.

The offset matching means 2002 receives the image data wI'$_2$ after appropriate scaling. After that, the start bits are detected using-the reliability distance calculation shown in FIG. 22. The offset matching means 2002 generates only five reliability distances d corresponding to the five start bits Inf$_1$. The start bits Inf$_1$ are part of the additional information Inf embedded in advance by the additional information embedding means 104 and comprise 5 bits in this embodiment, as shown in FIG. 52.

The start bits Inf$_1$ comprise the first five bits as a concept. However, in an image having the additional information Inf embedded, the start bits are present not adjacently or densely but sparcely. This is because the pieces of bit information are sequentially embedded in correspondence with the coefficient values of the cone mask in Table 2.

Figure 44:
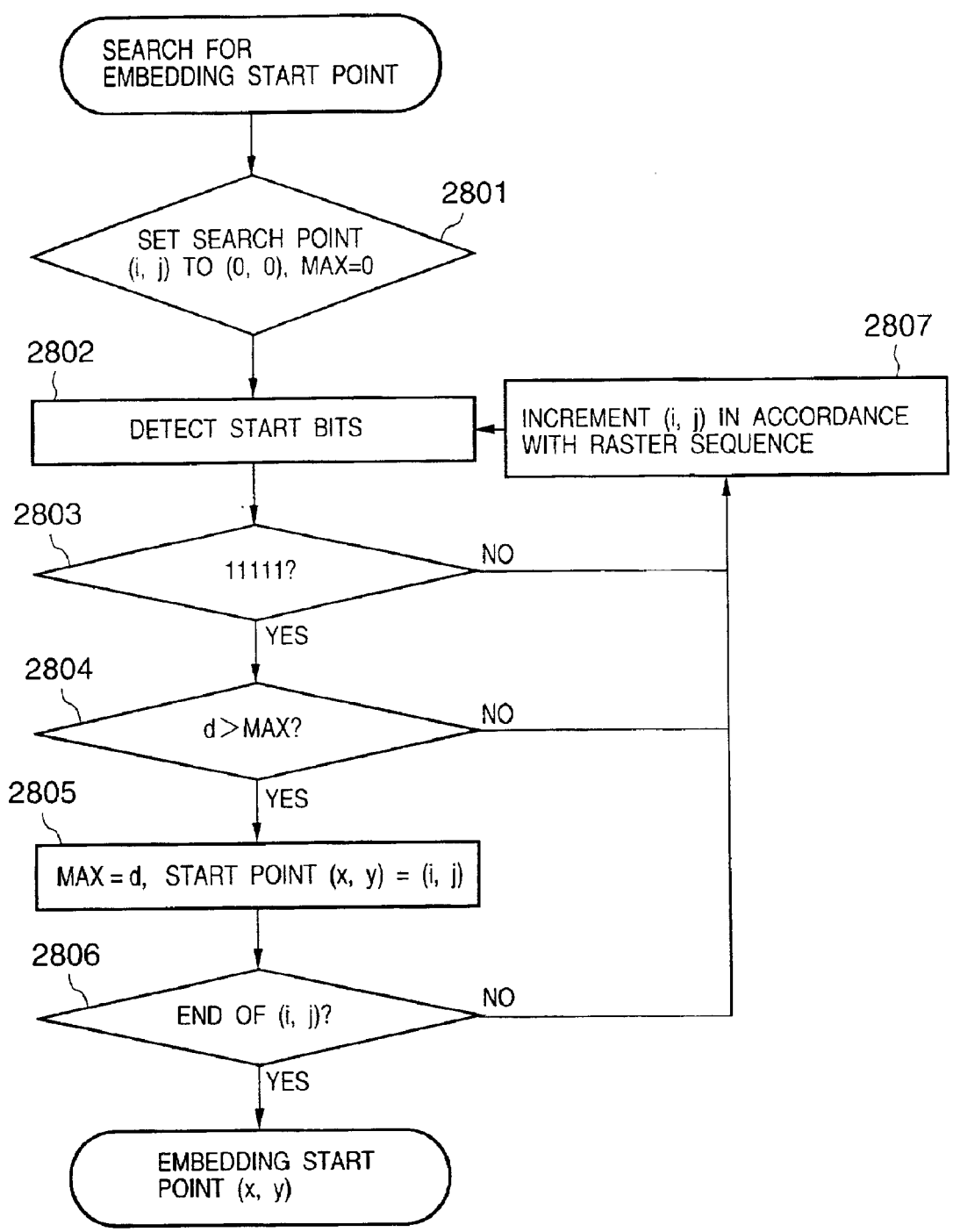
FIG. 44 is a flow chart for explaining offset matching processing.

FIG. 44 is a flow chart showing processing by the offset matching means 2002. A description will be made below in accordance with the flow of the flow chart shown in FIG. 44.

In step 2801, the offset matching means 2002 assumes that the coordinates of the leftmost point are the embedding start position coordinates in the received image data wI'$_2$. At the same time, a maximum value MAX is set to 0. In step 2802, the start bits are detected using the reliability distance calculation means shown in FIG. 22, It is determined in step 2803 whether the obtained first bit information to fifth bit information are correct start bits "11111". If this point is at the correct embedding start position coordinates, five consecutive positive reliability distances d are detected as a detection result. Otherwise, the five positive reliability distances d are not often consecutive. The above determination is sequentially done to determine that the position at which the correct start bits Inf can be detected is the embedding start position.

In fact, the correct start bits Inf may be detected at a point other than the embedding start point. The reason for this will be described with reference to FIG. 43.

Figure 43:
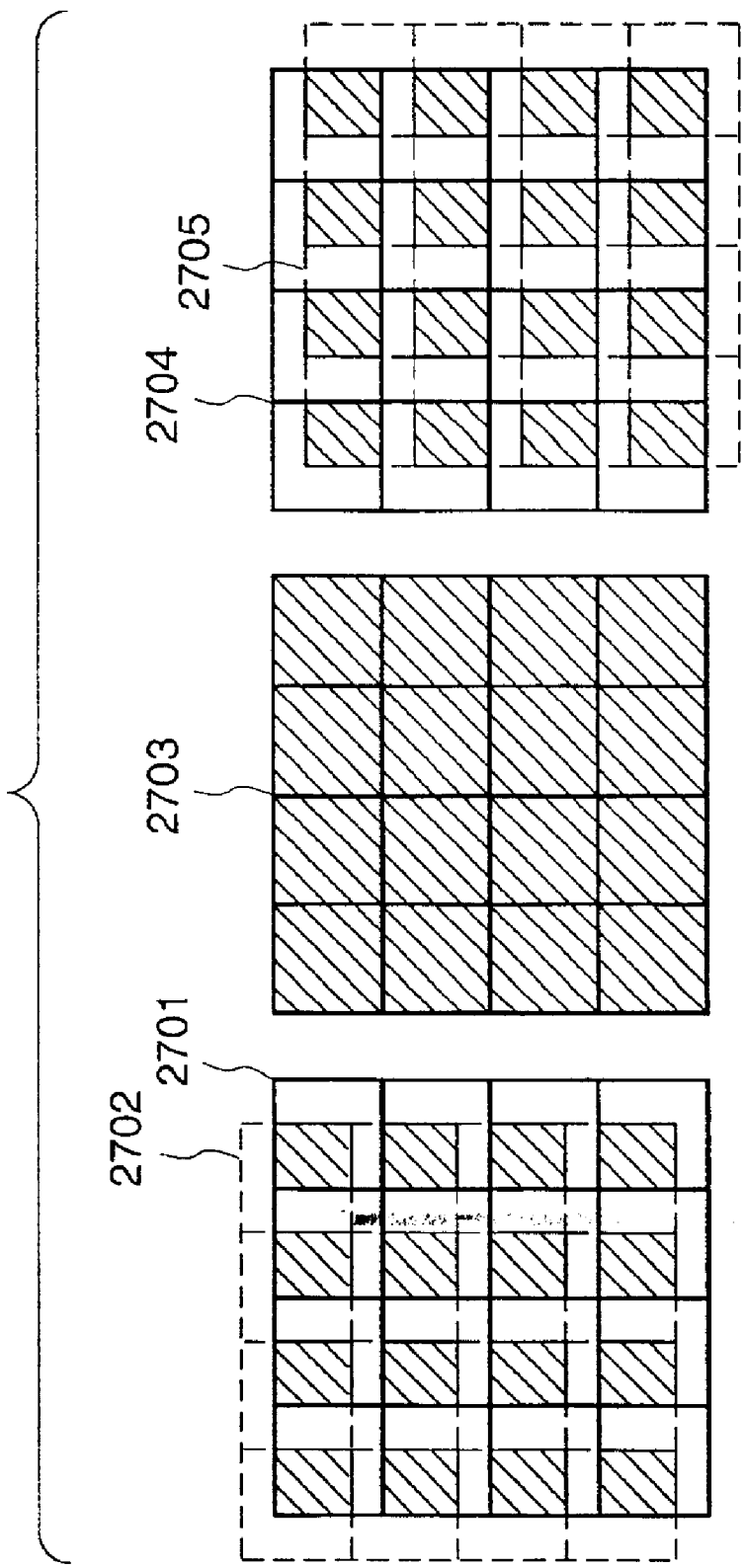
FIG. 43 is a view showing offset matching processing.

FIG. 43 shows a state wherein to extract the additional information Inf embedded by the patchwork method used in the second embodiment, the same pattern array (2702 and 2705) as that used to embed the additional information Inf is used (the cone mask is also referred to as layout information) to search for the original macro block position (2701, 2703, and 2704) while performing convolution. Searching continuously progresses from the left to the right.

Referring to FIG. 43, one macro block (minimum unit with which the additional information Inf can be extracted) as part of the image data wI'$_2$ will be exemplified for the descriptive convenience. One cell in FIG. 43 represents the size of pattern array used to embed 1-bit information.

When the macro block 2701 and the pattern array 2702 have the relationship shown on the left side of FIG. 43, i.e., the pattern array 2702 is located on the upper left side of the actual macro block 2701, the pattern arrays for the original image and for additional information Inf extraction overlap only in the hatched regions.

At the center of FIG. 43, the position during searching and the actual macro block position completely match. In this state, the pattern array to be convoluted and the macro block overlap at maximum.

On the right side of FIG. 43, the position during searching is located on the lower right side of the macro block position at which the additional information Inf is actually embedded. In this state, the pattern array to be convoluted and the macro block overlap only in the hatched regions.

If the pattern array to be convoluted and the macro block sufficiently overlap in all cases shown in FIG. 43, the correct start bits Inf$_1$ can be detected. However, since the overlap area changes between the three cases, the reliability distance d also changes.

The overlap area can be replaced with the reliability distance d. More specifically, when the pattern array to be convoluted and the macro block completely match, the reliability distance d of each bit information becomes very close to the above-described±$32c^2$.

In this embodiment, as shown in FIG. 44, if it is determined in step 2803 that the detected bits are not the correct start bits Inf$_1$, processing moves to the next search point in accordance with the raster sequence. If it is determined that the bits are the correct start bits Inf$_1$, it is determined in step 2804 whether the reliability distance d is larger than the maximum value MAX. If NO in step 2804, the maximum value MAX is updated to the current reliability distance d, and the current search point is stored as the embedding start point. It is determined in step 2806 whether all search points have been searched. If NO in step 2806, processing moves to the next search point in accordance with the raster sequence. If YES in step 2806, the embedding start point stored at that time is output, and the processing is ended.

By the series of processing operations, the offset matching means 2002 of this embodiment detects the start bits Inf$_1$, determines, as the embedding start point of the additional information Inf, information of coordinates with the largest reliability distance d in the coordinates at which the correct start bits Inf$_1$ are obtained, and outputs the information to the output side as embedding start coordinates.

[3-5-4 Use Information Extraction Means]

A use information extraction means 2003 receives the embedding start coordinates and image data with the additional information Inf embedded from the offset matching means 2002 on the input side, calculates the reliability distance d for only bit information of the use information Inf$_2$ using the same operation as described with reference to FIG. 22, and output reliability distances d1 for the bit information to a statistical authorization means 2006 on the output side.

Obtaining the reliability distance d1 corresponding to each bit information of the use information Inf$_2$ almost corresponds to extracting each bit of the embedded use information Inf$_2$. This will be described later.

At this time, only each reliability distance d is calculated on the basis of the embedding start coordinates determined by the above searching, and the five bits of the start bits Inf$_1$ are not extracted.

[3-6 Statistical Authorization Processing]

The statistical authorization means 2006 determines the reliability of the reliability distance d1 obtained by the use information extraction means 2003 shown in FIG. 36. This determination is done by generating a reliability distance d2 using a second pattern array different from the first pattern array used to extract the additional information Inf (use information Inf$_2$) and generating the reliability index D by referring to the appearance frequency distribution of the reliability distance d2.

The reliability distance d1 is a reliability distance obtained by using the first pattern array (the cone mask is also referred to as layout information) in order to extract the use information Inf$_2$ by the use information extraction means 2003. The reliability distance d2 is a reliability distance obtained using the second pattern array (to be described later) different from the first pattern array. The first pattern array is normally the pattern array shown in FIG. 25, which is used to embed the additional information Inf (start bits Inf$_1$ and use information Inf$_2$).

The second pattern array and reliability index D will be described later in detail.

[3-6-1 Extraction Processing Using Second Pattern Array]
<<Central-Limit Theorem>>

{a1, a2, . . . , aN} and {b1, b2, . . . , bN} are sets of pixel values each consisting of n elements and correspond to pixel values of elements of the subset A and subset B as shown in FIG. 46.

When each of {a1, a2, . . . , aN} and {b1, b2, . . . , bN} has a sufficient number N of elements, the pixel values $a_i$ and $b_i$ have no correlation, and the expected value for the reliability distance d ($\Sigma(a_1-b_1)/N$) is 0. By the central-limit theorem, the reliability distances d exhibit an independent normal distribution.

The central-limit theorem will be briefly described.

In this theorem, when an arbitrary sample having a magnitude $n_c$ is extracted from population (the population need not always have a normal distribution) with an average value $m_c$ and standard deviation $\sigma_c$, the distribution of average value $S_c$ approaches a normal distribution $N(m_c,(\sigma_c/\sqrt{n_c})^2)$ as $n_c$ becomes large.

Generally, the standard deviation $\sigma_c$ of the population is often unknown. However, the number $n_c$ of samples is sufficiently large, and the number $N_c$ of population is sufficiently larger than the number $n_c$ of samples, the standard deviation $s_c$ of the sample may be used in place of $\sigma_c$ without posing any practical problem.

Referring back to this embodiment, the appearance frequency distribution of the reliability distances d1 obtained by the use information extraction means 2003 largely changes depending on whether the use information Inf$_2$ is accurately extracted.

In case of a detection error of the start bits Inf$_1$ (in case of an offset matching error), no bit information is actually embedded at the position where the use information Inf$_2$ should be embedded. Hence, the appearance frequency distribution of the reliability distances d1 is given as a normal distribution 2501 shown in FIG. 41.

On the other hand, when the start bits are accurately detected, the reliability distances d1 corresponding to bit information "0" of the use information Inf$_2$ are accumulated at the position of a normal distribution 2502, and reliability distances d1 corresponding to bit information "0" of the use information Inf$_2$ are accumulated at the position of a normal distribution 2503. In this case, two "peaks" appear. The magnitude ratio between the two "peaks" almost equals the ratio of bit information "1" to "0" of the use information Inf$_2$.

However, this assumes that the reliability distances d1 obtained by convolution using the first pattern array for the original image without additional information embedded have the normal distribution 2501.

Practically, however, it cannot be determined whether the information is accurately detected unless the state of the original image is known.

Hence, in this embodiment, it is determined that the use information Inf$_2$ is accurately detected by generating the normal distribution of the reliability distances d2 using a so-called second pattern array, with which the original image state can be sufficiently determined even when the additional information is embedded, and regarding the normal distribution as the normal distribution 2501.

For example, when the appearance frequency distribution of reliability distances d1 is present outside the hatched portion (constituent elements from the center to 95%) of the normal distribution 2501 generated using the reliability distances d2, the target image has a statistical bias. It can be suggested that the use information Inf$_2$ is embedded, so the accuracy of the use information Inf$_2$ can be statistically determined. A method of this determination will be described later.

Figure 41:
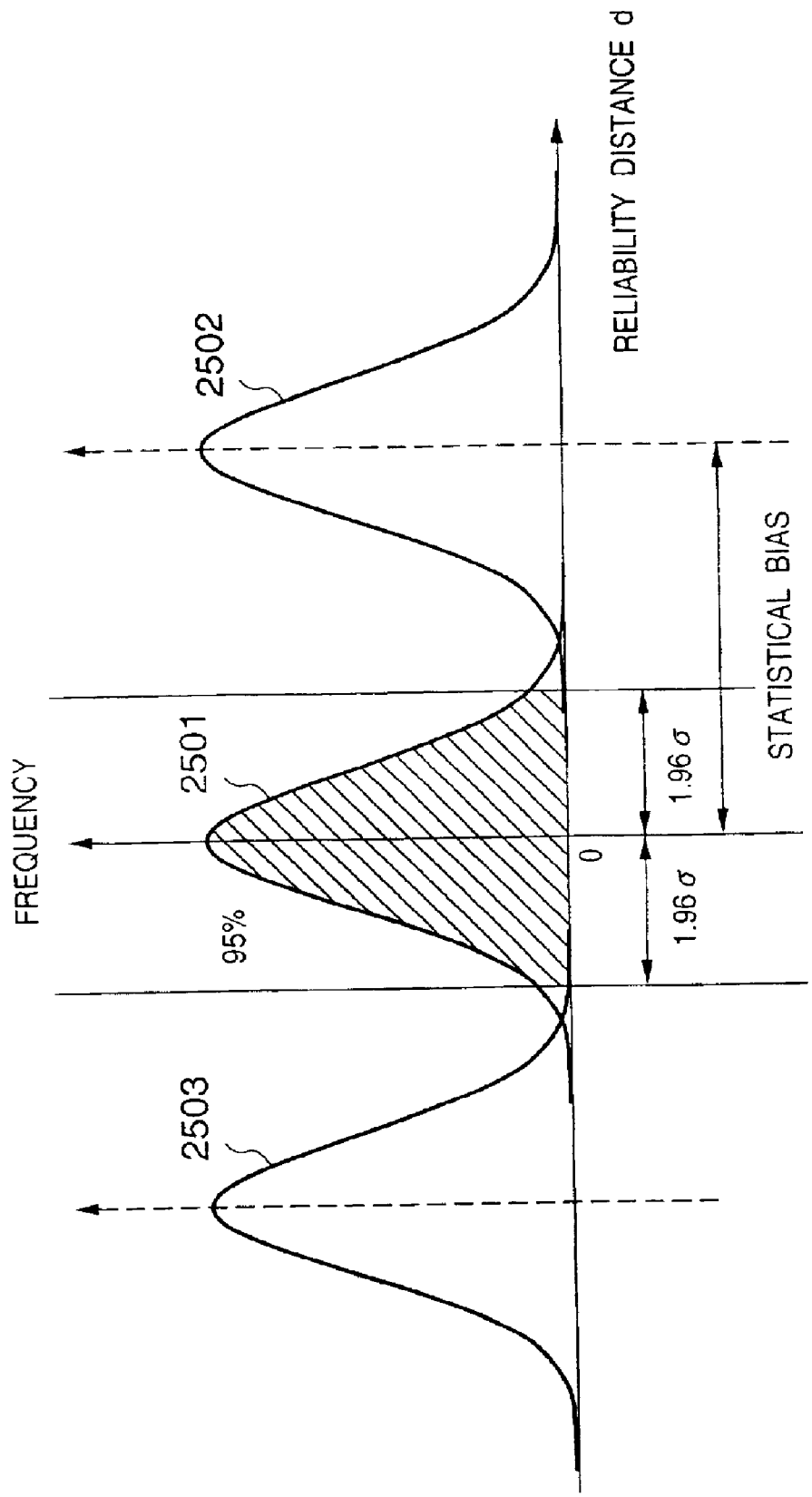
FIG. 41 is a graph for explaining examples of the appearance frequency distribution of reliability distances d1 and d2 in the second embodiment.

Next, a method of, using image data with the additional information Inf (use information Inf$_2$ embedded), generating a distribution (normal distribution 2501 as shown in FIG. 41) similar to the appearance frequency distribution of the reliability distances d1 before the additional information Inf is embedded will be described.

In this embodiment, the reliability distances d2 which form a distribution similar to the normal distribution 2501 are obtained using an extraction means 2005 using the second pattern array.

The extraction means 2005 using the second pattern array is a means for obtaining the reliability distance d2 using the second pattern array "perpendicular" to the first pattern array used by the use information extraction means 2003. The operation itself is almost the same as that of the use information extraction means 2003, including convolution processing.

For a comparison, the pattern array shown in FIG. 25 used by the use information extraction means 2003 and the mask (cone mask) used to refer to the layout position of the pattern array will be called a "first pattern array" and "first position reference mask", respectively, and a pattern array "perpendicular" to the first pattern array and a mask used to refer to the layout position of the pattern array will be called a "second pattern array" and "second position reference mask", respectively.

The extraction means 2005 using the second pattern array receives the embedding start coordinates from the offset matching means 2002 and also calculates the reliability distance d2 using the above-described reliability distance calculation in FIG. 22.

The pattern array used for the reliability distance calculation in FIG. 22 is not a pattern array 901 shown in FIG. 25, which is used for embedding, but a pattern array 3601 or 3602 "perpendicular" to the pattern array 901.

This is because the influence of manipulation of the pattern array 901 shown in FIG. 25, which is used to embed the additional information Inf, is not reflected to the pattern arrays 3601 and 3602 in FIGS. 49A and 49B.

Figure 50:
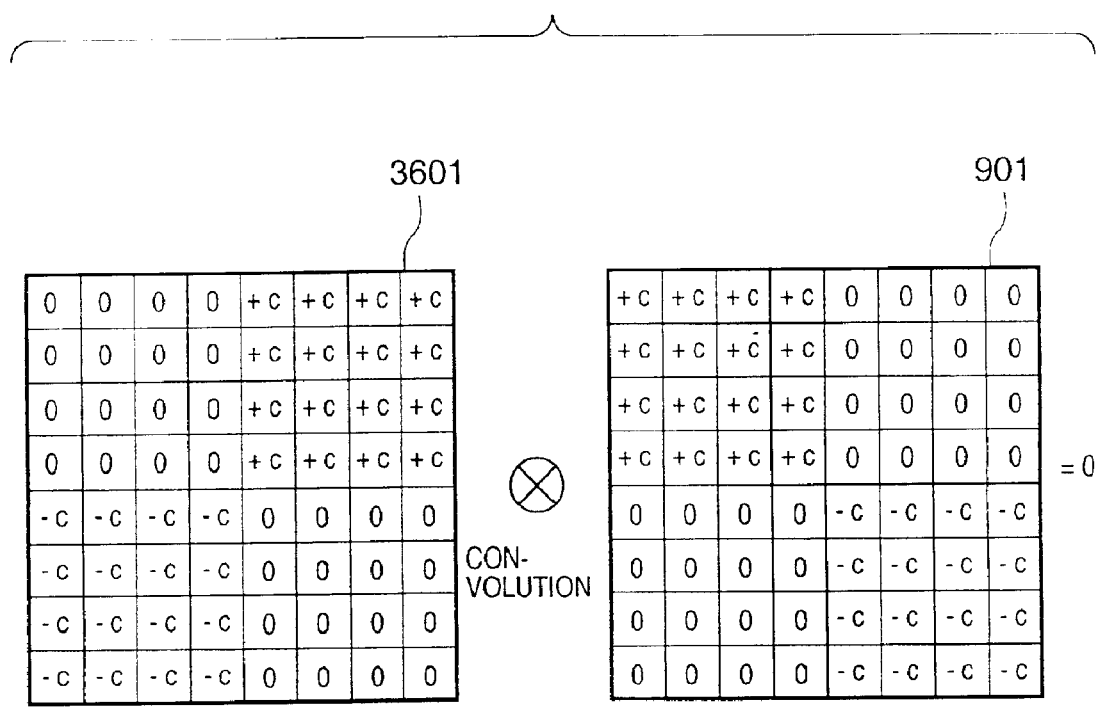
FIG. 50 is a view for explaining patterns "perpendicular" to each other.

As shown in FIG. 50, the result obtained by convoluting the pattern array 901 shown in FIG. 25 and pattern array 3601 "perpendicular" to the pattern array is 0. This also applies to the pattern array 3602. That is, the convolution result for the first and second pattern arrays is 0. Hence, even when the density of the original image is changed using the first pattern array, this does not influence the reliability distance d obtained by convolution processing using the second pattern array.

The appearance frequency distribution of the reliability distances d2, which is obtained by performing convolution processing using the second pattern array on the image with the additional information Inf embedded is almost the same as the normal distribution Inf shown in FIG. 41. Hence, the appearance frequency distribution is regarded as the normal distribution 2501.

Figure 48:
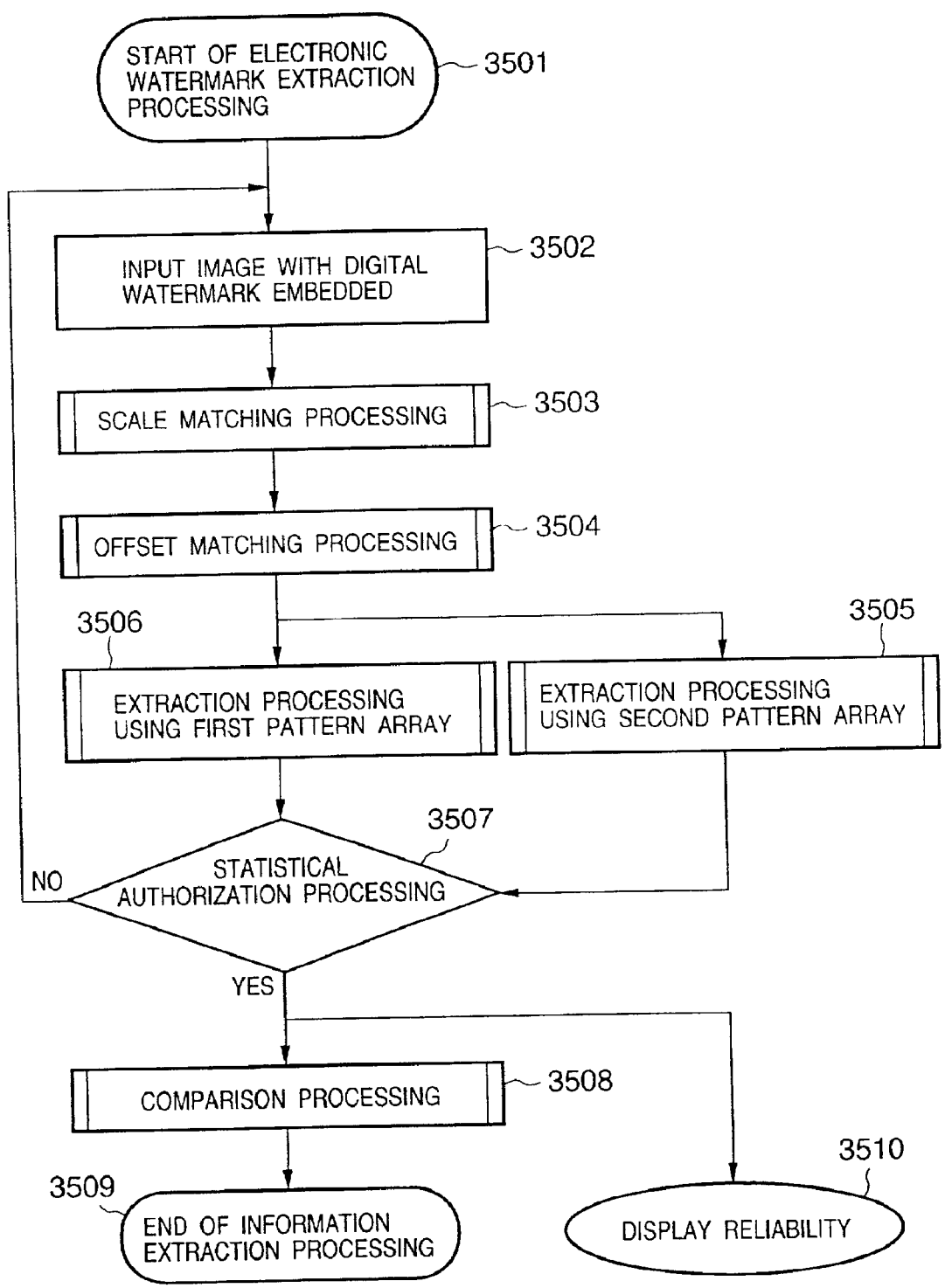
FIG. 48 is a flow chart for explaining the entire contents of digital watermark extraction processing.

The resultant normal distribution 2501 is the criterion necessary for statistical authorization processing 3507 in FIG. 48.

Figure 51A:
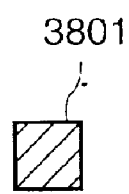
FIGS. 51A and 51B are views showing first and second position reference masks.
Figure 51B:
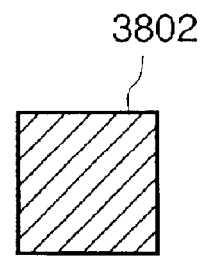

As described above, the extraction means 2005 using the second pattern array generates the normal distribution of reliability distances d2 using the "pattern array perpendicular to the first pattern", such as the pattern array 3601 or 3602 in FIG. 49A or 49B, and the second position reference mask 3802 shown in FIG. 51B.

Conditions of the "pattern array perpendicular to the first pattern array" are as follows.

(1) The size is the same as that of the pattern array 901 in FIG. 25, as shown in FIGS. 49A and 49B.

(2) As in the pattern arrays 3601 and 3602, the result of convolution processing for the pattern array 901 in FIG. 25, which is used to embed the additional information Inf, is 0.

The convolution processing shown in FIG. 50 is the same as that shown in FIGS. 37 and 38.

In this embodiment, that state wherein the convolution result becomes 0 is equivalent to the fact that the inner product of vectors becomes 0 when they are perpendicular to each other, and is expressed as "the pattern arrays are perpendicular to each other". Hence, the pattern array 3601 or 3602 in FIG. 49A or 49B is the "pattern array "perpendicular" to the pattern array 901 in FIG. 25".

The pattern array "perpendicular" to the pattern array used to embed the additional information Inf is used to calculate the reliability distance d2 because an appearance frequency distribution having no statistical bias in the distribution of the reliability distances d2, i.e., having 0 at the center is generated.

Another necessary condition of the "pattern array "perpendicular" to the first pattern" is as follows.

(3) The pattern array has non-zero elements equal in number to non-zero elements of the pattern array used in the use information extraction processing 2003, and the number of positive elements equals the number of negative elements.

This aims at extracting the reliability distance d1 and reliability distance d2 under the same calculation conditions.

In this embodiment, the "second position reference mask" has a pattern different from that of a mask 3801 used to embed the additional information Inf and uses a reference mask 3802 shown in FIG. 51B, which has a size different from that of the mask 3801.

When the first and second pattern arrays are different, the appearance frequency distribution of the reliability distances d2 is almost the same as the normal distribution 2501.

However, if the start bit detection position is not accurate, a statistical bias may be detected even when convolution is performed using the second pattern array. In this embodiment, this possibility is also taken into consideration, and the periodical elements are canceled by making the first and second reference mask sizes different from each other. Alternatively, convolution in the same region is not performed by changing the pattern array layout in the mask.

In this case, the "second position reference mask" need not always be a cone mask as far as the coefficients of the mask are distributed at random.

To set the "second embedding position reference mask" different from the "first embedding position reference mask", the "second embedding position reference mask" is generated by an embedding position determination means 2004 in FIG. 36.

Generally, when the above-described extraction resilience is taken into consideration, the first position reference mask (cone mask) does not have a large size relative to the entire image data in which the additional information Inf is to be embedded. Hence, a relatively large mask is preferably used as the "second position reference mask". In this embodiment, the size of the second mask used to calculate the reliability distance d1 on the additional information Inf side is set to be larger than that of the first mask referred to in embedding the additional information Inf.

However, the present invention is not limited to this and can provide the effect to some extent even when the mask sizes are equal. Hence, the "second position reference mask" may be generated by the embedding position determination means 2001 in FIG. 36.

The minimum necessary condition for the masks is that the numbers of times of repeating each bit of the additional information Inf applied to the masks are equal in an image region with the same size.

If no sufficient result is obtained by extraction processing using the second pattern array, another second pattern array or second position reference mask having the above conditions is used to calculate the reliability distance d2 again. In this case, the normal distribution 2501 shown in FIG. 41 may be generated as the ideal appearance frequency distribution.

The detailed operation of the extraction means 2005 using the second pattern array will be described next.

In this embodiment, the first position reference mask is a 32×32 cone mask, and the second position reference mask is a 64×64 cone mask. The relative layouts of the coefficients between the two masks are completely different.

In the extraction means 2005 using the second pattern array, the extraction position is determined in accordance with Table 3.

TABLE 3

| Order of Bit Information | 1 | 2 | 3 | 4 | ... | 64 |
|---|---|---|---|---|---|---|
| Coefficient Values in Second Position Reference Mask | 0, 1 | 2, 3 | 4, 5 | 6, 7 | ... | 136, 137 |

In the second position reference mask, 16 coefficients with the same value are present in the mask. On the other hand, in the first position reference mask having a size of 32×32, one coefficient is repeated four times in the 32×32 size when the mask is referred to in the above-described Table 2. That is, in image data having the same size, the number of coefficients with the same value in the first position reference mask is equal to that in the second position reference mask.

In this embodiment, the second pattern array is assigned to a positional relationship according to the rule in Table 3, and convolution processing is sequentially executed to calculate 69 reliability distances d2 corresponding to the bit information.

[3-6-2 Reliability Index D]

The reliability distances d2 generated by the extraction means 2005 using the second pattern array appear in almost the same distribution as the normal distribution 2501. In the normal distribution, it is known that 95% samples (reliability distances d2) generally appear within the range of the following inequality (25.1).

$$m - 1.96\sigma < d2 < m + 1.96\sigma \quad \ldots \quad (25.1)$$

where σ is the standard deviation for the reliability distance d2, and m is the average.

The above range is called a "95% confidence interval".

The values m−1.96σ and m+1.96σ are calculated using the reliability distance d2 obtained by the second extraction means 2005 using the second pattern array.

The appearance frequency distribution of the reliability distances d1 input from the use information extraction means 2003 to the statistical authorization means 2006 is the normal distribution 2502 shown in FIG. 41 when the bit information is "1" and the normal distribution 2503 when the bit information is "0". For this reason, the reliability distance d1 corresponding to the use information $Inf_2$ is present outside the 95% confidence interval (hatched portion in FIG. 41) obtained by the extraction means 2005 using the second pattern array at a very high probability.

At the time of processing by the offset matching means 2002, if the use information $Inf_2$ is not present in the image to be processed, the appearance frequency distribution of the reliability distances d1 is also given as the normal distribution 2501.

In this case, all of the 64 reliability distances d1 corresponding to the use information $Inf_2$ are not included in the confidence interval of inequality (25.1) at a probability as low as $(1-0.95)^{64}$.

Hence, when the normal distribution 2501 is obtained on the basis of the reliability distance d2, it can be almost reliably determined whether the additional information Inf (use information $Inf_2$) is embedded by determining whether the appearance frequency distribution obtained on the basis of the reliability distance d1 is included within the range that accounts for a greater part of the normal distribution 2501.

The statistical authorization means 2006 determines, using the above-described nature, the reliability that the additional information Inf (use information $Inf_2$) is embedded.

In this embodiment, the reliability that the use information Inf is embedded is handled as the reliability index D.

The reliability index D is defined by the ratio of the number of reliability distances d1 outside the range of inequality (25.1) to all reliability distances d1 generated by the use information extraction means 2003.

If the reliability index D is larger than a threshold value α, the statistical authorization means 2006 determines that the overall appearance frequency distribution of the reliability distances d1 is artificially biased to the position 2503 or 2503 in FIG. 41, i.e., the use information $Inf_2$ is properly embedded.

Hence, the statistical authorization means 2006 considers that the reliability distance d itself, which is used for determination, is reliable information and permits to further transfer the reliability distance d1 to a comparison means 2007 on the output side.

As shown in the reliability display step 3510 in FIG. 48, the reliability index D of the use information $Inf_2$ or a message based on the index D may be displayed on a monitor or the like.

For example, when the reliability index D is not larger than the threshold value a, a message "the use information $Inf_2$ is not accurately extracted" is displayed, and the flow returns from the statistical authorization step 3507 in FIG. 48 to the step 3502 of inputting the image again.

[3-7 Comparison Processing]

The comparison means 2007 shown in FIG. 36 receives the value of reliability distance d1 output through the use information extraction means 2003 and statistical authorization means 2006. Since the input reliability distance d1 is reliably information, it need be only simply determined whether bit information corresponding to each reliability distance d1 is "1" or "0".

More specifically, when the reliability distance d1 of given bit information of the use information $Inf_2$ has a positive value, it is determined that this bit information is "1". If the reliability distance d1 has a negative value, the bit information is determined to be "0".

The use information Inf obtained by the above determination is output as final data to be used as user reference information or control signal:

The series of processing operations from additional information embedding to extraction have been described above.

(Modifications)

In the above embodiment, error-correction-coded additional information Inf (use information $Inf_2$) may be used. In this case, the reliability of the extracted use information $Inf_2$ further improves.

The present invention may be applied as part of a system constituted by a plurality of devices (e.g., a host computer, an interface device, a reader, a printer, and the like) or to part of an apparatus comprising a single device (e.g., a copying machine, a facsimile apparatus, or the like).

The present invention is not limited to the apparatus and method for realizing the above embodiments. The present invention also incorporates a case wherein software program codes for realizing the above embodiments are supplied to the computer (CPU or an MPU) in the system or apparatus, and the computer in the system or-apparatus causes various devices to operate in accordance with the program codes, thereby realizing the above embodiments.

In this case, the software program codes realizes the functions of the above-described embodiments by themselves, and the present invention incorporates the program codes themselves and a means for supplying the program codes to the computer and, more particularly, a storage medium storing the program codes.

As a storage medium for storing the program codes, a floppy disk, a hard disk, an optical disk, a magnetooptical disk, a CD-ROM, a magnetic tape, a nonvolatile memory card, a ROM, or the like can be used.

Not only in a case wherein functions of the above-described embodiments are realized when the computer controls various devices in accordance with only the supplied program codes but also in a case wherein the above embodiments are realized by the program codes in cooperation with an OS (Operating System) running on the computer or another application software, the program codes are incorporated in the present invention.

The present invention also incorporates a case wherein the above embodiments are realized when the supplied program codes are stored in the memory of the function expansion board of the computer or function expansion unit connected to the computer, and the CPU of the function expansion board or function expansion unit performs part or all of actual processing on the basis of the instructions of the program codes.

In the above embodiments, digital watermark information is embedded using a cone mask. However, the present invention is not limited to this. Especially, the present invention also incorporates embedding digital watermark information using a blue noise mask.

In addition, an arrangement including at least one of the above-described various characteristic features is incorporated in the present invention.

As has been described above, according to the present invention, digital watermark information is embedded using the visual characteristics of a cone mask used for binarization. In embedding digital watermark information by partially adding/subtracting an image, the digital watermark information can be embedded while making degradation in image quality as unnoticeable as possible to the human eye.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for embedding predetermined information in image data, comprising:
   generation means for generating a binary mask pattern having an M×N size, said mask pattern itself having a blue noise characteristic and each bit in the mask pattern indicating either a target embedding position or a non-target embedding position represented by binary information and
   embedding means for applying the mask pattern to part of the image data and modulating image data corresponding to the target embedding position to embed the predetermined information,
   wherein said embedding means does not modulate image data corresponding to the non-target embedding position.

2. The apparatus according to claim 1, wherein the modulation is performed by quantizing the image data corresponding to the target embedding position.

3. The apparatus according to claim 1, wherein said embedding means repeatedly applies the mask pattern to a portion other than the part of the image data and modulates the image data corresponding to the target embedding portion to embed the predetermined information.

4. An image processing method of embedding predetermined information in image data, comprising:
   the generation step of generating a binary mask pattern having an M×N size, said mask pattern itself having a blue noise characteristic and each bit in the mask pattern indicating either a target embedding position or a non-target embedding position represented by binary information and
   the embedding step of applying the mask pattern to part of the image data and modulating image data corresponding to the target embedding position to embed the predetermined information,
   wherein said embedding step does not modulate image data corresponding to the non-target embedding position.

5. A computer-readable storage medium which stores an image processing program for embedding predetermined information in image data, the program comprising:
   the generation step of generating a binary mask pattern having an M×N size, said mask pattern itself having a blue noise characteristic and each bit in the mask pattern indicating either a target embedding position or a non-target embedding position represented by binary information and
   the embedding step of applying the mask pattern to part of the image data an modulating image data corresponding to the target embedding position to embed the predetermined information,
   wherein said embedding step does not modulate image data corresponding to the non-target embedding position.

6. An image processing apparatus for extracting predetermined information from image data in which the information has been embedded, comprising:
   generation means for generating a binary mask pattern having an M×N size, said mask pattern itself having a blue noise characteristic and each bit in the mask pattern indicating either a target embedding position or a non-target embedding position represented by binary information and
   extraction means for applying the mask pattern to part of the image data and detecting a modulated state of image data corresponding to the target embedding position to extract the predetermined information,
   wherein said extraction means does not detect the modulated state of image data corresponding to the non-target embedding position.

7. An image processing method of extracting predetermined information from image data in which the information has been embedded, comprising:
   the generation step of generating a binary mask pattern having an M×N size, said mask pattern itself having a blue noise characteristic and each bit in the mask pattern indicating either a target embedding position or a non-target embedding position represented by binary information and
   the extraction step of applying the mask pattern to part of the image data and detecting a modulated state of image data corresponding to the target embedding position to extract the predetermined information,
   wherein said extraction step does not detect the modulated state of image data corresponding to the non-target embedding position.

8. A computer-readable storage medium which stores an image processing program for extracting predetermined information from image data in which the information has been embedded, the program comprising:
   the generation step of generating a binary mask pattern having an M×N size, said mask pattern itself having a blue noise characteristic and each bit in the mask pattern indicating either a target embedding position or a non-target embedding position represented by binary information and
   the extraction step of applying the mask pattern to part of the image data and detecting a modulated state of image data corresponding to the target embedding position to extract the predetermined information,
   wherein said extraction step does not detect the modulated state of image data corresponding to the non-target embedding position.

9. An image processing apparatus comprising:
   first input means for inputting image data;
   second input means for inputting additional information;
   means for making each coefficient of a two-dimensional mask correspond to respective bit information of the additional information, each coefficient being represented in multilevel to identify a priority for embedding the bit information of the additional information; and
   digital watermark embedding means for modulating the image data, in accordance with the coefficients of the mask, on the basis of a positional relationship obtained by assigning the two-dimensional mask onto the image data as a correspondence result, thereby embedding the bit information in the image data,
   wherein the mask has periodic or pseudo-periodic peaks on a radial frequency domain of resultant binary information in a case where each coefficient of the two-dimensional mask is binarized.

10. The apparatus according to claim 9, wherein said digital watermark embedding means adds/subtracts a value of a pixel of the image data in accordance with contents of each bit information to embed each bit information in the image data.

11. The image processing apparatus according to claim 9, further comprising:

scale mark embedding means for embedding a plurality of scale marks at a predetermined area in the image data inputted by said first input means, wherein distance between the scale marks is fixed, and wherein said digital watermark embedding means embeds the additional information input by said second input means into the image embedded with the scale marks by said scale information embedding means.

12. The image processing apparatus according to claim 11, wherein said scale mark embedding means includes:

Fourier transform means for Fourier transforming a predetermined area in the image data inputted by said first input means to obtain amplitude spectrum data and phase spectrum data from the area;

impulse signal adding means for adding a plurality of impulse signals to the amplitude spectrum obtained by said Fourier transform means as the scale marks; and inverse Fourier transform means for inverse Fourier transforming using the amplitude spectrum processed by said impulse signal adding means and the phase spectrum obtained by said Fourier transform means.

13. An image processing method comprising:

a first input step of inputting image data;

a second input step of inputting additional information;

a step of making each coefficient of a two-dimensional mask correspond to respective bit information of the additional information; and a digital watermark embedding step of modulating the image data, in accordance with the coefficients of the mask, on the basis of a positional relationship obtained by assigning the two-dimensional mask onto the image data as a correspondence result, thereby embedding the bit information in the image data, wherein the mask has periodic or pseudo-periodic peaks on a radial frequency domain of resultant binary information in a case where each coefficient of the two-dimensional mask is binarized.

14. A computer-readable storage medium which stores an image processing program comprising:

a first input step of inputting image data;

a second input step of inputting additional information;

a step of making each coefficient of the two-dimensional mask correspond to respective bit information of the additional information; and a digital watermark embedding step of modulating the image data, in accordance with the coefficients of the mask, on the basis of a positional relationship obtained by assigning the two-dimensional mask onto the image data as a correspondence result, thereby embedding the bit information in the image data, wherein the mask has periodic or pseudo-periodic peaks on a radial frequency domain of resultant binary information in a case where each coefficient of the two-dimensional mask is binarized.

15. An image processing apparatus for extracting predetermined information from image data in which the information has been embedded, comprising:

input means for inputting image data from which embedded information is to be extracted;

mask input means for inputting a two-dimensional mask in which each coefficient corresponds to respective bit information of additional information, each coefficient being represented in multilevel to identify a priority for embedding the bit information of the additional information; and extraction means for applying the mask pattern to part of the image data, detecting a modulated state of image data in accordance with positions of coefficients in the mask, and extracting the additional information on the basis of the detection results, wherein the mask has periodic or pseudo-periodic peaks on a radial frequency domain of resultant binary information in a case where each coefficient of the two-dimensional mask is binarized.

16. The image processing apparatus according to claim 15, further comprising:

scale mark detection means for detecting a plurality of scale marks at a predetermined area in the image inputted by said input means; and scaling means for changing the scale of the image input by said input means, wherein said extraction means extracts the additional information from image data scaled by said scaling means.

17. The image processing apparatus according to claim 16, wherein said scale mark detection means includes:

Fourier transform means for Fourier transforming a predetermined area in the image data inputted by said input means to obtain amplitude spectrum data from the area; and detection means for detecting positions of impulse signals in the amplitude spectrum to determine the scale of the image inputted by said input means.

18. An image processing method for extracting predetermined information from image data in which the information has been embedded, comprising:

an input step of inputting image data from which embedded information is to be extracted;

a mask input step of inputting a two-dimensional mask in which each coefficient corresponds to respective bit information of additional information, each coefficient being represented in multilevel to identify a priority for embedding the bit information of the additional information; and an extraction step of applying the mask pattern to part of the image data, detecting a modulated state of image data in accordance with positions of coefficients in the mask, and extracting the additional information on the basis of the detection results, wherein the mask has periodic or pseudo-periodic peaks on a radial frequency domain of resultant binary information in a case where each coefficient of the two-dimensional mask is binarized.

19. A computer-readable storage medium storing a program for extracting predetermined information from image data in which the information has been embedded, the program comprising:

code for an input step of inputting image data from which embedded information is to be extracted;

code for a mask input step of inputting a two-dimensional mask in which each coefficient corresponds to respective bit information of additional information, each coefficient being represented in multilevel to identify a priority for embedding the bit information of the additional information; and code for an extraction step of applying the mask pattern to part of the image data, detecting a modulated state of image data in accordance with positions of coefficients in the mask, and extracting the additional information on the basis of the detection results, wherein the mask has periodic or pseudo-periodic peaks on a radial frequency domain of resultant binary information in a case where each coefficient of the two-dimensional mask is binarized.

20. An image processing apparatus comprising:

first input means for inputting image data;

second input means for inputting additional information;

means for making each coefficient of a two-dimensional mask correspond to respective bit information of the additional information, each coefficient being represented in multilevel to identify a priority for embedding the bit information of the additional information; and digital watermark embedding means for modulating the image data, in accordance with the coefficients of the mask, on the basis of a positional relationship obtained by assigning the two-dimensional mask onto the image data as a correspondence result, thereby embedding the bit information in the image data, wherein the pattern of the two-dimensional mask has a blue noise characteristic.

21. The apparatus according to claim 20, wherein said digital watermark embedding means adds/subtracts a value of a pixel of the image data in accordance with contents of each bit information to embed bit information in the image data.

22. An image processing method comprising:

a first input step of inputting image data;

a second input step of inputting additional information;

a step of making each coefficient of a two-dimensional mask correspond to respective bit information of the additional information, each coefficient being represented in multilevel to identify a priority for embedding the bit information of the additional information; and a digital watermark embedding step of modulating the image data, in accordance with the coefficients of the mask, on the basis of a positional relationship obtained by assigning the two-dimensional mask onto the image data as a correspondence result, thereby embedding the bit information in the image data, wherein the pattern of the two-dimensional mask has a blue noise characteristic.

23. A computer-readable storage medium which stores an image processing program comprising:

a first input step of inputting image data;

a second input step of inputting additional information;

a step of making each coefficient of a two-dimensional mask correspond to respective bit information of the additional information, each coefficient being represented in multilevel to identify a priority for embedding the bit information of the additional information; and a digital watermark embedding step of modulating the image data, in accordance with the coefficients of the mask, on the basis of a positional relationship obtained by assigning the two-dimensional mask onto the image data as a correspondence result, thereby embedding the bit information in the image data, wherein the pattern of the two-dimensional mask has a blue noise characteristic.

24. An image processing apparatus for extracting predetermined information from image data in which the information has been embedded, comprising:

input means for inputting image data from which embedded information is to be extracted;

mask input means for inputting a two-dimensional mask in which each coefficient corresponds to respective bit information of additional information, each coefficient being represented in multilevel to identify a priority for embedding the bit information of the additional information; and extraction means for applying the mask to part of the image data, detecting a modulated state of image data in accordance with positions of coefficients in the mask, and extracting the additional information on the basis of the detection results, wherein the pattern of the two-dimensional mask has a blue noise characteristic.

25. An image processing method for extracting predetermined information from image data in which the information has been embedded, comprising:

an input step of inputting image data from which embedded information is to be extracted;

a mask input step of inputting a two-dimensional mask in which each coefficient corresponds to respective bit information of additional information, each coefficient being represented in multilevel to identify a priority for embedding the bit information of the additional information; and an extraction step of applying the mask to part of the image data, detecting a modulated state of image data in accordance with positions of coefficients in the mask, and extracting the additional information on the basis of the detection results, wherein the pattern of the two-dimensional mask has a blue noise characteristic.

26. A computer-readable storage medium storing a program for extracting predetermined information from image data in which the information has been embedded, the program effecting a method comprising:

an input step of inputting image data from which embedded information is to be extracted;

a mask input step of inputting a two-dimensional mask in which each coefficient corresponds to respective bit information of additional information, each coefficient being represented in multilevel to identify a priority for embedding the bit information of the additional information; and an extraction step of applying the mask to part of the image data, detecting a modulated state of image data in accordance with positions of coefficients in the mask, and extracting the additional information on the basis of the detection results, wherein the pattern of the two-dimensional mask has a blue noise characteristic.

* * * * *

UNITED STATES PATENT AND TRADEMARK OFFICE
CERTIFICATE OF CORRECTION

PATENT NO. : 6,993,148 B1
APPLICATION NO. : 09/615577
DATED : January 31, 2006
INVENTOR(S) : Tomoyuki Miyashita et al.

It is certified that error appears in the above-identified patent and that said Letters Patent is hereby corrected as shown below:

ON THE TITLE PAGE
At Item (56), U.S. Patent Documents, "Kurokid et al." should read --Parker et al.--.

COLUMN 1
Line 31, "shown as" should read --as shown--.
Line 37, "FIG." should read --FIGS.--.

COLUMN 5
Line 18, "frequency-band-components" should read --frequency band components--.

COLUMN 7
Line 5, "be" should read --the--.
Line 19, "+i" should read --i--.

COLUMN 8
Line 9, "values×and y" should read --values x and y--.
Line 36, "bit" should read --bit- --.

COLUMN 9
Line 7, "all-positions" should read --all positions--.

COLUMN 14
Line 36, "set $I_2$" should read --set $I_1$--.

COLUMN 17
Line 29, "(a'-b')" should read --(a'$_i$-b'$_i$)--.

COLUMN 18
Line 16, "including-the" should read --including the--.

COLUMN 19
Line 17, "large-size" should read --large size--.

COLUMN 20
Line 4, "obtaining" should read --obtained--.
Line 27, "$P_{gl}$" should read --$P_{gl+1}$--.

COLUMN 21
Line 26, "y" should read --by--.

UNITED STATES PATENT AND TRADEMARK OFFICE
CERTIFICATE OF CORRECTION

PATENT NO.        : 6,993,148 B1
APPLICATION NO. : 09/615577
DATED              : January 31, 2006
INVENTOR(S)      : Tomoyuki Miyashita et al.

It is certified that error appears in the above-identified patent and that said Letters Patent is hereby corrected as shown below:

COLUMN 23
Line 22, "divided" should read --divided by--.

COLUMN 24
Line 13, "addition;" should read --addition,--.
Line 25, "Means)" should read --Means]--.
Line 40, "(num]" should read --[num]--.
Line 55, ")" should be deleted.

COLUMN 25
Line 67, "assigned." should read --assigned).--.

COLUMN 28
Line 41, "wI'" should read --wI'$_1$--.
Line 42, "wI'" should read --wI'$_1$--.

COLUMN 29
Line 10, "example" should read --examples--.
Line 33, "32$^c$" should read --32c$^2$--.
Line 66, "32$^2$" should read --32c$^2$--.

COLUMN 31
Line 17, "using-the" should read --using the--.
Line 38, "22," should read --22.--.

COLUMN 37
Line 56, "value a" should read --value α--.

COLUMN 38
Line 6, "Inf" should read --Inf$_2$--.
Line 8, "signal:" should read --signal.--.

COLUMN 39
Line 16, "information" should read --information;--.
Line 29, "por-" should read --posi- --.
Line 38, "information" should read --information;--.
Line 54, "information" should read --information;--.
Line 56, "an" should read --and--.

UNITED STATES PATENT AND TRADEMARK OFFICE
CERTIFICATE OF CORRECTION

PATENT NO. : 6,993,148 B1
APPLICATION NO. : 09/615577
DATED : January 31, 2006
INVENTOR(S) : Tomoyuki Miyashita et al.

It is certified that error appears in the above-identified patent and that said Letters Patent is hereby corrected as shown below:

<u>COLUMN 40</u>
Line 4, "information" should read --information;--.
Line 19, "information" should read --information;--.
Line 36, "information" should read --information;--.

Signed and Sealed this

Twelfth Day of September, 2006

JON W. DUDAS
*Director of the United States Patent and Trademark Office*